United States Patent
Park et al.

(10) Patent No.: US 12,267,857 B2
(45) Date of Patent: *Apr. 1, 2025

(54) TRANSMISSION CONFIGURATION AND TIMING FOR WIRELESS COMMUNICATIONS

(71) Applicant: Comcast Cable Communications, LLC, Philadelphia, PA (US)

(72) Inventors: Jonghyun Park, Syosset, NY (US); Esmael Hejazi Dinan, McLean, VA (US); Hua Zhou, Vienna, VA (US); Yunjung Yi, Vienna, VA (US); Ali Cagatay Cirik, Chantilly, VA (US); Hyukjin Chae, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,211

(22) Filed: Oct. 19, 2023

(65) Prior Publication Data
US 2024/0137960 A1 Apr. 25, 2024
US 2024/0237042 A9 Jul. 11, 2024

Related U.S. Application Data

(63) Continuation of application No. 17/219,993, filed on Apr. 1, 2021, now Pat. No. 11,832,285.

(51) Int. Cl.
*H04W 72/53* (2023.01)
*H04W 72/044* (2023.01)
(Continued)

(52) U.S. Cl.
CPC ......... *H04W 72/53* (2023.01); *H04W 72/046* (2013.01); *H04W 72/23* (2023.01); *H04W 76/11* (2018.02); *H04W 80/02* (2013.01)

(58) Field of Classification Search
CPC ... H04W 72/53; H04W 72/046; H04W 72/23; H04W 76/11; H04W 80/02;
(Continued)

(56) References Cited

U.S. PATENT DOCUMENTS 10,506,587 B2   12/2019   Guo
2019/0222289 A1*   7/2019   John Wilson ........ H04B 7/0626
(Continued)

FOREIGN PATENT DOCUMENTS

WO   2019195528 A1   10/2019

OTHER PUBLICATIONS

ERICSSON: "Summary of draft CRs for beam 1-15 management and QCL" 3GPP TSG-RAN WG1 Meeting #96; Athens, Feb. 26, 2019.
(Continued)

*Primary Examiner* — Kiet Tang
(74) *Attorney, Agent, or Firm* — Banner & Witcoff, Ltd.

(57) ABSTRACT

Wireless communications may comprise transmissions using a beam. A message may comprise one or more indications of a beam and/or type(s) of signals for downlink and/or uplink transmission using the beam. An acknowledgement may be used to indicate reception of the one or more indications and/or a time offset may be used for applying the beam for the downlink and/or uplink transmission.

46 Claims, 42 Drawing Sheets

Related U.S. Application Data

(60) Provisional application No. 63/004,966, filed on Apr. 3, 2020.

(51) Int. Cl.
    *H04W 72/23*    (2023.01)
    *H04W 76/11*    (2018.01)
    *H04W 80/02*    (2009.01)

(58) Field of Classification Search
    CPC ..... H04L 5/0053; H04L 5/0091; H04B 7/022; H04B 7/088; H04B 7/0695
    See application file for complete search history.

(56) References Cited

U.S. PATENT DOCUMENTS

| | | | |
|---|---|---|---|
| 2019/0254120 A1* | 8/2019 | Zhang | H04W 4/80 |
| 2019/0297603 A1 | 9/2019 | Guo et al. | |
| 2020/0044797 A1 | 2/2020 | Guo | |
| 2020/0178350 A1 | 6/2020 | Miao et al. | |
| 2021/0068021 A1* | 3/2021 | Awoniyi-Oteri | H04B 7/086 |
| 2021/0258964 A1* | 8/2021 | Khoshnevisan | H04B 7/022 |

OTHER PUBLICATIONS

Aug. 8, 2021—European Search Report—EP 21166651.6.
R1-1913453 3GPP TSG RAN WG1 Meeting #99, Reno, USA, Nov. 18-22, 2019, Source: LG Electronics, Title: Feature lead summary#4 of Enhancements on Multi-beam Operations.
R1-1912277 3GPP TSG RAN WG1 Meeting #99, Reno, USA, Nov. 18-22, 2019, Source: LG Electronics, Title: Feature lead summary of Enhancements on Multi-beam Operations.
R1-1909779 3GPP TSG RAN WG1 Meeting #98, Prague, Czech Republic, Aug. 26-30, 2019, Source: LG Electronics, Title: Feature lead summary#4 of Enhancements on Multi-beam Operations.
R1-1909486 3GPP TSG RAN WG1 Meeting #98, Prague, Czech Republic, Aug. 26-30, 2019, Source: LG Electronics, Title: Feature lead summary of Enhancements on Multi-beam Operations.
R1-1909273 3GPP TSG RAN WG1 Meeting #98, Prague, Czech Republic, Aug. 26-30, 2019, Source: Qualcomm Incorporated, Title: Enhancements on Multi-beam Operation.
R1-1909225 3GPP TSG RAN WG1 Meeting #98, Prague, Czech Republic, Aug. 26-30, 2019, Source: Ericsson, Title: Enhancements to multibeam operation.
R1-1909210 3GPP TSG RAN WG1 Meeting #98, Prague, Czech Republic, Aug. 26-30, 2019, Source: Nokia, Nokia Shanghai Bell, Title: Enhancements on Multi-beam Operation.
R1-1909202 3GPP TSG RAN WG1 Meeting #98, Prague, Czech Republic, Aug. 26-30, 2019, Source: NTT DOCOMO, Inc, Title: Discussion on multi-beam enhancement.
R1-1909048 3GPP TSG RAN WG1 Meeting #98, Prague, Czech Republic, Aug. 26-30, 2019, Source: Apple Inc., Title: Remaining Issues on Multi-beam operation.
R1-1908975 3GPP TSG RAN WG1 Meeting #98, Prague, Czech Republic, Aug. 26-30, 2019, Source: Panasonic, Title: On enhancements for multi-beam operations for NR MIMO in Rel. 16.
R1-1908973 3GPP TSG RAN WG1 Meeting #98, Prague, Czech Republic, Aug. 26-30, 2019, Source: Fraunhofer IIS, Fraunhofer HHI, Title: Enhancements on UE multi-beam operation.
R1-1908959 3GPP TSG RAN WG1 Meeting #98, Prague, Czech Republic, Aug. 26-30, 2019, Source: Spreadtrum Communications, Title: Discussion on multi-beam operation.
R1-1908928 3GPP TSG RAN WG1 Meeting #98, Prague, Czech Republic, Aug. 26-30, 2019, Source: Asia Pacific Telecom, Title: Discussion on Multi-beam Operations.
R1-1908886 3GPP TSG RAN WG1 Meeting #98, Prague, Czech Republic, Aug. 26-30, 2019, Source: China Telecom, Title: Enhancements on multi-beam operation.
R1-1908870 3GPP TSG RAN WG1 Meeting #98, Prague, Czech Republic, Aug. 26-30, 2019, Source: CMCC, Title: Enhancements on multi-beam operation.
R1-1908784 3GPP TSG RAN WG1 Meeting #98, Prague, Czech Republic, Aug. 26-30, 2019, Source: Sony, Title: Enhancements on multi-beam operation.
R1-1908721 3GPP TSG RAN WG1 Meeting #97, Reno, USA, May 13-17, 2019, Source: Lenovo, Motorola Mobility, Title: Discussion of multi-beam operation.
R1-1908700 3GPP TSG RAN WG1 Meeting #98, Prague, Czech Republic, Aug. 26-30, 2019, Source: LG Electronics, Title: Discussion on multi-beam based operations and enhancements.
R1-1908654 3GPP TSG RAN WG1 Meeting #98, Prague, Czech Republic, Aug. 26-30, 2019, Source: Intel Corporation, Title: Discussion on multi-beam enhancements.
R1-1908603 3GPP TSG RAN WG1 Meeting #98, Prague, Czech Republic, Aug. 26-30, 2019, Source: CATT, Title: Considerations on multi-beam enhancements.
R1-1908502 3GPP TSG RAN WG1 Meeting #98, Prague, Czech Republic, Aug. 26-30, 2019, Source: Samsung, Title: Enhancements on multi-beam operations.
R1-1908352 3GPP TSG RAN WG1 Meeting #98, Prague, Czech Republic, Aug. 26-30, 2019, Source: OPPO, Title: Discussion on Multi-beam Operation Enhancements.
R1-1908192 3GPP TSG RAN WG1 Meeting #98, Prague, Czech Republic, Aug. 26-30, 2019, Source: ZTE, Title: Enhancements on multi-beam operation.
R1-1908167 3GPP TSG RAN WG1 Meeting #98, Prague, Czech Republic, Aug. 26-30, 2019, Source: vivo, Title: Enhancements on Multi-TRP and Multi-panel Transmission.
R1-1908067 3GPP TSG RAN WG1 Meeting #98, Prague, Czech Republic, Aug. 26-30, 2019, Source: Huawei, HiSilicon, Title: Enhancements on multi-beam operation.
R1-1810886 3GPP TSG-RAN WG1 Meeting #94bis, Chengdu, PR China, Oct. 8-12, 2018, Source: Samsung, Title: Enhancements on multi-beam operations.
3GPP TS 38.331 V15.9.0 (Mar. 2020) 3rd Generation Partnership Project; Technical Specification Group Radio Access Network; NR; Radio Resource Control (RRC) protocol specification (Release 15).
3GPP TS 38.321 V15.8.0 (Dec. 2019), Technical Specification, 3rd Generation Partnership Project; Technical Specification Group Radio Access Network; NR; Medium Access Control (MAC) protocol specification (Release 15).
3GPP TS 38.214 V16.0.0 (Dec. 2019) 3rd Generation Partnership Project; Technical Specification Group Radio Access Network; NR; Physical layer procedures for data (Release 16).
3GPP TS 38.213 V16.0.0 (Dec. 2019) 3rd Generation Partnership Project; Technical Specification Group Radio Access Network; NR; Physical layer procedures for control (Release 16).
3GPP TS 38.212 V16.0.0 (Dec. 2019), 3rd Generation Partnership Project; Technical Specification Group Radio Access Network; NR; Multiplexing and channel coding (Release 16).

\* cited by examiner

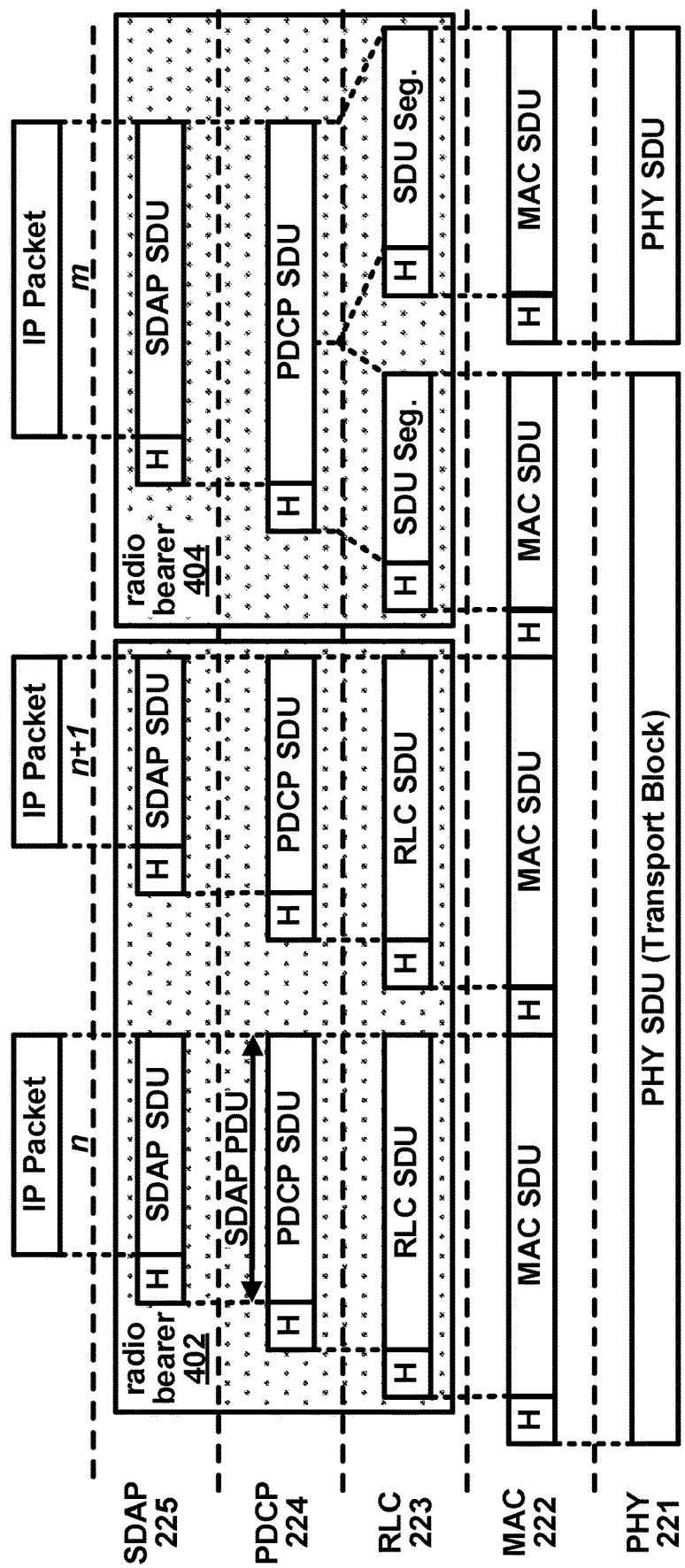
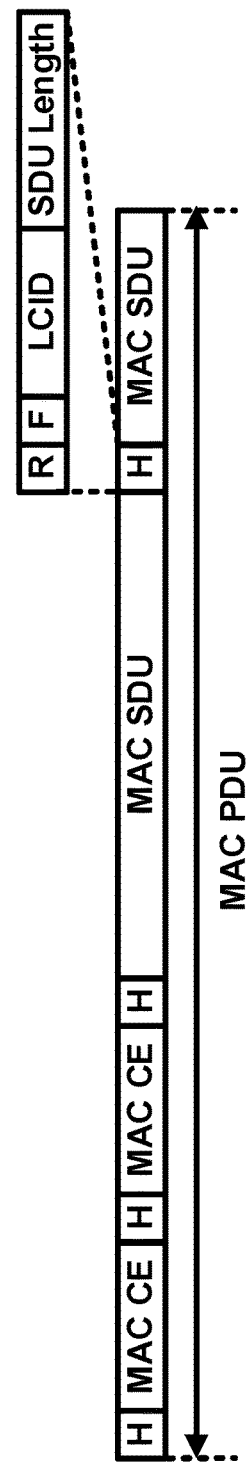
FIG. 4A
FIG. 4B

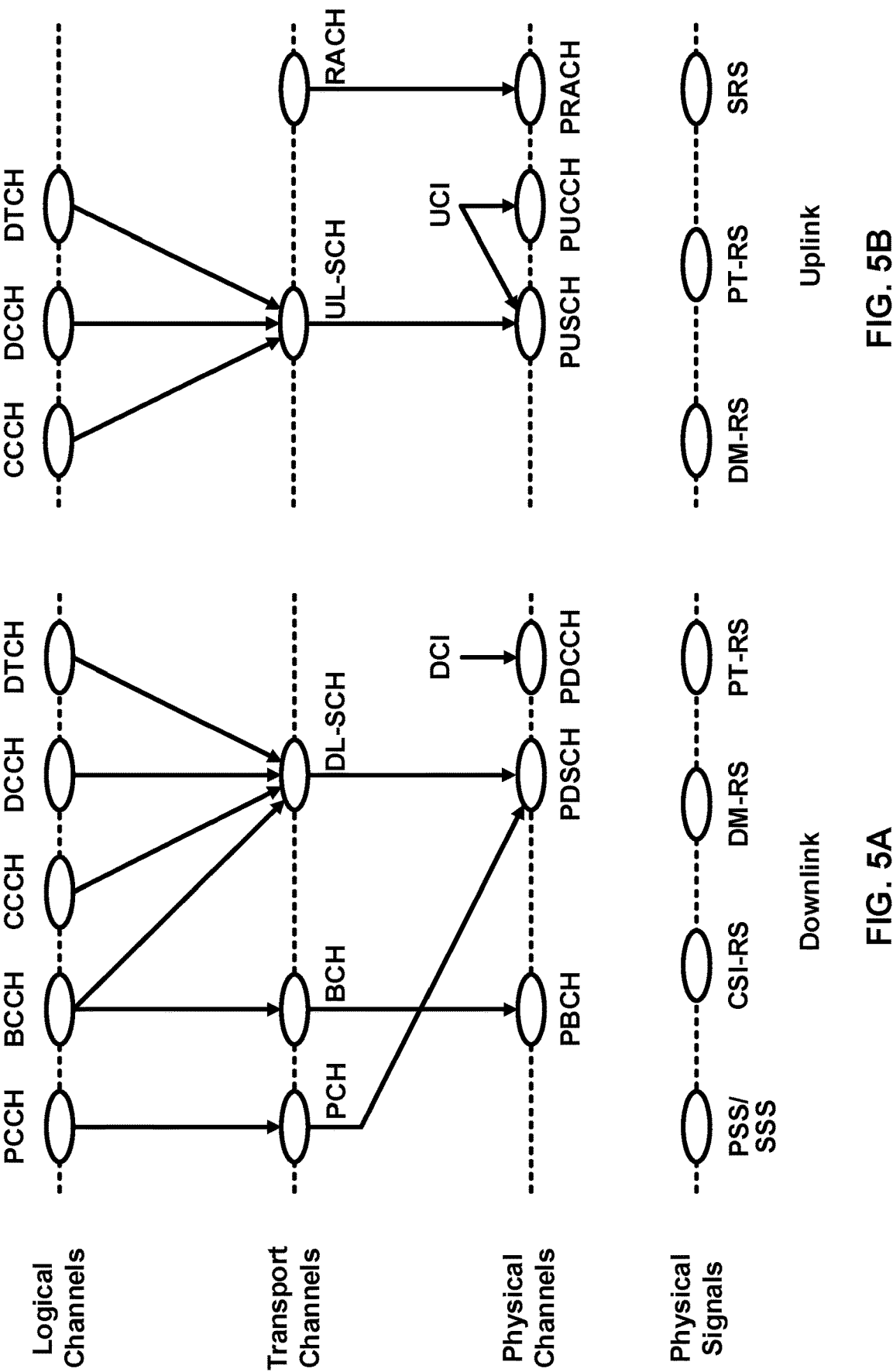

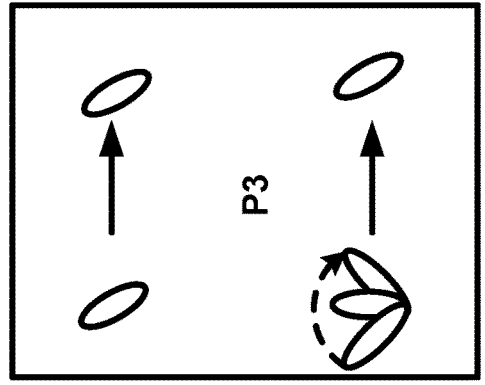
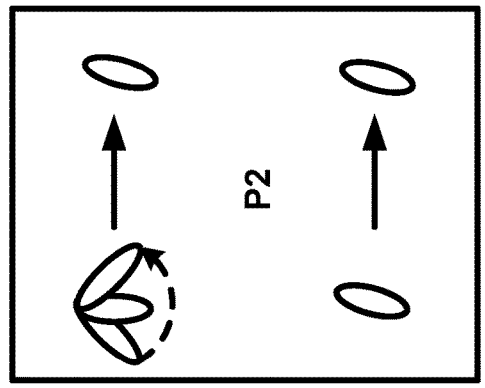
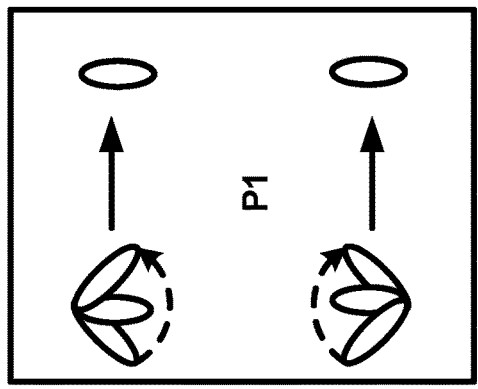
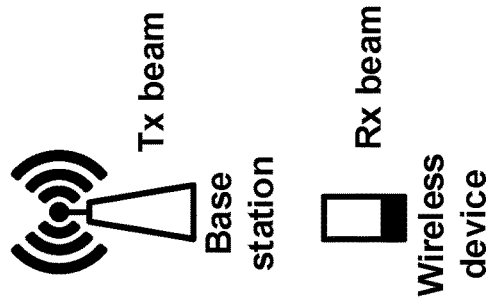
FIG. 12A
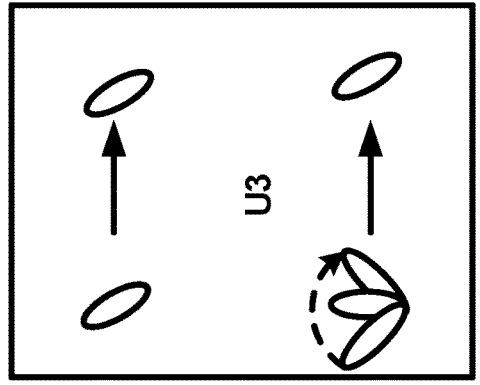
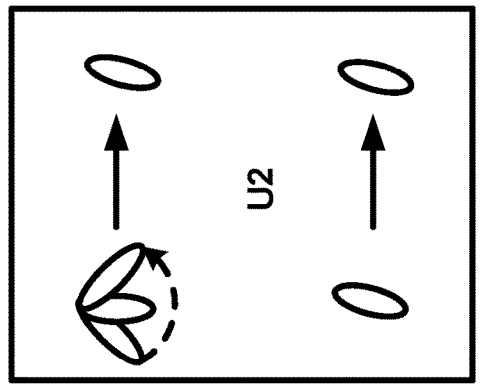
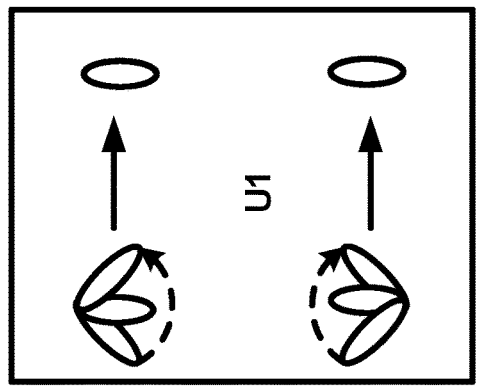
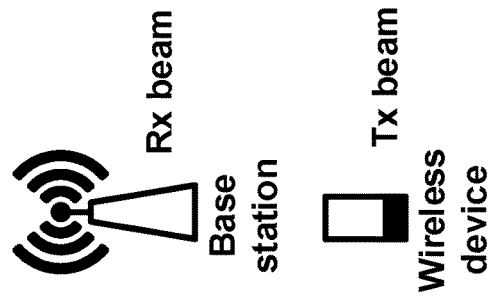
FIG. 12B

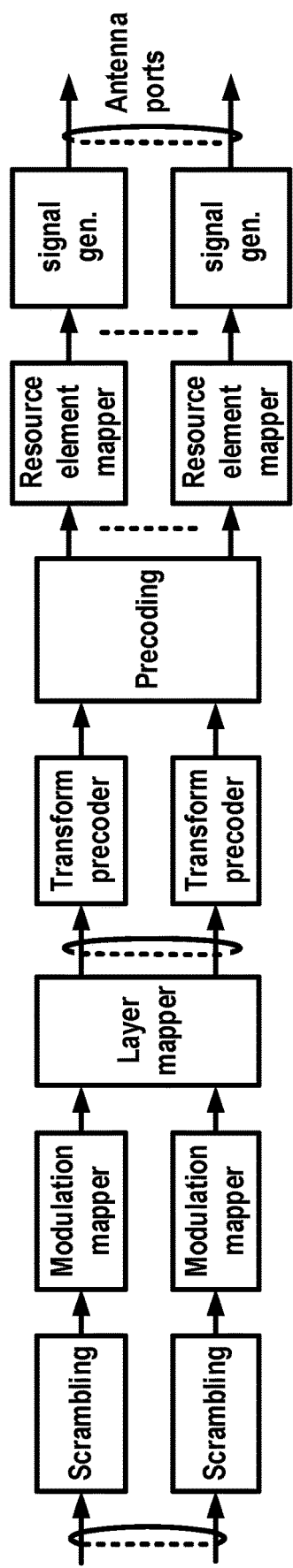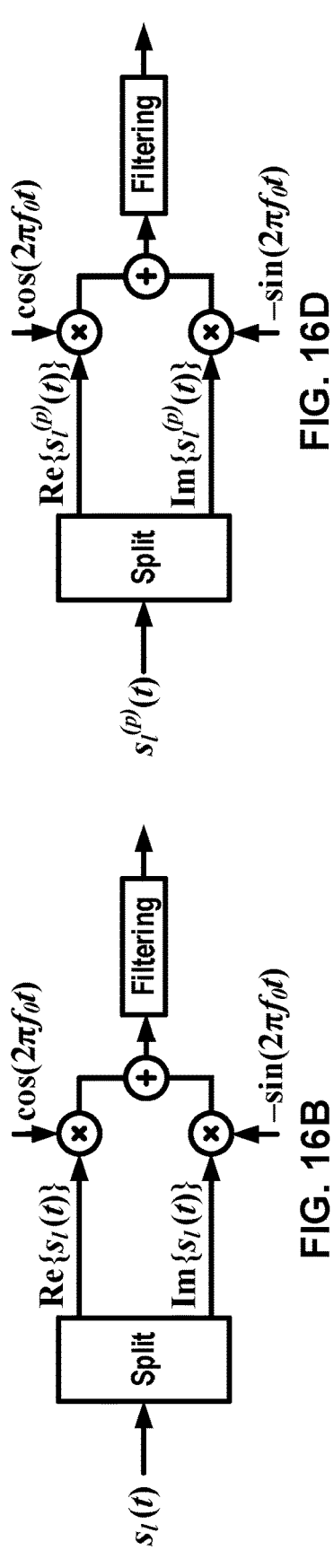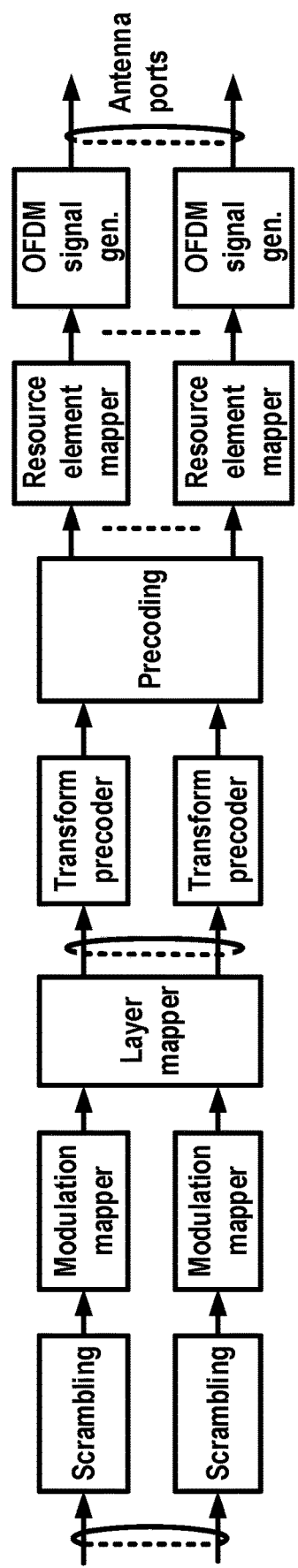
FIG. 16A
FIG. 16B
FIG. 16C
FIG. 16D

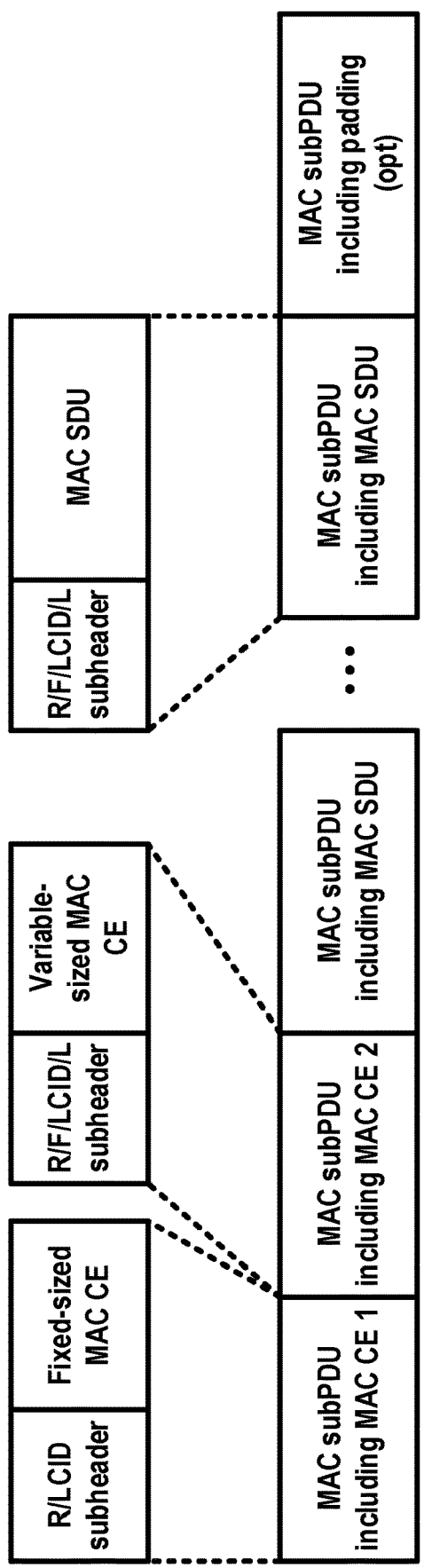
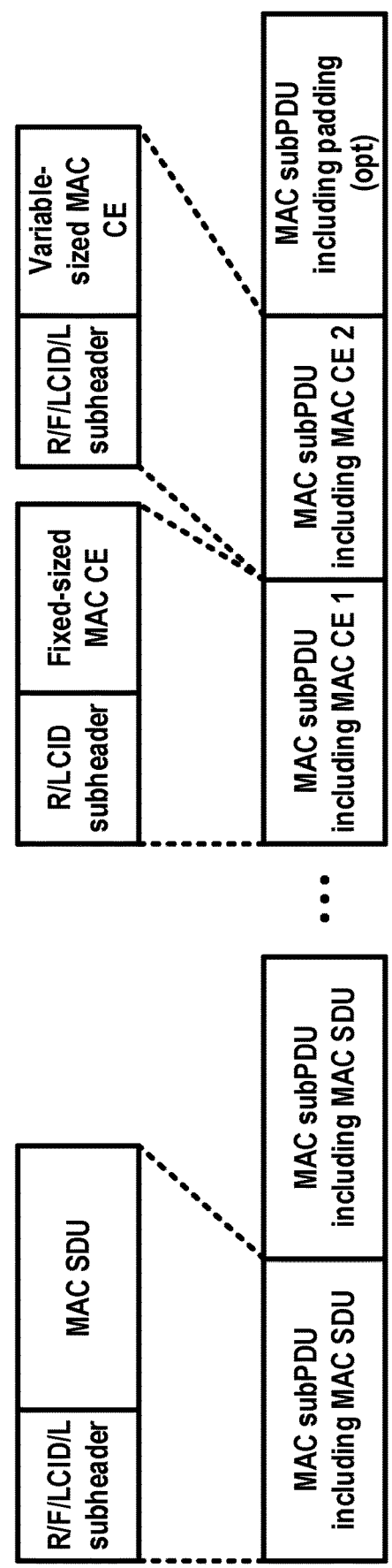
FIG. 18A
FIG. 18B

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

– *ServingCellConfig*
The IE *ServingCellConfig* is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.

*ServingCellConfig* information element

```
ServingCellConfig ::=   SEQUENCE {
  tdd-UL-DL-ConfigurationDedicated  TDD-UL-DL-ConfigDedicated OPTIONAL, -- Cond TDD
  initialDownlinkBWP     BWP-DownlinkDedicated       OPTIONAL,  -- Need M
  downlinkBWP-ToReleaseList  SEQUENCE (SIZE (1..maxNrofBWPs)) OF BWP-Id OPTIONAL, -- Need N
  downlinkBWP-ToAddModList   SEQUENCE (SIZE (1..maxNrofBWPs)) OF BWP-Downlink   OPTIONAL,  -- Need N
  firstActiveDownlinkBWP-Id  BWP-Id  OPTIONAL,  -- Cond SyncAndCellAdd
  bwp-InactivityTimer    ENUMERATED {ms2, ...} OPTIONAL,  -- Need R
  defaultDownlinkBWP-Id  BWP-Id  OPTIONAL,  -- Need S
  ...
  sCellDeactivationTimer ENUMERATED {ms20, ms40, ...}  OPTIONAL,  -- Cond ServingCellWithoutPUCCH
  crossCarrierSchedulingConfig  CrossCarrierSchedulingConfig OPTIONAL, -- Need M
  tag-Id
  pathlossReferenceLinking ENUMERATED {spCell, sCell} OPTIONAL, -- Cond CellOnly ...,}
```

– *CrossCarrierSchedulingConfig*
The IE *CrossCarrierSchedulingConfig* is used to specify the configuration when the cross-carrier scheduling is used in a cell.

***CrossCarrierSchedulingConfig* information element**

```
CrossCarrierSchedulingConfig ::=  SEQUENCE {
  schedulingCellInfo    CHOICE {
    own       SEQUENCE {         -- Cross carrier scheduling: scheduling cell
      cif-Presence    BOOLEAN
    },
    other     SEQUENCE {         -- Cross carrier scheduling: scheduled cell
      schedulingCellId    ServCellIndex,
      cif-InSchedulingCell  INTEGER (1..7)  } },  ...}
```

FIG. 23A

– SearchSpace
The IE *SearchSpace* defines how/where to search for PDCCH candidates. Each search space is associated with one *ControlResourceSet*. For a scheduled cell in the case of cross carrier scheduling, except for *nrofCandidates*, all the optional fields are absent.

SearchSpace information element

```
SearchSpace ::=           SEQUENCE {
    searchSpaceId         SearchSpaceId,
    controlResourceSetId  ControlResourceSetId  OPTIONAL,  -- Cond SetupOnly
    monitoringSlotPeriodicityAndOffset  CHOICE {
        sl1                NULL,
        sl2                INTEGER (0..1)
        ...
    }                                              OPTIONAL,  -- Cond Setup
    duration              INTEGER (2..2559)        OPTIONAL,  -- Need R
    monitoringSymbolsWithinSlot  BIT STRING (SIZE (14))  OPTIONAL, -- Cond Setup
    nrofCandidates        SEQUENCE {
        aggregationLevel1  ENUMERATED {n0, n1, n2, n3, n4, n5, n6, n8},
        ...
    }                                              OPTIONAL,  -- Cond Setup
    searchSpaceType       CHOICE {
        common             SEQUENCE {
            ...
        }                                          SEQUENCE {  dci-Format0-0-AndFormat1-0   SEQUENCE {
            ...
        }  OPTIONAL,  -- Need R
        ue-Specific        SEQUENCE {
            dci-Formats   ENUMERATED {formats0-0-And-1-0, formats0-1-And-1-1},
        }
    }  OPTIONAL  -- Cond Setup
}
```

*searchSpaceId*
Identity of the search space. SearchSpaceId = 0 identifies the *searchSpaceZero* configured via PBCH (MIB) or *ServingCellConfigCommon* and may hence not be used in the *SearchSpace* IE. The *searchSpaceId* is unique among the BWPs of a Serving Cell. In case of cross carrier scheduling, search spaces with the same *searchSpaceId* in scheduled cell and scheduling cell are linked to each other. The UE applies the search space for the scheduled cell only if the DL BWPs in which the linked search spaces are configured in scheduling cell and scheduled cell are both active.

FIG. 23B

— *ControlResourceSet*

The IE *ControlResourceSet* is used to configure a time/frequency control resource set (CORESET) in which to search for downlink control information.

```
ControlResourceSet ::=        SEQUENCE {
    controlResourceSetId          ControlResourceSetId,
    frequencyDomainResources      BIT STRING (SIZE (45)),
    duration                      INTEGER (1..maxCoReSetDuration),
    tci-StatesPDCCH-ToAddList     SEQUENCE(SIZE (1..maxNrofTCI-StatesPDCCH)) OF TCI-StateId OPTIONAL, -- Cond NotSIB1-initialBWP
    tci-PresentInDCI              ENUMERATED {enabled}                                                 OPTIONAL, -- Need S
    ...}
``` controlResourceSetId

Value 0 identifies the common CORESET configured in *MIB* and in *ServingCellConfigCommon* (*controlResourceSetZero*) and is hence not used here in the *ControlResourceSet* IE. Values 1..*maxNrofControlResourceSets-1* identify CORESETs configured by dedicated signalling or in *SIB1*. The *controlResourceSetId* is unique among the BWPs of a serving cell.

duration

Contiguous time duration of the CORESET in number of symbols.

frequencyDomainResources

Frequency domain resources for the CORESET. Each bit corresponds a group of 6 RBs, with grouping starting from the first RB group in the BWP. The first (left-most / most significant) bit corresponds to the first RB group in the BWP, and so on.....

tci-PresentInDCI

This field indicates if TCI field is present or absent in DL-related DCI. When the field is absent the UE considers the TCI to be absent/ disabled. In case of cross carrier scheduling, the network sets this field to enabled for the *ControlResourceSet* used for cross carrier scheduling in the scheduling cell.

tci-StatesPDCCH-ToAddList

A subset of the TCI states defined in pdsch-Config included in the *BWP-DownlinkDedicated* corresponding to the serving cell and to the DL BWP to which the *ControlResourceSet* belong to. They are used for providing QCL relationships between the DL RS(s) in one RS Set (TCI-State) and the PDCCH DMRS ports. The network configures at most *maxNrofTCI-StatesPDCCH* entries.

FIG. 23C

| Signal/channel identifier | One or more target signals/channels |
|---|---|
| '00000' | PDSCH |
| '00001' | PUSCH |
| '00010' | PDCCH |
| '00011' | PUCCH |
| '00100' | PDCCH with a CORESET#$i$ |
| '00101' | PUCCH resource group#$j$ |
| '00110' | CSI-RS |
| '00111' | SRS |
| '01000' | CSI-RS resource set#$k$ |
| '01001' | SRS resource set#$l$ |
| '01010' | PDSCH, PUSCH, PUCCH |
| '01011' | PUSCH, PDCCH with a CORESET#$i$, SRS |
| '01100' | PDSCH, PDCCH with a CORESET#$i$, CSI-RS, SRS resource set#$l$ |
| '01101' | PDCCH with a CORESET#$i_2$, PUCCH resource group#$j_1$, PUCCH resource group#$j_2$ |
| '01110' | PDSCH, PUSCH, PDCCH, PUCCH, CSI-RS, SRS |
| '01111' | PUSCH, PUCCH, SRS resource set#$l$ |
| ... | ... |

FIG. 32

| Fields for Validation of identifying a control command | Field values |
|---|---|
| HARQ process number | Set to all '0's |
| Redundancy version | Set to '00' |
| New data indicator | Set to '0' |
| Time domain resource assignment | Set to all '0' |
| frequency domain resource assignment | Set to all '0' |

FIG. 35

TRANSMISSION CONFIGURATION AND TIMING FOR WIRELESS COMMUNICATIONS

CROSS-REFERENCE TO RELATED APPLICATIONS

This application is a continuation of and claims priority to U.S. patent application Ser. No. 17/219,993, filed Apr. 1, 2021, which claims priority to U.S. Provisional Application No. 63/004,966, filed on Apr. 3, 2020, each of which is hereby incorporated by reference in its entirety.

BACKGROUND

A base station and a wireless device communicate via uplink and/or downlink communications. The base station indicates transmission configuration indication states to the wireless device for an uplink or downlink channel.

SUMMARY

The following summary presents a simplified summary of certain features. The summary is not an extensive overview and is not intended to identify key or critical elements.

Wireless devices may communicate via one or more channels. A beam indication may be used for scheduling reception of a downlink transmission or for scheduling an uplink transmission, but requiring a separate beam indication for each downlink and/or each uplink transmission, and/or relying upon a potentially undesirable default beam, may result in increased signal overhead and/or a loss of beam flexibility for multi-beam operation. By using a beam indication for a plurality of downlink transmission(s) and/or uplink transmission(s), advantages may be achieved such as improved beam flexibility and/or reduced signaling overhead. One or more indications/lists of signals and/or channels may be provided in one or more configuration parameters. A transmission configuration indicator (TCI) state may be indicated, and/or one or more indications of at least some of the plurality of signals and/or channels which may associate the TCI state with the indicated signals and/or channels may be indicated. A wireless device may use the indicated TCI state to determine a spatial domain filter for downlink reception and/or uplink transmission of the indicated signals and/or channels. An acknowledgement message may be used to indicate that the wireless device correctly received the message. An indicated TCI state may be applied for downlink transmission(s) and/or uplink transmission(s) after a time period that may be based on a time of receiving the indication and/or based on a time of sending an acknowledgement.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A shows an example downlink data flow for a user plane configuration.

FIG. 4B shows an example format of a Medium Access Control (MAC) subheader in a MAC Protocol Data Unit (PDU).

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 18A and FIG. 18B show example MAC PDUs.

FIG. 19 shows example LCID values.

FIG. 20 shows example LCID values.

FIG. 23A shows an example message comprising configuration parameters for a cell.

FIG. 23B shows an example message comprising configuration parameters for a search space.

FIG. 23C shows an example message comprising configuration parameters for a control resource set (CORESET).

FIG. 32 shows an example of a signal/channel identifier.

FIG. 35 shows an example for validation of a control command.

DETAILED DESCRIPTION

Figure 1A:
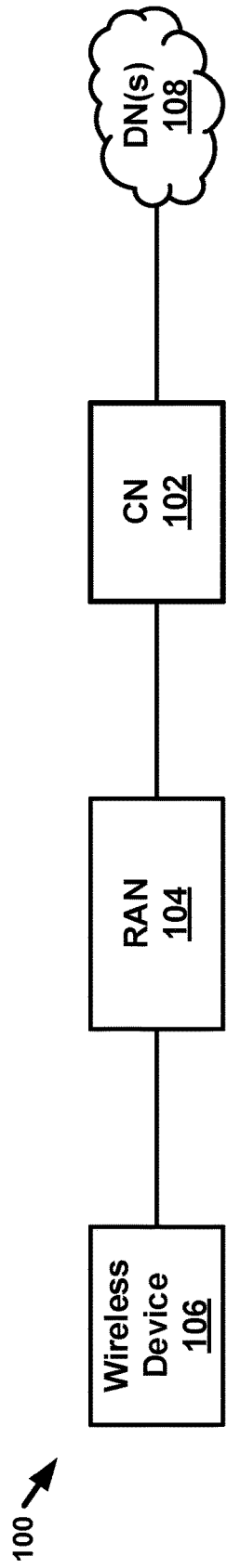
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communications for transmissions using a beam.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
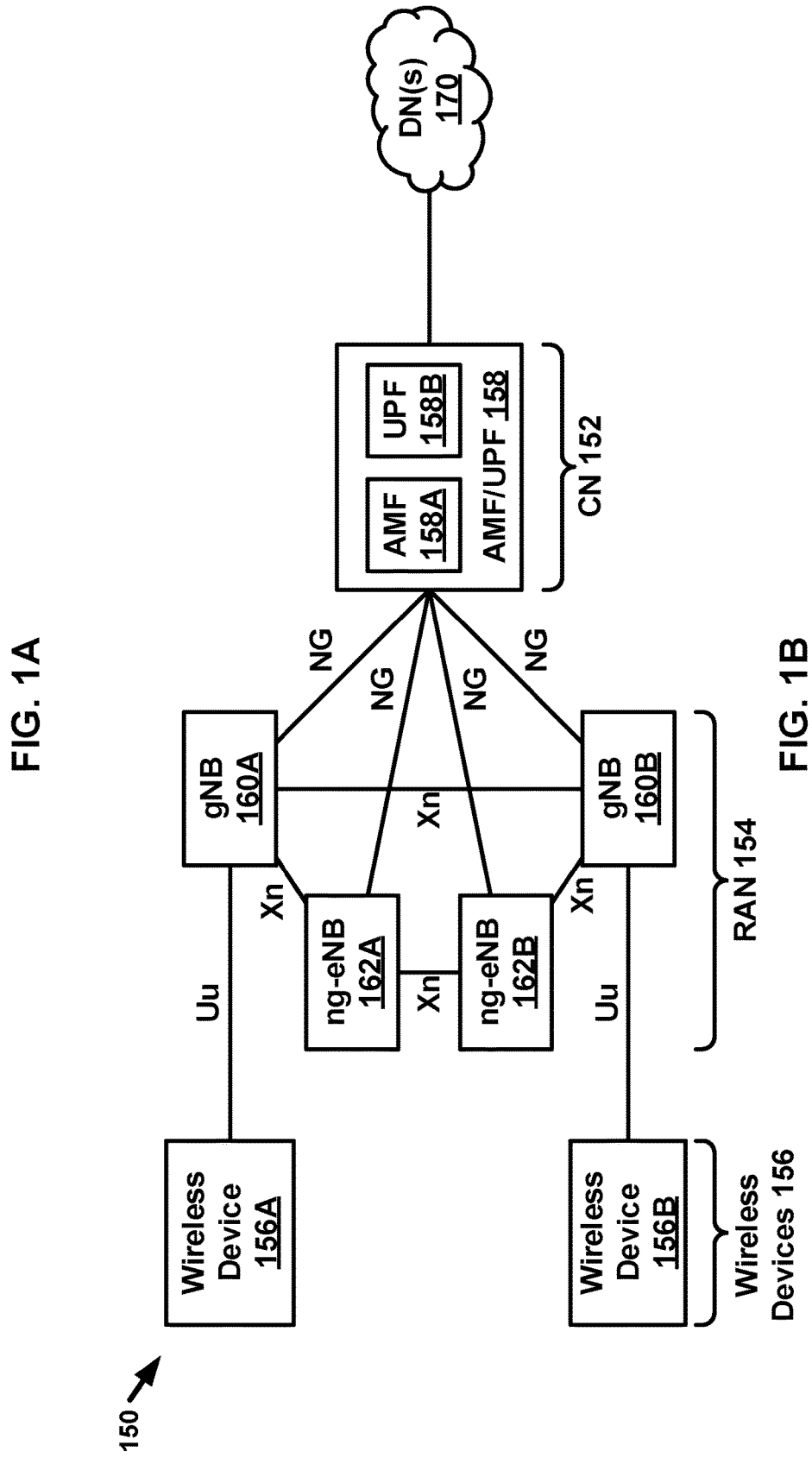

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
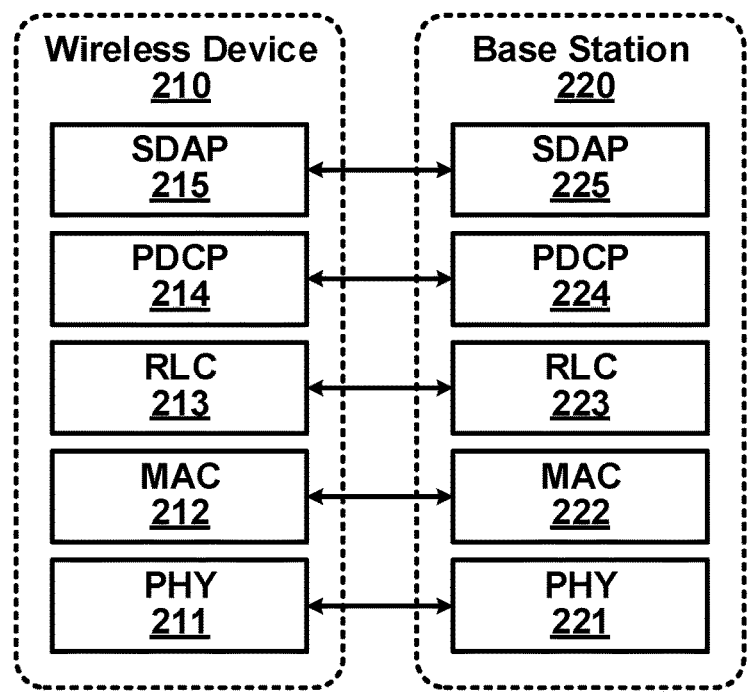
FIG. 2A shows an example user plane.
Figure 2B:
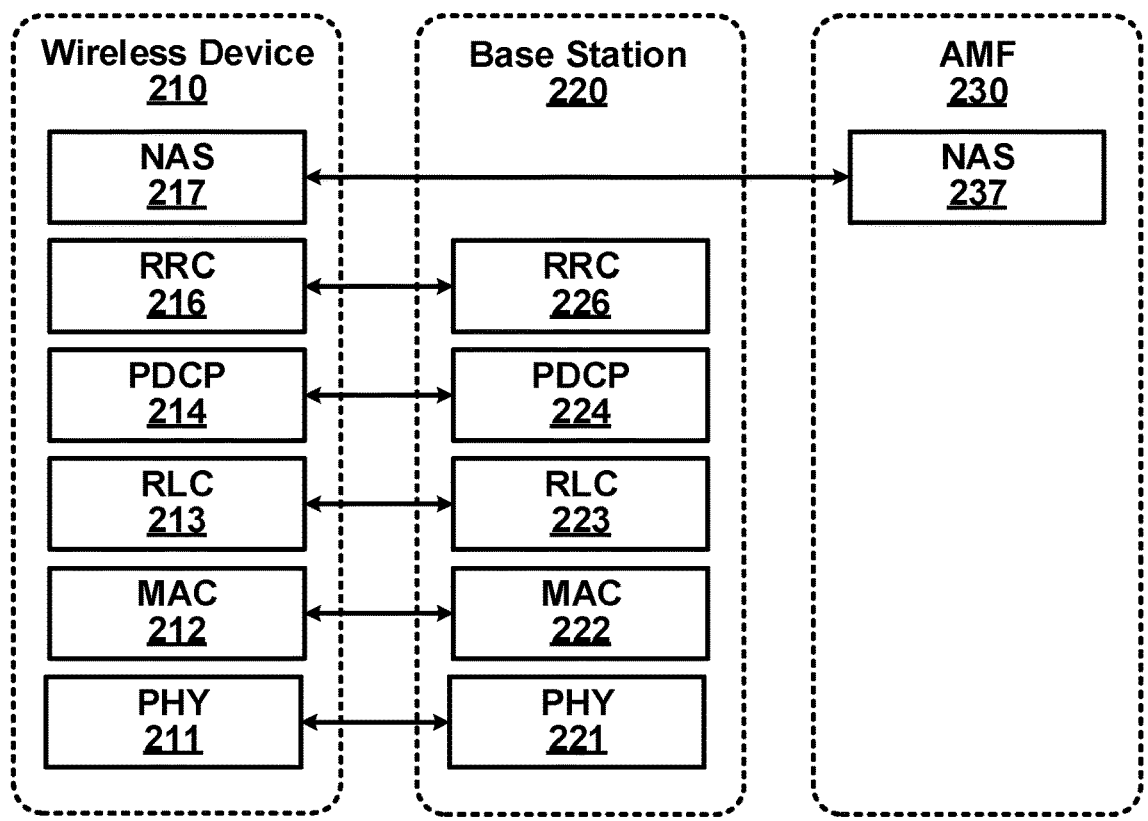
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
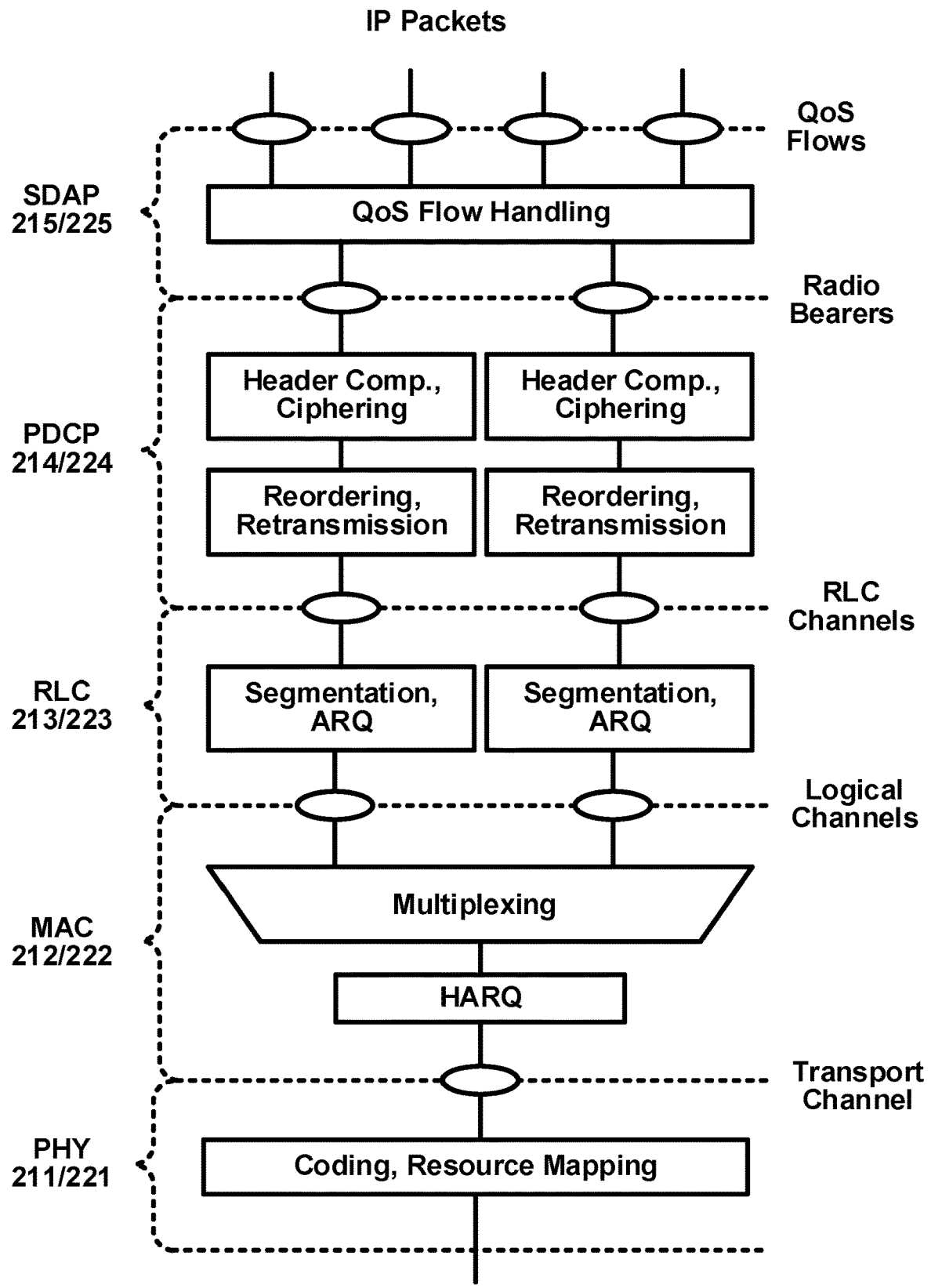
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
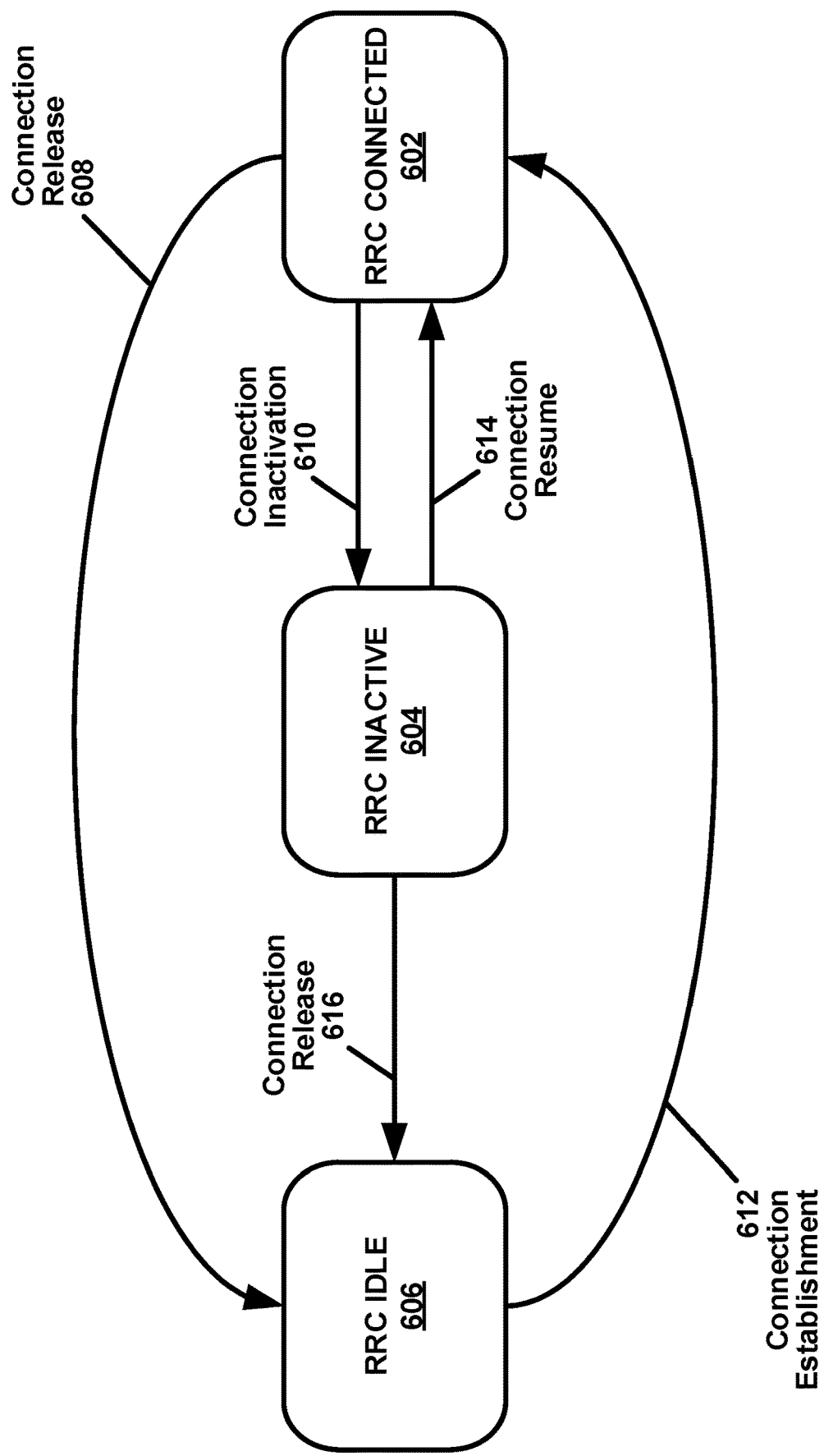
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
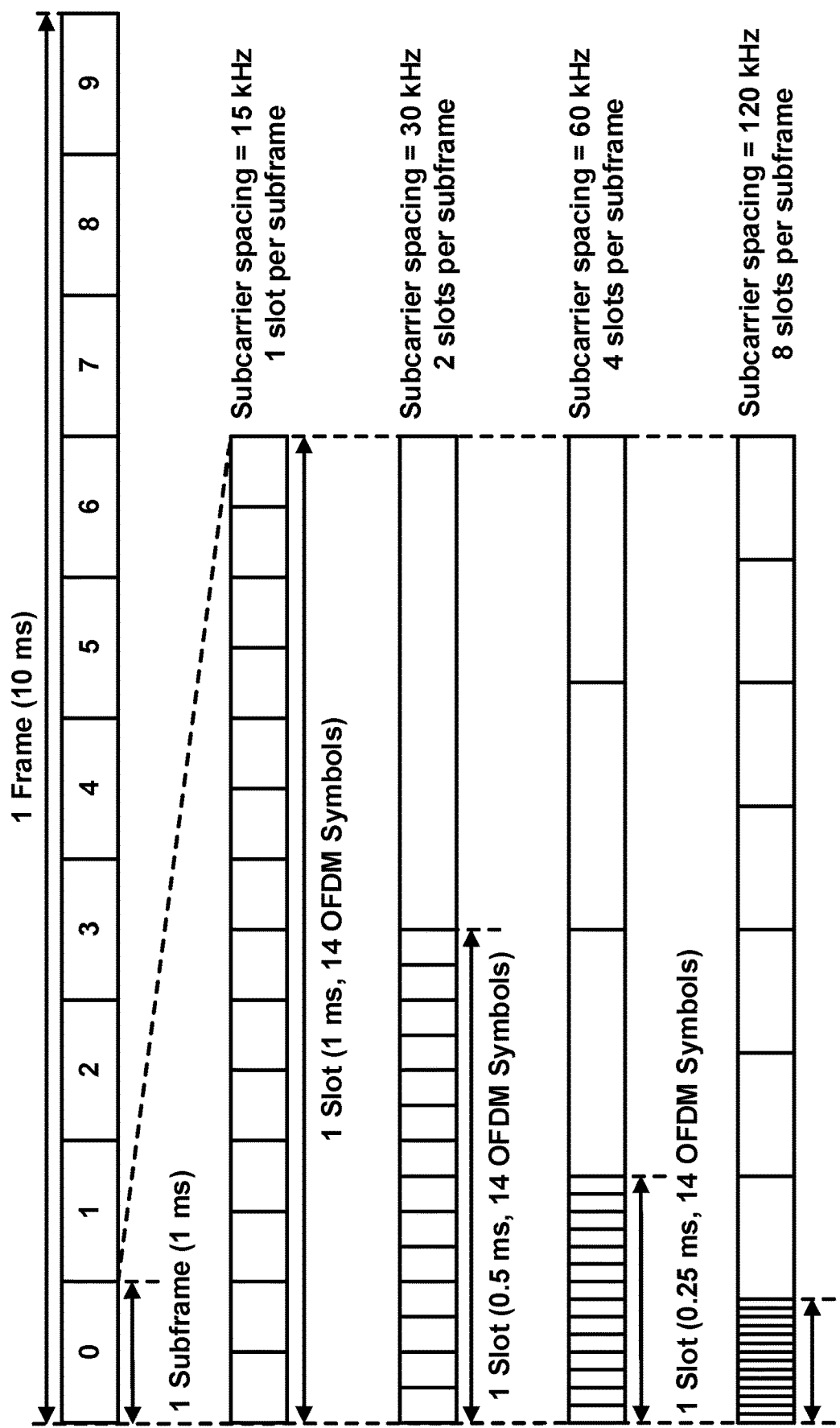
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 s, for example, for a numerology in an NR configuration or any other radio configurations. Numerologies may be defined with the following subcarrier spacing/cyclic prefix duration combinations: 15 kHz/4.7 s; 30 kHz/2.3 s; 60 kHz/1.2 s; 120 kHz/0.59 s; 240 kHz/0.29 s, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
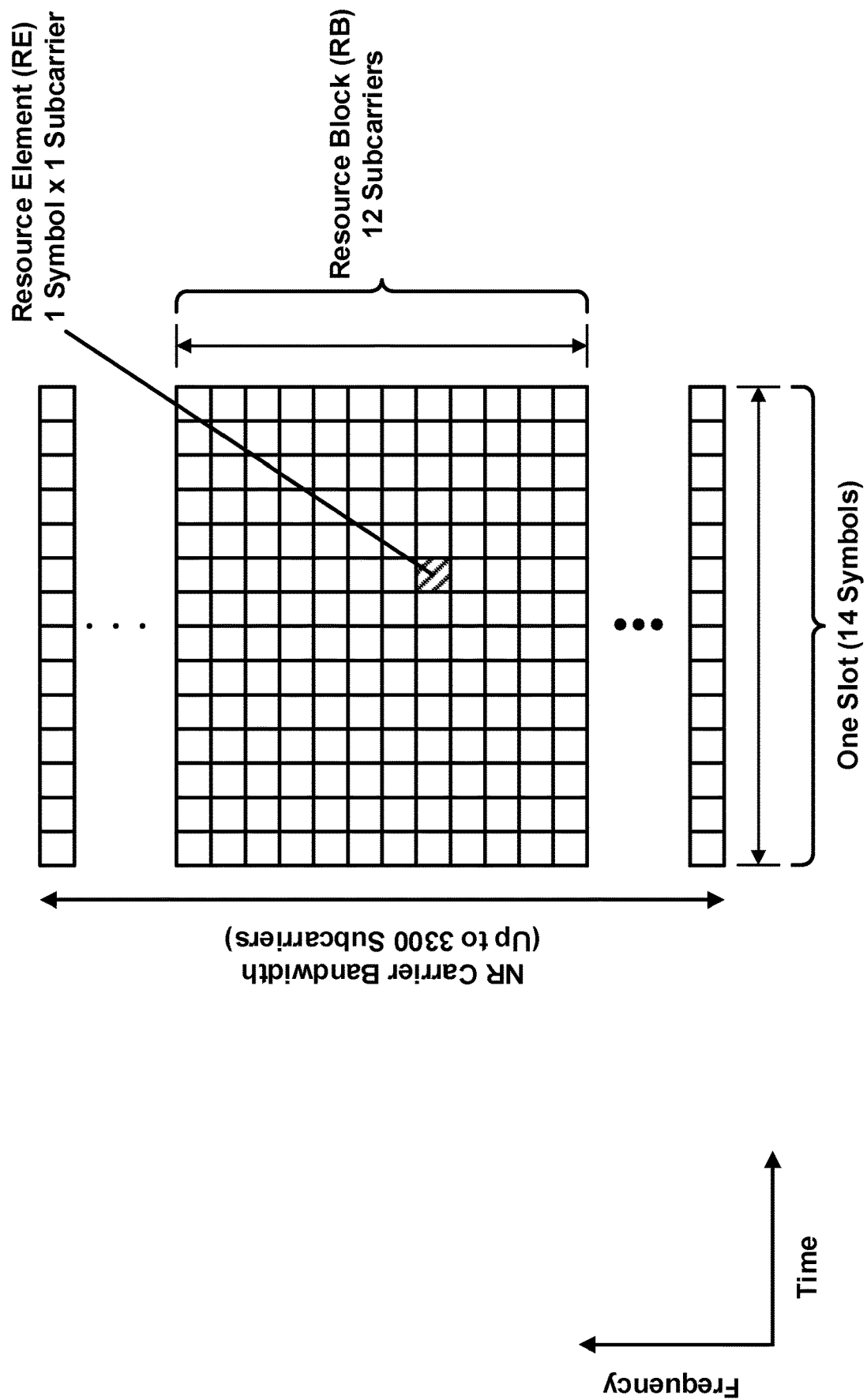
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORSETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
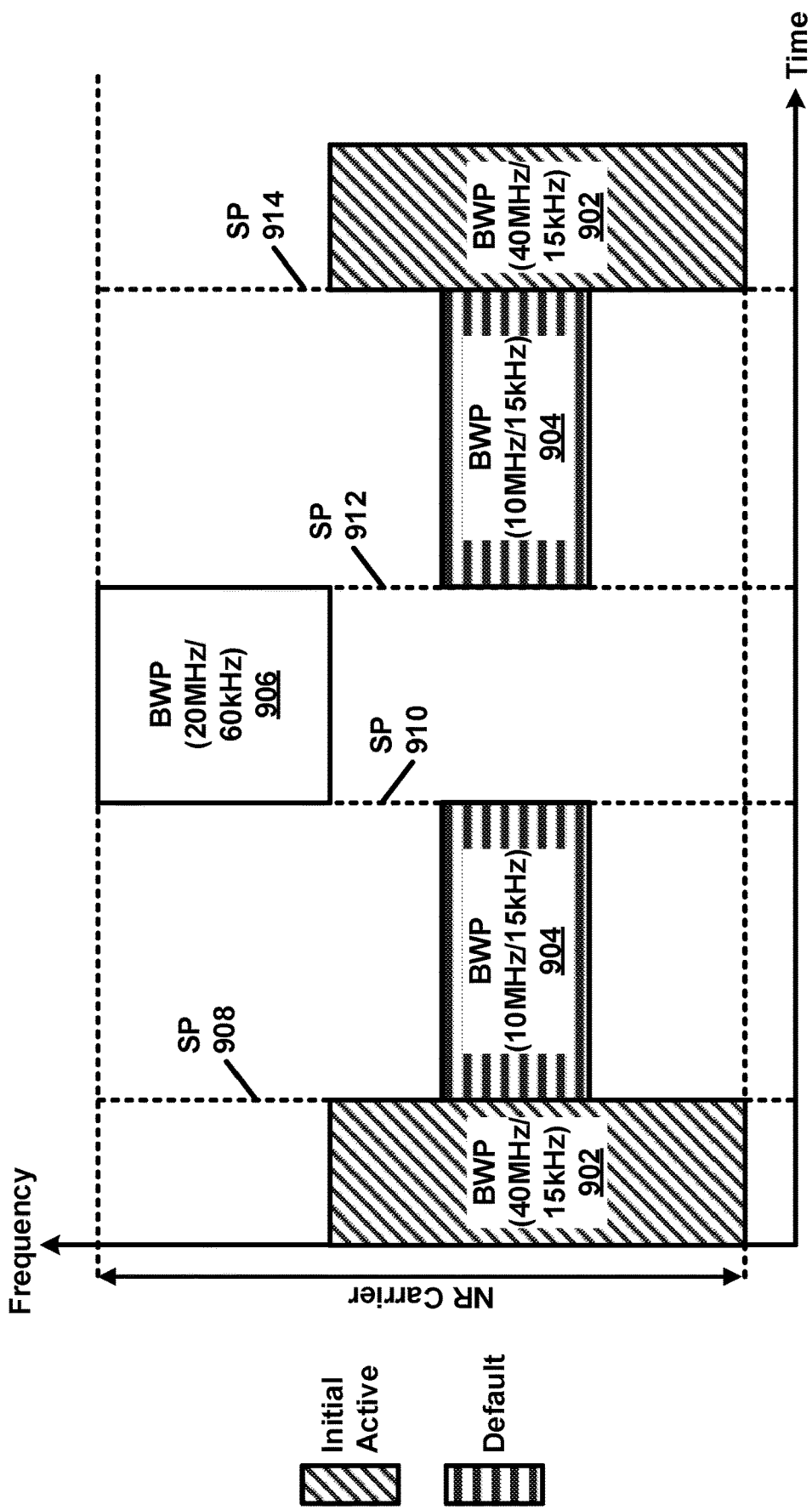
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
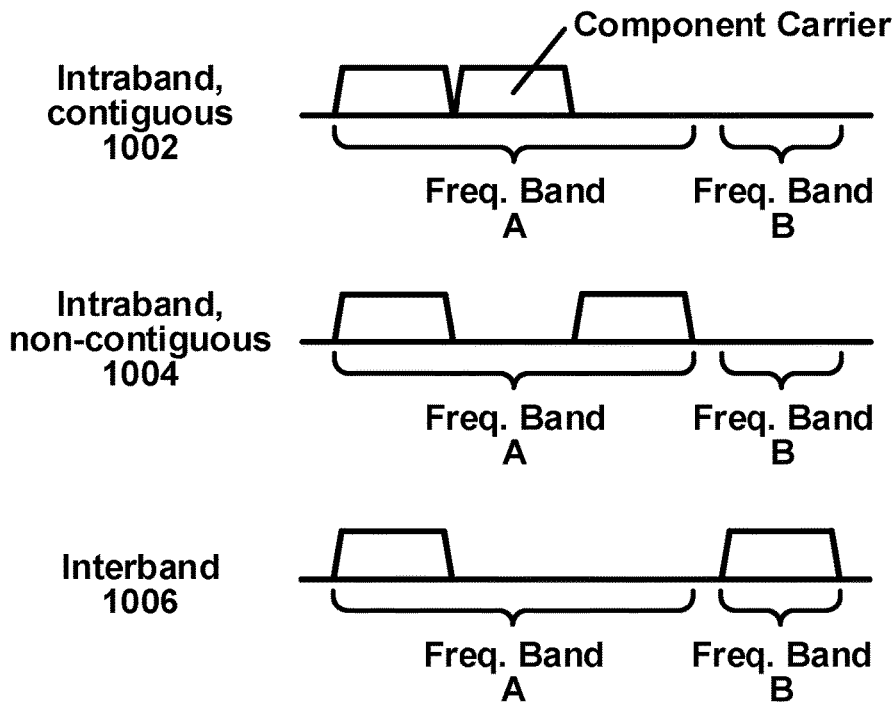
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell.

Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
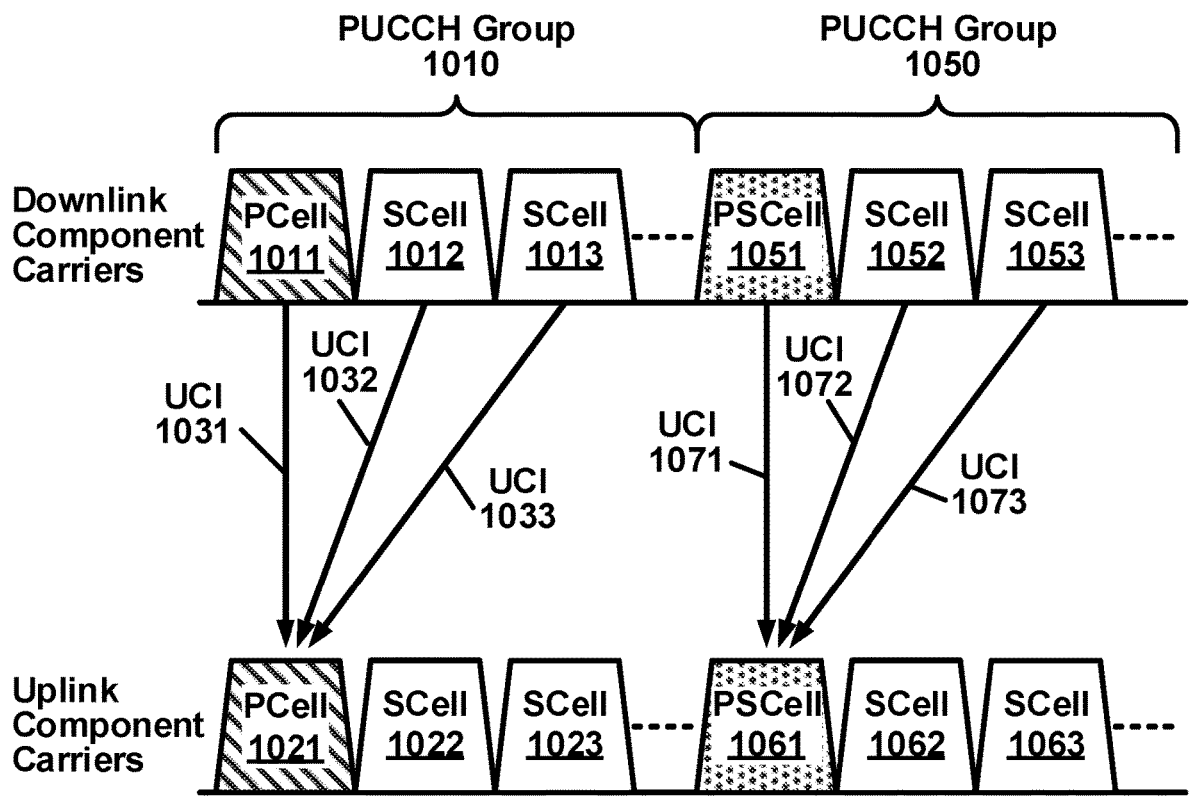
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
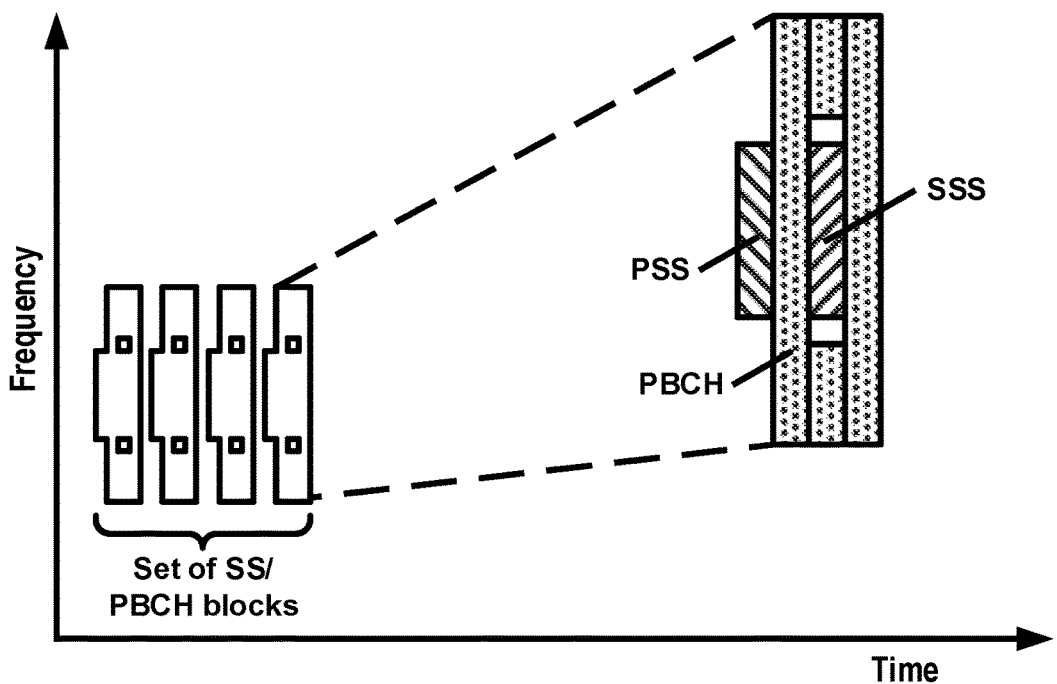
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A)

and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
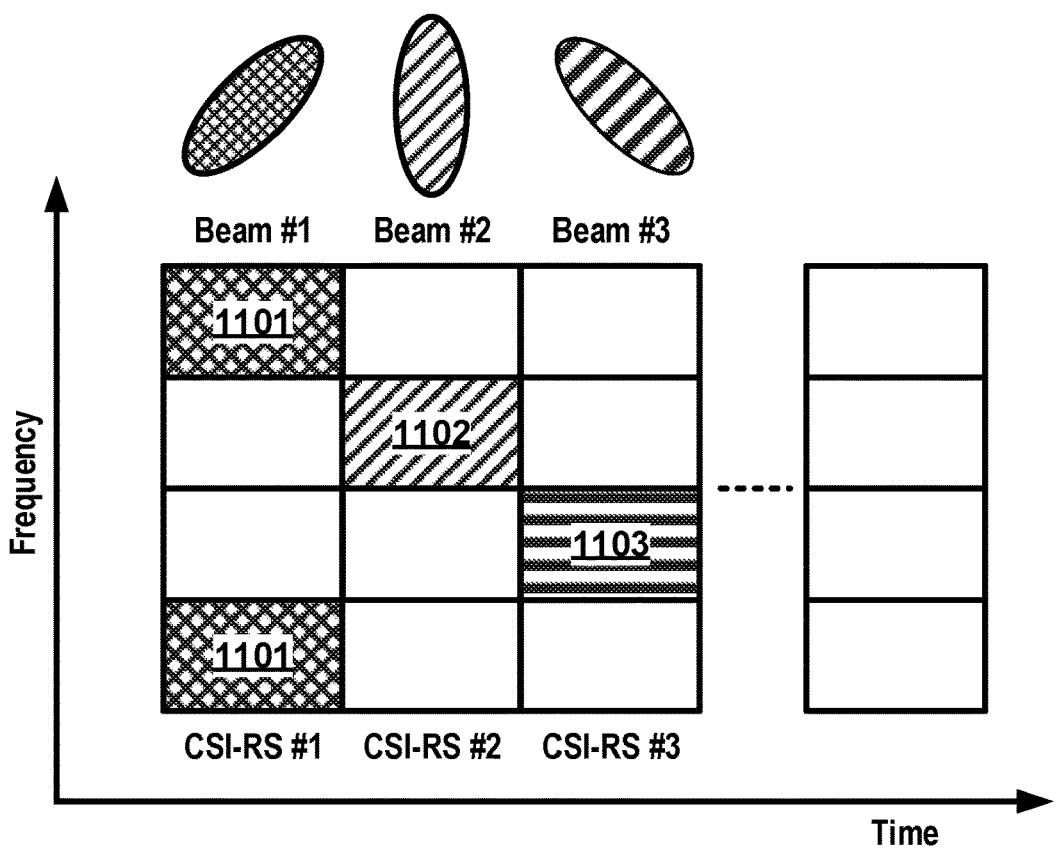
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
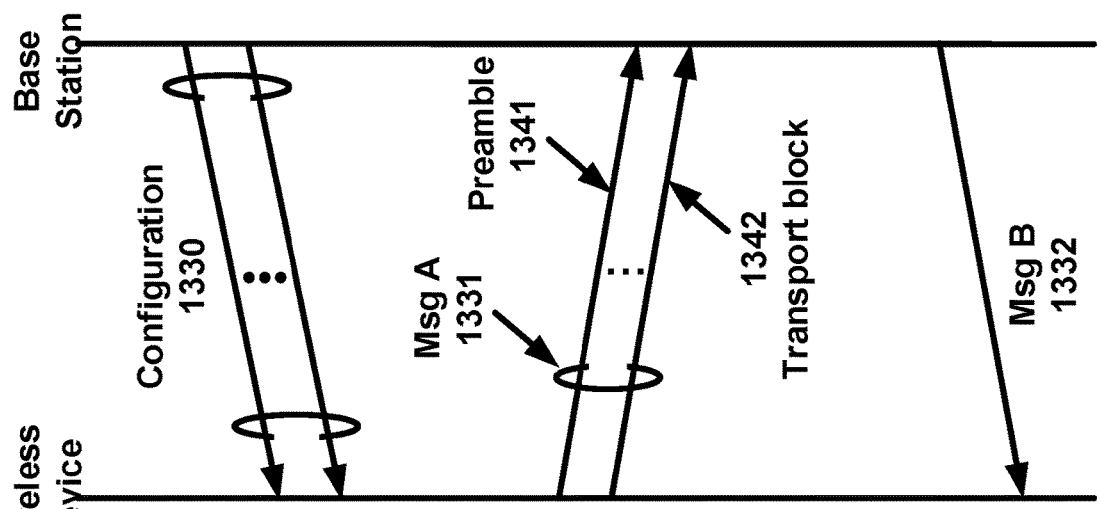
FIG. 13C shows an example two-step random access procedure.
Figure 13B:
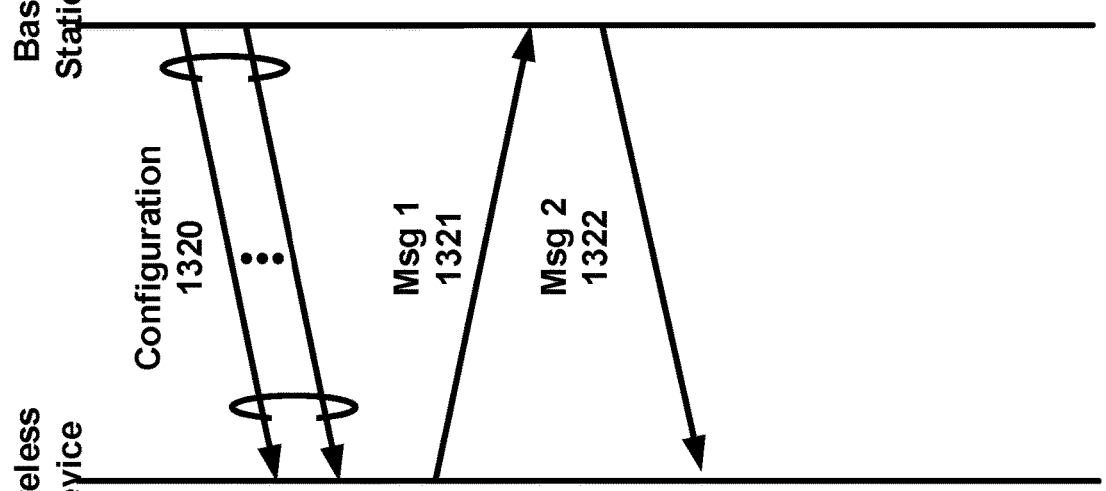
FIG. 13B shows an example two-step random access procedure.
Figure 13A:
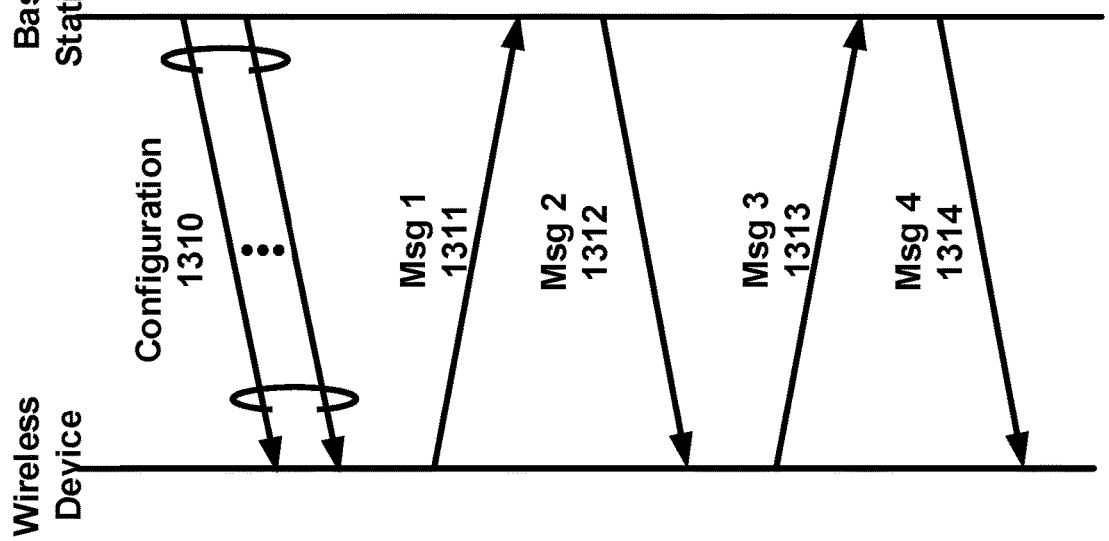
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI} = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
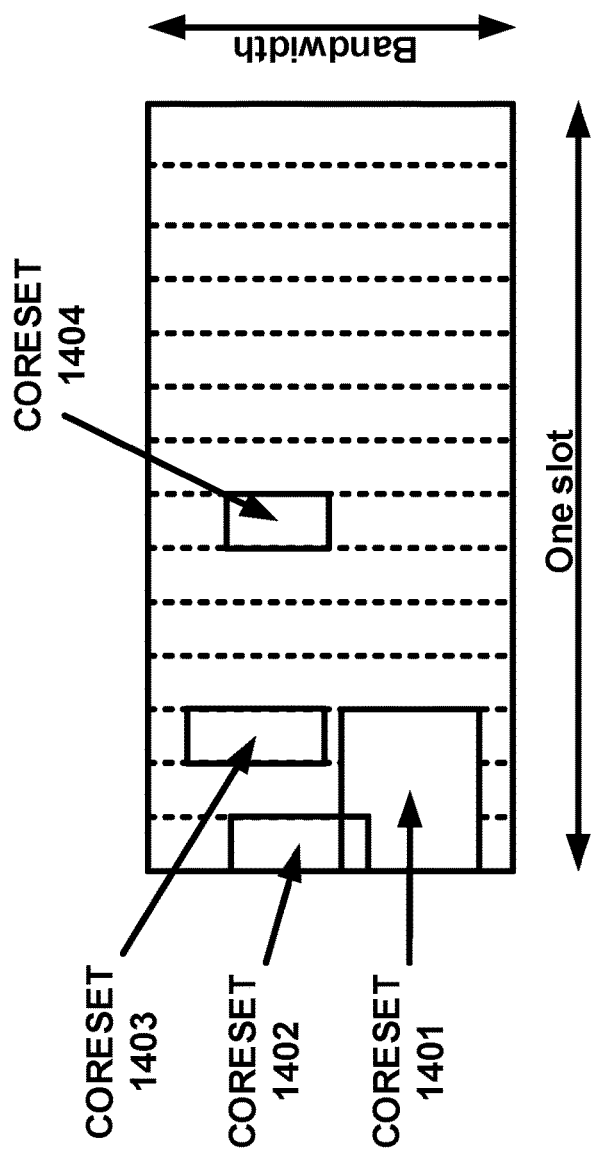
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
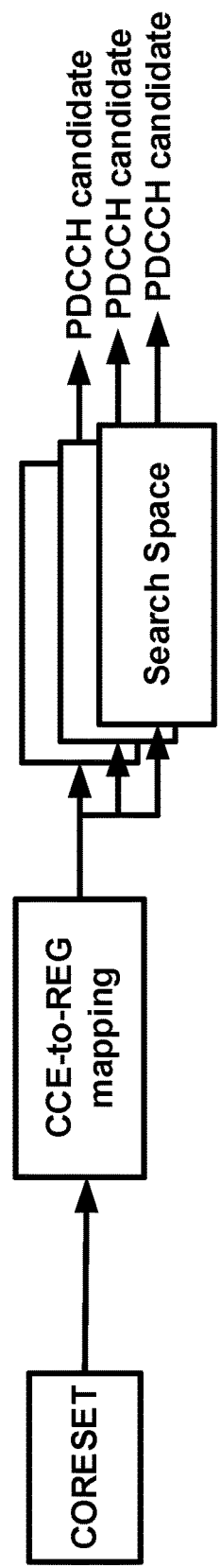
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
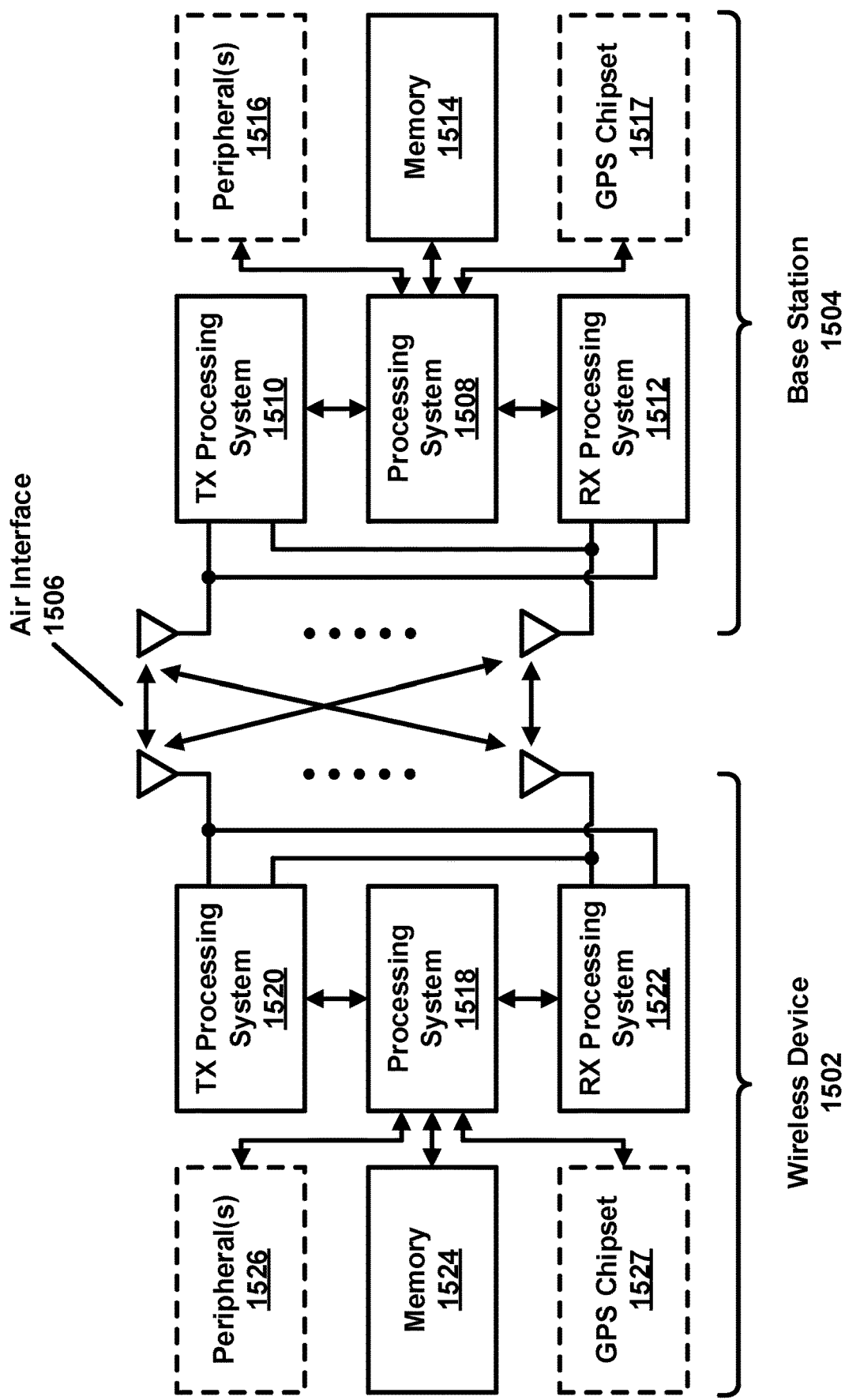
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
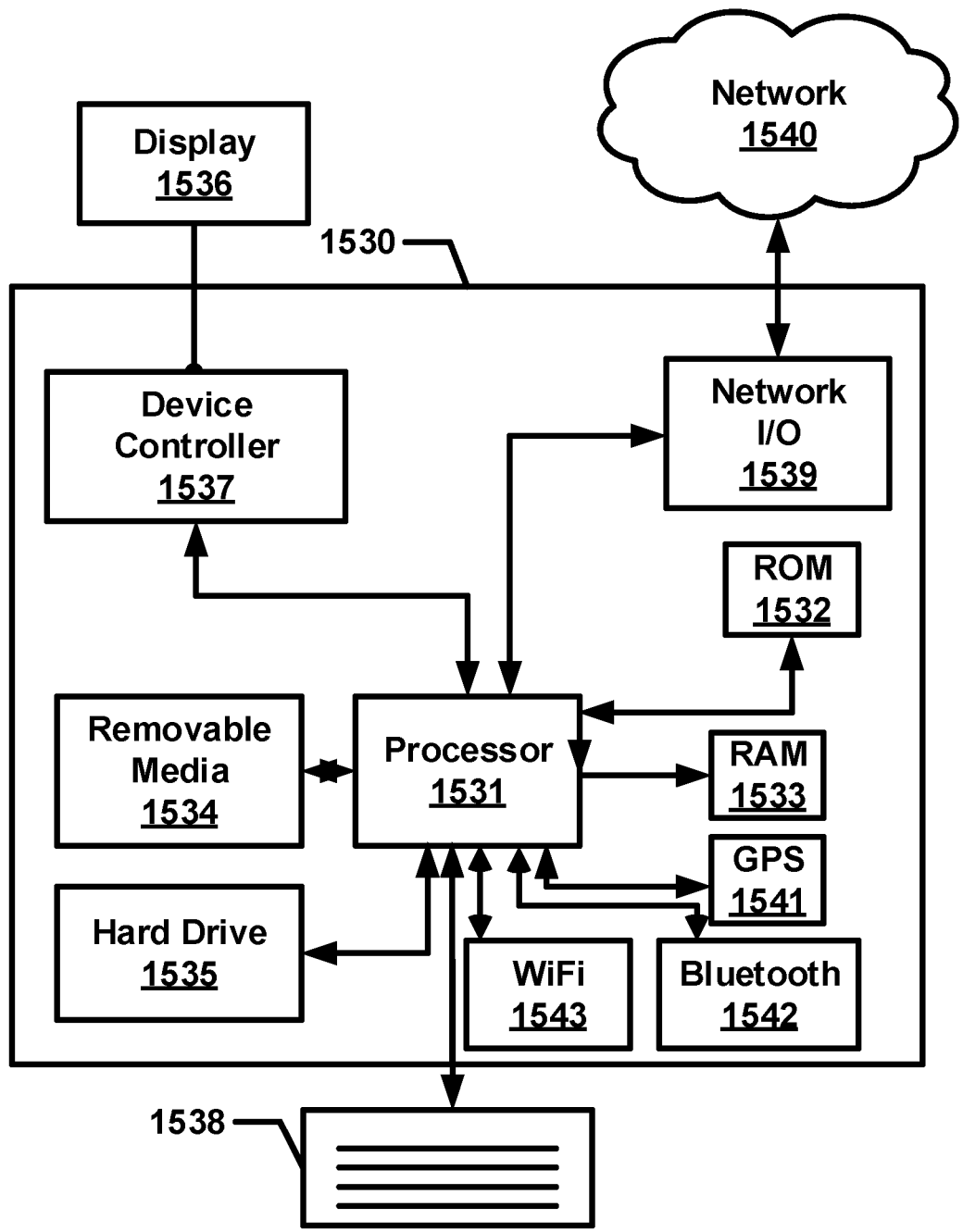
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc.

The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may communicate with a wireless device via a wireless network (e.g., a communication network). The communications may use/employ one or more radio technologies (e.g., new radio technologies, legacy radio technologies, and/or a combination thereof). The one or more radio technologies may comprise at least one of: one or multiple technologies related to a physical layer; one or multiple technologies related to a medium access control layer; and/or one or multiple technologies related to a radio resource control layer. One or more enhanced radio technologies described herein may improve performance of a wireless network. System throughput, transmission efficiencies of a wireless network, and/or data rate of transmission may be improved, for example, based on one or more configurations described herein. Battery consumption of a wireless device may be reduced, for example, based on one or more configurations described herein. Latency of data transmission between a base station and a wireless device may be improved, for example, based on one or more configurations described herein. A network coverage of a wireless network may increase, for example, based on one or more configurations described herein.

A base station may send/transmit one or more MAC PDUs to a wireless device. A MAC PDU may be a bit string that is byte aligned (e.g., a multiple of eight bits) in length. Bit strings may be represented by one or more tables in which the most significant bit may be the leftmost bit of the first line of a table, and the least significant bit may be the rightmost bit on the last line of the table. The bit string may be read from left to right and then in the reading order of the lines (e.g., from the topmost line of the table to the bottommost line of the table). The bit order of a parameter field within a MAC PDU may be represented with the first and most significant bit in the leftmost bit and the last and least significant bit in the rightmost bit.

A MAC SDU may be a bit string that is byte aligned (e.g., a multiple of eight bits) in length. A MAC SDU may be comprised in a MAC PDU from the first bit onward. A MAC CE may be a bit string that is byte aligned (e.g., a multiple of eight bits) in length. A MAC subheader may be a bit string that is byte aligned (e.g., a multiple of eight bits) in length. A MAC subheader may be placed immediately in front of a corresponding MAC SDU, MAC CE, or padding. A wireless device (e.g., the MAC entity of the wireless device) may ignore a value of reserved bits in a downlink (DL) MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, or padding.

A MAC subheader may comprise: an R field with a one-bit length; an F field with a one-bit length; an LCID field with a multi-bit length; and/or an L field with a multi-bit length, for example, if the MAC subheader corresponds to a MAC SDU, a variable-sized MAC CE, or padding.

Figure 17A:
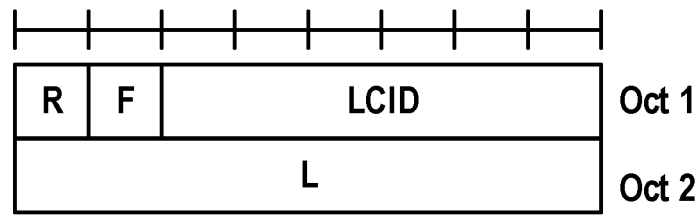
FIG. 17A, FIG. 17B, and FIG. 17C show example MAC subheaders.
Figure 17B:
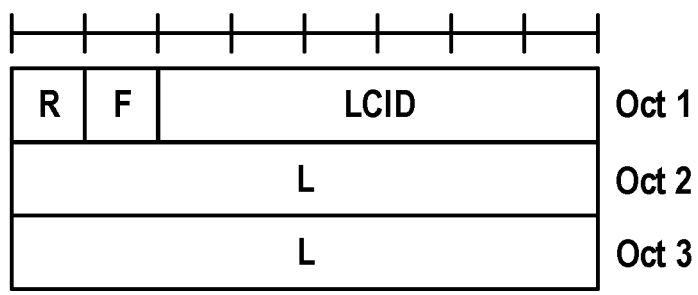
Figure 17C:
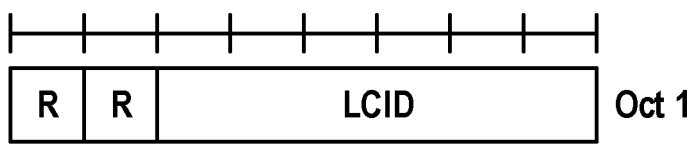

FIG. 17A shows an example of a MAC subheader. The MAC subheader may comprise an R field, an F field, an LCID field, and/or an L field. The LCID field may be six bits in length (or any other quantity of bits). The L field may be eight bits in length (or any other quantity of bits). Each of the R field and the F field may be one bit in length (or any other quantity of bits). FIG. 17B shows an example of a MAC subheader. The MAC subheader may comprise an R field, an F field, an LCID field, and/or an L field. Similar to the MAC subheader shown in FIG. 17A, the LCID field may be six bits in length (or any other quantity of bits), the R field may be one bit in length (or any other quantity of bits), and the F field may be one bit in length (or any other quantity of bits). The L field may be sixteen bits in length (or any other quantity of bits, such as greater than sixteen bits in length). A MAC subheader may comprise: an R field with a two-bit length (or any other quantity of bits) and/or an LCID field with a multi-bit length (or single bit length), for example, if the MAC subheader corresponds to a fixed sized MAC CE or padding. FIG. 17C shows an example of a MAC subheader. In the example MAC subheader shown in FIG. 17C, the LCID field may be six bits in length (or any other quantity of bits), and the R field may be two bits in length (or any other quantity of bits).

FIG. 18A shows an example of a MAC PDU (e.g., a DL MAC PDU). Multiple MAC CEs, such as MAC CE 1 and 2 shown in FIG. 18A, may be placed together (e.g., located within the same MAC PDU). A MAC subPDU comprising a MAC CE may be placed (e.g., located within a MAC PDU) before any MAC subPDU comprising a MAC SDU or a MAC subPDU comprising padding. MAC CE 1 may be a fixed-sized MAC CE that follows a first-type MAC subheader. The first-type MAC subheader may comprise an R field and an LCID field (e.g., similar to the MAC CE shown in FIG. 17C). MAC CE 2 may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

FIG. 18B shows an example of a MAC PDU (e.g., a UL MAC PDU). Multiple MAC CEs, such as MAC CE 1 and 2 shown in FIG. 18B, may be placed together (e.g., located within the same MAC PDU). A MAC subPDU comprising a MAC CE may be placed (e.g., located within a MAC PDU) after all MAC subPDUs comprising a MAC SDU. The MAC subPDU and/or the MAC subPDU comprising a MAC CE may be placed (e.g., located within a MAC PDU) before a MAC subPDU comprising padding. Similar to the MAC CEs shown in FIG. 18A, MAC CE 1 shown in FIG. 18B may be a fixed-sized MAC CE that follows a first-type MAC subheader. The first-type MAC subheader may comprise an R field and an LCID field (e.g., similar to the MAC CE shown in FIG. 17C). Similar to the MAC CEs shown in FIG. 18A, MAC CE 2 shown in FIG. 18B may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

A base station (e.g., the MAC entity of a base station) may send/transmit one or more MAC CEs to a wireless device (e.g., a MAC entity of a wireless device). FIG. 19 shows example LCID values. The LCID values may be associated with one or more MAC CEs. The LCID values may be associated with a downlink channel, such as a DL-SCH. The one or more MAC CEs may comprise at least one of: an semi-persistent zero power CSI-RS (SP ZP CSI-RS) Resource Set Activation/Deactivation MAC CE, a PUCCH spatial relation Activation/Deactivation MAC CE, an SP SRS Activation/Deactivation MAC CE, an SP CSI reporting on PUCCH Activation/Deactivation MAC CE, a TCI State Indication for wireless device-specific (e.g., UE-specific) PDCCH MAC CE, a TCI State Indication for wireless device-specific (e.g., UE-specific) PDSCH MAC CE, an Aperiodic CSI Trigger State Subselection MAC CE, an SP CSI-RS/CSI interference measurement (CSI-IM) Resource Set Activation/Deactivation MAC CE, a wireless device (e.g., UE) contention resolution identity MAC CE, a timing advance command MAC CE, a DRX command MAC CE, a Long DRX command MAC CE, an SCell activation/deactivation MAC CE (e.g., 1 Octet), an SCell activation/deactivation MAC CE (e.g., 4 Octet), and/or a duplication activation/deactivation MAC CE. A MAC CE, such as a MAC CE sent/transmitted by a base station (e.g., a MAC entity of a base station) to a wireless device (e.g., a MAC entity of a wireless device), may be associated with (e.g., correspond to) an LCID in the MAC subheader corresponding to the MAC CE. Different MAC CEs may correspond to a different LCID in the MAC subheader corresponding to the corresponding MAC CE. An LCID having an index value "111011" in a MAC subheader may indicate that a MAC CE associated with the MAC subheader is a long DRX command MAC CE, for example, for a MAC CE associated with the downlink.

A wireless device (e.g., a MAC entity of a wireless device) may send/transmit to a base station (e.g., a MAC entity of a base station) one or more MAC CEs. FIG. 20 shows an example LCID values that may be associated with the one or more MAC CEs. The LCID values may be associated with an uplink channel, such as a UL-SCH. The one or more MAC CEs may comprise at least one of: a short buffer status report (BSR) MAC CE, a long BSR MAC CE, a C-RNTI MAC CE, a configured grant confirmation MAC CE, a single entry power headroom report (PHR) MAC CE, a multiple entry PHR MAC CE, a short truncated BSR, and/or a long truncated BSR. A MAC CE may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a short-truncated command MAC CE, for example, for a MAC CE associated with the uplink.

Two or more component carriers (CCs) may be aggregated, such as in carrier aggregation (CA). A wireless device may simultaneously receive and/or transmit data via one or more CCs, for example, depending on capabilities of the wireless device (e.g., using the technique of CA). A wireless device may support CA for contiguous CCs and/or for non-contiguous CCs. CCs may be organized into cells. CCs may be organized into one PCell and one or more SCells.

A wireless device may have an RRC connection (e.g., one RRC connection) with a network, for example, if the wireless device is configured with CA. During an RRC connection establishment/re-establishment/handover, a cell providing/sending/configuring NAS mobility information may be a serving cell. During an RRC connection re-establishment/handover procedure, a cell providing/sending/configuring a security input may be a serving cell. The serving cell may be a PCell. A base station may send/transmit, to a wireless device, one or more messages comprising configuration parameters of a plurality of SCells, for example, depending on capabilities of the wireless device.

A base station and/or a wireless device may use/employ an activation/deactivation mechanism of an SCell, for example, if configured with CA. The base station and/or the wireless device may use/employ an activation/deactivation mechanism of an SCell, for example, to improve battery use and/or power consumption of the wireless device. A base station may activate or deactivate at least one of one or more SCells, for example, if a wireless device is configured with the one or more SCells. An SCell may be deactivated unless an SCell state associated with the SCell is set to an activated state (e.g., "activated") or a dormant state (e.g., "dormant"), for example, after configuring the SCell.

A wireless device may activate/deactivate an SCell. A wireless device may activate/deactivate a cell, for example, based on (e.g., after or in response to) receiving an SCell Activation/Deactivation MAC CE. The SCell Activation/

Deactivation MAC CE may comprise one or more fields associated with one or more SCells, respectively, to indicate activation or deactivation of the one or more SCells. The SCell Activation/Deactivation MAC CE may correspond to one octet comprising seven fields associated with up to seven SCells, respectively, for example, if the aggregated cell has less than eight SCells. The SCell Activation/Deactivation MAC CE may comprise an R field. The SCell Activation/Deactivation MAC CE may comprise a plurality of octets comprising more than seven fields associated with more than seven SCells, for example, if the aggregated cell has more than seven SCells.

Figures 21A, 21B:
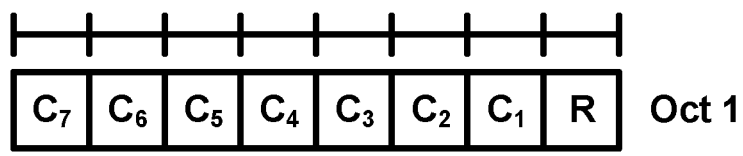
FIG. 21A and FIG. 21B show example SCell Activation/Deactivation MAC CEs.

FIG. 21A shows an example SCell Activation/Deactivation MAC CE of one octet. A first MAC PDU subheader comprising a first LCID (e.g., '111010' as shown in FIG. 19) may indicate/identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first quantity/number of C-fields (e.g., seven or any other quantity/number) and a second quantity/number of R-fields (e.g., one or any other quantity/number).

FIG. 21B shows an example SCell Activation/Deactivation MAC CE of four octets. A second MAC PDU subheader comprising a second LCID (e.g., '111001' as shown in FIG. 19) may indicate/identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third quantity/number of C-fields (e.g., 31 or any other quantity/number) and a fourth quantity/number of R-fields (e.g., 1 or any other quantity/number).

As shown in FIG. 21A and/or FIG. 21B, a Ci field may indicate an activation/deactivation status of an SCell with/corresponding to an SCell index i, for example, if an SCell with/corresponding to SCell index i is configured. An SCell with an SCell index i may be activated, for example, if the Ci field is set to one. An SCell with an SCell index i may be deactivated, for example, if the Ci field is set to zero. The wireless device may ignore the Ci field, for example, if there is no SCell configured with SCell index i. An R field may indicate a reserved bit. The R field may be set to zero or any other value (e.g., for other purposes).

A base station may send/transmit, to a wireless device, one or more messages comprising an SCell timer (e.g., sCellDeactivationTimer). A wireless device may deactivate an SCell, for example, based on (e.g., after or in response to) an expiry of the SCell timer. An SCell configured with an uplink control channel (e.g., a PUCCH SCell) may not be configured with an SCell timer. Each other SCell (e.g., except for the SCell configured with an uplink control channel) may run the SCell timer.

A wireless device may activate an SCell, for example, if the wireless device receives an SCell Activation/Deactivation MAC CE activating the SCell. A wireless device may perform one or more first operations, for example, based on (e.g., after or in response to) the activating the SCell. The one or more first operations may comprise at least one of: SRS transmissions on/via the SCell; CQI/PMI/RI/CSI-RS resource indicator (CRI) reporting for the SCell; PDCCH monitoring on/via the SCell; PDCCH monitoring for the SCell (e.g., on/via a PCell or another SCell); and/or PUCCH transmissions on/via the SCell.

The wireless device may start or restart a first SCell timer (e.g., sCellDeactivationTimer) associated with the SCell, for example, based on (e.g., after or in response to) the activating the SCell. The wireless device may start or restart the first SCell timer in the slot, for example, in which the SCell Activation/Deactivation MAC CE activating the SCell is received. The wireless device may (re-)initialize one or more suspended configured uplink grants of a configured grant (e.g., a configured grant Type 1) associated with the SCell according to a stored configuration, for example, based on (e.g., after or in response to) the activating the SCell. The wireless device may trigger PHR, for example, based on (e.g., after or in response to) the activating the SCell.

A wireless device may deactivate the activated SCell, for example, if the wireless device receives an SCell Activation/Deactivation MAC CE deactivating an activated SCell. The wireless device may deactivate the activated SCell, for example, if a first SCell timer (e.g., sCellDeactivationTimer) associated with an activated SCell expires. The wireless device may stop the first SCell timer associated with the activated SCell, for example, based on (e.g., after or in response to) the deactivating the activated SCell. The wireless device may clear one or more configured downlink assignments and/or one or more configured uplink grants of a configured grant (e.g., a configured uplink grant Type 2) associated with the activated SCell, for example, based on (e.g., after or in response to) the deactivating the activated SCell. The wireless device may suspend one or more configured uplink grants of a configured uplink grant (e.g., a configured uplink grant Type 1) associated with the activated SCell and/or flush HARQ buffers associated with the activated SCell, for example, based on (e.g., after or in response to) the deactivating the activated SCell.

A wireless device may not perform one or more second operations, for example, if an SCell is deactivated. The one or more second operations may comprise at least one of: transmitting SRS on/via the SCell; reporting CQI/PMI/RI/CRI for the SCell; transmitting UL-SCH on/via the SCell; transmitting RACH on/via the SCell; monitoring at least one first PDCCH on/via the SCell; monitoring at least one second PDCCH for the SCell (e.g., on/via a PCell or another SCell); and/or transmitting a PUCCH on/via the SCell.

A wireless device may restart a first SCell timer (e.g., sCellDeactivationTimer) associated with an activated SCell, for example, if at least one first PDCCH on the activated SCell indicates an uplink grant or a downlink assignment. A wireless device may restart the first SCell timer (e.g., sCellDeactivationTimer) associated with the activated SCell, for example, if at least one second PDCCH on/via a serving cell (e.g., a PCell or an SCell configured with PUCCH, i.e., PUCCH SCell) scheduling the activated SCell indicates an uplink grant or a downlink assignment for the activated SCell. A wireless device may abort an ongoing random access procedure on the SCell, for example, if an SCell is deactivated and if there is an ongoing random access procedure on the SCell.

A base station may configure a wireless device with uplink (UL) bandwidth parts (BWPs) and/or downlink (DL) BWPs, for example, to enable bandwidth adaptation (BA) on a PCell. The base station may further configure the wireless device with at least DL BWP(s) (e.g., there may be no UL BWPs in the UL) to enable BA on an SCell, for example, if a carrier aggregation is configured for the wireless device. For the PCell, an initial active BWP may be a first BWP used for initial access. For the SCell, a first active BWP may be a second BWP configured for the wireless device to operate on the SCell upon the SCell being activated.

A base station and/or a wireless device may independently switch a DL BWP and/or an UL BWP, for example, in a paired spectrum (e.g., FDD). A base station and/or a wireless device may simultaneously switch a DL BWP and an UL BWP, for example, in an unpaired spectrum (e.g., TDD).

A base station and/or a wireless device may switch a BWP between configured BWPs, for example, based on DCI or a BWP inactivity timer. A base station and/or a wireless device may switch an active BWP to a default BWP, for example, based on (e.g., after or in response to) an expiry of a BWP inactivity timer associated with a serving cell if the BWP inactivity timer is configured for the serving cell. The default BWP may be configured by the network (e.g., via one or more RRC message).

One UL BWP for each uplink carrier and one DL BWP may be active at a time in an active serving cell, for example, for FDD systems if configured with BA. One DL/UL BWP pair may be active at a time in an active serving cell, for example, for TDD systems. Operating on the one UL BWP and the one DL BWP (or the one DL/UL pair) may improve wireless device battery consumption efficiencies. BWPs, other than the one active UL BWP and the one active DL BWP, (e.g., configured for the wireless device and/or that the wireless device may work on) may be deactivated. The wireless device may not monitor PDCCH on/via the deactivated BWPs and/or not send/transmit, on/via the deactivated BWPs, PUCCH, PRACH, and/or UL-SCH. A serving cell may be configured with at most a first quantity/number (e.g., four or any other quantity/number) of BWPs. There may be one active BWP at any point in time, for example, for an activated serving cell.

A BWP switching for a serving cell may be used to activate an inactive BWP and/or deactivate an active BWP at a time. The BWP switching may be controlled by a PDCCH indicating a downlink assignment and/or an uplink grant. The BWP switching may be controlled by a BWP inactivity timer (e.g., bwp-InactivityTimer). The BWP switching may be controlled by a base station and/or a wireless device (e.g., a MAC entity of a base station and/or a wireless device), for example, based on (e.g., after or in response to) initiating a random access procedure. A BWP may be initially active without receiving a PDCCH indicating a downlink assignment or an uplink grant, for example, after an addition of an SpCell or activation of an SCell. The active BWP for a serving cell may be indicated by an RRC message and/or a PDCCH. A DL BWP may be paired with a UL BWP, and BWP switching may be common for both UL and DL, for example, for an unpaired spectrum.

Figure 22:
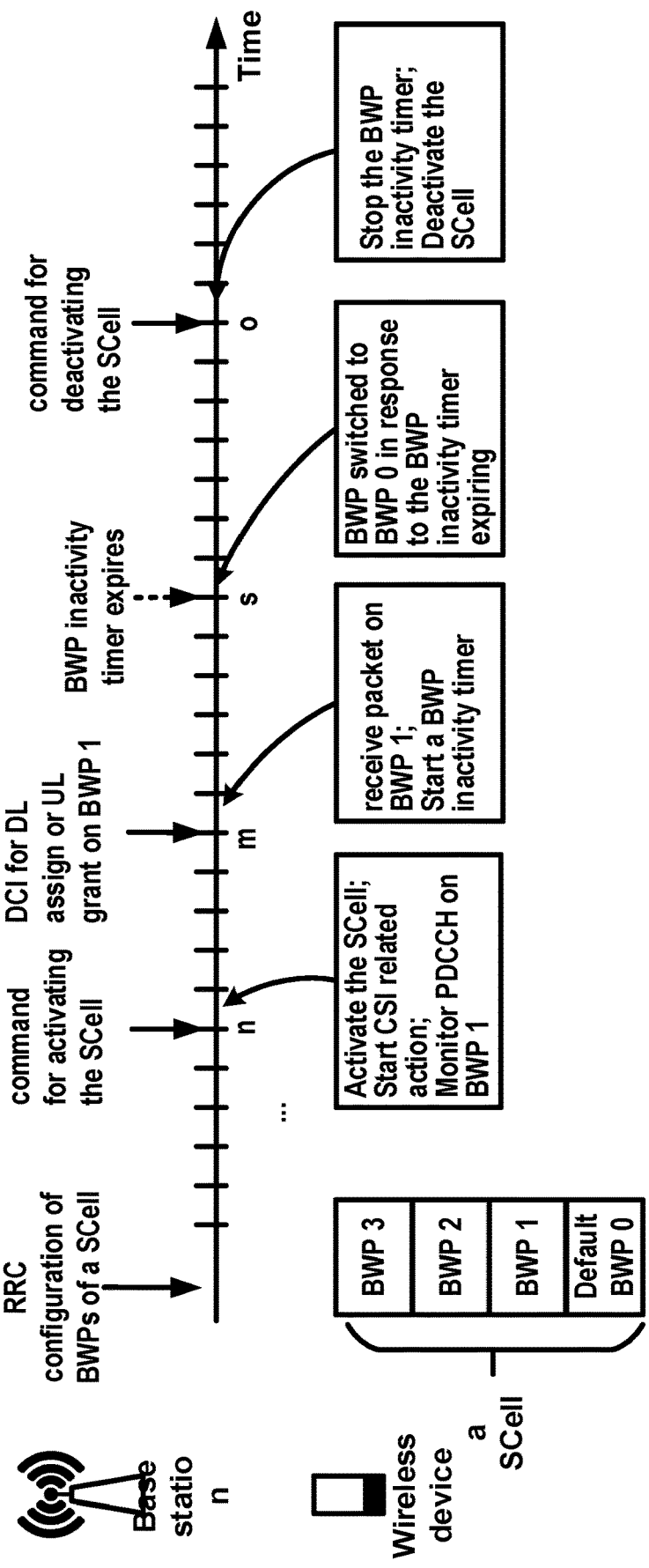
FIG. 22 shows an example of bandwidth part (BWP) management.

FIG. 22 shows an example of BWP management. BWP management may comprise BWP switching (e.g., switching on an SCell). A wireless device may receive one or more RRC messages 2210 comprising parameters of an SCell and one or more BWP configurations associated with the SCell. The one or more RRC messages 2210 may comprise at least one of: an RRC connection reconfiguration message (e.g., RRCReconfiguration); an RRC connection reestablishment message (e.g., RRCRestablishment); and/or an RRC connection setup message (e.g., RRCSetup). Among the one or more BWPs, at least one BWP may be configured as the first active BWP (e.g., BWP 1 shown in FIG. 22), one BWP as the default BWP (e.g., BWP 0 shown in FIG. 22). The wireless device may receive an activation indication 2220 (e.g., a command, a MAC CE) to activate the SCell (e.g., during n-th slot). The wireless device may start an SCell deactivation timer (e.g., sCellDeactivationTimer), and start CSI-related actions for the SCell, and/or start CSI-related actions for the first active BWP of the SCell. The wireless device may start monitoring a PDCCH on/via BWP 1, for example, based on (e.g., after or in response to) activating the SCell.

The wireless device may start or restart a BWP inactivity timer (e.g., bwp-InactivityTimer) (e.g., during m-th slot), for example, based on (e.g., after or in response to) receiving DCI 2230 indicating a DL assignment on BWP 1. The wireless device may switch back to the default BWP (e.g., BWP 0) as an active BWP, for example, if the BWP inactivity timer expires (e.g., during s-th slot). The wireless device may deactivate the SCell and/or stop the BWP inactivity timer, for example, if the sCellDeactivationTimer expires.

Using the BWP inactivity timer may further reduce power consumption of a wireless device, for example, if the wireless device is configured with multiple cells and/or one or more cells having a wide bandwidth (e.g., 1 GHz). The wireless device may only send/transmit or receive via a narrow-bandwidth BWP (e.g., 5 MHz) on the PCell or an SCell, for example, if there is no activity on an active BWP. The wireless device may determine an expiry of the BWP inactivity timer (e.g., during s-th slot). The wireless device may switch the active BWP (e.g., the BWP 1) to the default BWP (e.g., the BWP 0), for example, based on (e.g., after or in response to) the expiry of the BWP inactivity timer.

A wireless device (e.g., a MAC entity of the wireless device) may apply normal operations on an active BWP for an activated serving cell configured with a BWP. The normal operations may comprise at least one of: transmitting on/via a UL-SCH; transmitting on/via a RACH; monitoring a PDCCH; transmitting a PUCCH; and/or receiving a DL-SCH; and/or (re-) initializing any suspended configured uplink grants of a configured grant (e.g., configured grant Type 1) according to a stored configuration, if any.

A wireless device (e.g., a MAC entity of the wireless device) may not perform one or more operations, for example, on/via an inactive BWP for each activated serving cell configured with a BWP. The one or more operations not performed by the wireless device (e.g., a MAC entity of the wireless device) may comprise at least one of: transmitting on/via a UL-SCH; transmitting on/via a RACH; monitoring a PDCCH; transmitting a PUCCH; transmitting an SRS, receiving a DL-SCH; clearing any configured downlink assignment and/or configured uplink grant of a configured grant (e.g., configured grant Type 2); and/or suspending any configured uplink grant of a configured grant (e.g., configured Type 1).

A wireless device may perform BWP switching to a BWP indicated by a PDCCH transmission (e.g., DCI, a PDCCH order, etc.), for example, if the wireless device (e.g., a MAC entity of the wireless device) receives the PDCCH transmission for a BWP switching of a serving cell at time that a random access procedure associated with this serving cell is not ongoing. A bandwidth part indicator field value may indicate an active DL BWP, from a configured DL BWP set, for DL receptions, for example, if the bandwidth part indicator field is configured in DCI format 1_1. A bandwidth part indicator field value may indicate an active UL BWP, from a configured UL BWP set, for UL transmissions, for example, if the bandwidth part indicator field is configured in DCI format 0_1.

A wireless device may be provided with, by a higher layer parameter (e.g., Default-DL-BWP), a default DL BWP among the configured DL BWPs, for example, for a primary cell and/or a secondary cell. The default DL BWP may be the initial active DL BWP, for example, if the wireless device is not provided with a default DL BWP by the higher layer parameter (e.g., Default-DL-BWP).

A wireless device may be provided with a timer value for the primary cell by a higher layer parameter (e.g., bwp-InactivityTimer). The wireless device may increment the configured timer (if running), for example, every interval of 1 millisecond for frequency range 1, every 0.5 milliseconds for frequency range 2, or any other interval for another frequency range. The wireless device may increment the configured timer, for example, if the wireless device does not detect DCI format 1_1 for a paired spectrum operation or if the wireless device does not detect DCI format 1_1 or DCI format 0_1 for an unpaired spectrum operation during the interval. The wireless device may receive a deactivation indication 2240 (e.g., a command, a MAC CE) for deactivating one or more SCells. The wireless device may stop the BWP inactivity timer and/or deactivate the one or more SCells, for example, based on (e.g., after or in response to) receiving the deactivation indication 2240.

The wireless device procedures on a secondary cell may be the same as, or similar to, the wireless device procedures on the primary cell, for example, if the wireless device is configured for the secondary cell with a higher layer parameter (e.g., Default-DL-BWP) indicating a default DL BWP among the configured DL BWPs and/or the wireless device is configured with a higher layer parameter (e.g., bwp-InactivityTimer) indicating a timer value. The wireless device may perform the same or similar procedures, for example, using the timer value for the secondary cell and/or the default DL BWP for the secondary cell. The wireless device may use the indicated DL BWP and the indicated UL BWP on the secondary cell as the respective first active DL BWP and first active UL BWP on a secondary cell or carrier, for example, if the wireless device is configured with, by a higher layer parameter (e.g., Active-BWP-DL-SCell), a first active DL BWP and with, by a higher layer parameter (e.g., Active-BWP-UL-SCell), a first active UL BWP on the secondary cell or carrier.

FIG. 23A shows an example message comprising configuration parameters for a cell. The message may comprise an RRC message. The message may comprise a serving cell configuration information element. The configuration parameters may comprise at least one of: a TDD configuration parameter (e.g., tdd-UL-DL-ConfigurationDedicated, TDD-UL-DL-ConfigDedicated), an initial BWP ID, a plurality of DL BWPs, a plurality of UL BWPs, a first active BWP, a BWP inactivity timer, an SCell deactivation timer, and/or a cross carrier scheduling configuration information element (e.g., CrossCarrierSchedulingConfig). The message may comprise one or more algorithms (e.g., computer code or subroutines) for determining a ServingCellConfig information element and/or a CrossCarrierSchedulingConfig information element. An information element ServingCellConfig (e.g., ServingCellConfig IE) may be used to configure (e.g., add or modify) a wireless device with a serving cell. The serving cell may be an SpCell and/or an SCell of an MCG or a SCG. The configuration parameters may be specific to a wireless device and/or may be cell specific. Reconfiguration between a PUCCH and PUCCHless SCell may be supported, for example, using an SCell release and add. An information element CrossCarrierSchedulingConfig may be used to specify configuration parameters, for example, if cross-carrier scheduling is used in a cell. The configuration parameters may comprise one or more PDCCH configuration parameters of a first cell and/or one or more PDCCH configuration parameters of a second cell. The PDCCH configuration parameters may comprise one or more: control resource sets, search spaces (configured in SearchSpace IE), a downlink preemption indication, PUSCH power control parameters, PUCCH power control parameters, and/or SRS power control parameters.

FIG. 23B shows an example message comprising configuration parameters for a search space. The message may comprise an RRC message. A search space information element (e.g., SearchSpace IE) may define/indicate how and/or where to search for PDCCH candidates. Each search space may be associated with at least one ControlResourceSet. For a scheduled cell using cross-carrier scheduling, except for nrofCandidates, optional fields shown in FIG. 23B may be absent. One or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number/quantity of candidates for an aggregation level 2445 (nrofCandidates), and/or a SS type indicating a common SS type or a wireless device specific (e.g., UE-specific) SS type (searchSpaceType). The monitoring slot periodicity and offset parameter may indicate slots (e.g. in a radio frame) and/or a slot offset (e.g., related to a starting of a radio frame) for PDCCH monitoring. The monitoring symbol indication may indicate on which symbol(s) of a slot a wireless device may monitor PDCCH on the SS. The control resource set ID may identify/indicate a control resource set on which a SS may be located. The searchSpaceId 2420 may identify/indicate the search space (e.g., a set of PDCCH candidates for a wireless device to monitor). Each search space may comprise a set of control elements at a different aggregation level(s) which may determine the number/quantity of candidates there are to decode at one or more aggregation levels. The condition SearchSpaceId equals zero may identify/indicate a searchSpaceZero that may be configured via PBCH (MIB) or ServingCellConfigCommon and may not be used in the SearchSpace IE. The searchSpaceId may be unique among the BWPs of a Serving Cell. Search spaces with the same searchSpaceId in a scheduled cell and scheduling cell (e.g., for cross-carrier scheduling) may be linked to each other. A wireless device may apply a search space for a scheduled cell, for example, if the DL BWPs in which the linked search spaces are configured in the scheduling cell and scheduled cell are both active.

FIG. 23C shows an example a message comprising configuration parameters for a control resource set (CORESET). The message may comprise an RRC messageA base station may send/transmit to a wireless device one or more configuration parameters of a CORESET. An information element ControlResourceSet may be used to configure a time/frequency CORESET in which to search for DCI. The configuration parameters may comprise at least one of: a CORESET ID identifying/indicating the CORESET, a frequency resource indication, a time duration parameter indicating a number/quantity of symbols of the CORESET, a CCE-REG mapping type indicator (not shown in FIG. 23C), a plurality of TCI states (e.g., tci-StatesPDCCH-ToAddList), an indicator (e.g., tci-PresentinDCI) indicating whether a TCI is present in a DCI, and/or the like. A controlResourceSetId value zero may identify/indicate a common CORESET configured in MIB and/or in ServingCellConfigCommon (controlResourceSetZero). The values one though maxNrofControlResourceSets-1 may identify/indicate CORESETs configured by dedicated signaling and/or in SB1. The controlResourceSetId may be unique among the BWPs of a serving cell. The frequency resource indication, comprising a number/quantity of bits (e.g., 45 bits or any other quantity of bits), may indicate frequency domain resources. Each bit of the indication mat correspond to a group of 6 RBs (and/or any other quantity of RBs), for example, with grouping starting from the first RB group in a BWP of a cell (e.g., SpCell, SCell). The first (e.g., left-most/most significant) bit may correspond to the first RB group in the BWP, and so on. A bit that is set to 1 may indicate that an RB group, corresponding to the bit, belongs to the frequency domain resource of a CORESET. Bits corresponding to a group of RBs not fully contained in the BWP within which the CORESET is configured may be set to zero. A time duration parameter may correspond to a layer 1 parameter CORESET-time-duration and/or may define/indicate the contiguous time duration in a number/quantity of symbols for a CORESET using an integer range that spans from one to maxCoReSetDuration. A CCE-REG mapping type indicator may provide a choice of mapping methods for control channel element (CCE) to resource element group (REG). The CCE may comprise a number/quantity (e.g., 6) of resource-element groups (REGs). The REG may comprise a resource block in an OFDM symbol. The mapping of the coded and modulated DCI on the resource elements may be based on mapping of CCEs and REGs (e.g., CCE-to-REG mapping). A tci-StatesPDCCH-ToAddList parameter may comprise a subset of the TCI states defined/indicated in pdsch-Config, which may be included in the BWP-DownlinkDedicated corresponding to the serving cell and/or to the DL BWP to which the ControlResourceSet belongs. The subset of the TCI states may be used for providing QCL relationships between DL reference signals (RS) in one RS set (e.g., TCI-State) and the PDCCH DMRS ports. A network may configure (e.g., at most) a maxNrofTCI-StatesPDCCH entries. The tci-PresentinDC parameter may indicate if the TCI field is present or not present in a DL related DCI. If the field is absent, a wireless device may consider/determine the TCI to be absent/disabled. A network may set the TCI field to enabled for the ControlResourceSet used for cross-carrier scheduling in the scheduling cell (e.g., if cross-carrier scheduling is used).

A wireless device may monitor a set of PDCCH candidates. A set of PDCCH candidates may be defined in terms of PDCCH search space sets. A search space set may comprise a CSS set and/or a USS set. A wireless device may monitor PDCCH candidates in one or more of the following search spaces sets: a Type0-PDCCH CSS set, a Type0A-PDCCH CSS set, a Type1-PDCCH CSS set, a Type2-PDCCH CSS set, a Type3-PDCCH CSS set, a USS set, and/or any other type of CSS set and/or USS set. A Type0-PDCCH CSS set may be configured by pdcch-ConfigSIB1 in MIB and/or by searchSpaceSIB1 in PDCCH-ConfigCommon and/or by searchSpaceZero in PDCCH-ConfigCommon, for example, for a DCI format with CRC scrambled by a SI-RNTI on the primary cell of the MCG. A Type0A-PDCCH CSS set may be configured by searchSpaceOtherSystemInformation in PDCCH-ConfigCommon, for example, for a DCI format with CRC scrambled by a SI-RNTI on the primary cell of the MCG. A Type1-PDCCH CSS set may be configured by ra-SearchSpace in PDCCH-ConfigCommon, for example, for a DCI format with CRC scrambled by a RA-RNTI or a TC-RNTI on the primary cell. A Type2-PDCCH CSS set may be configured by paging-SearchSpace in PDCCH-ConfigCommon, for example, for a DCI format with CRC scrambled by a P-RNTI on the primary cell of the MCG. A Type3-PDCCH CSS set may be configured by SearchSpace in PDCCH-Config with searchSpaceType=common, for example, for DCI formats with CRC scrambled by INT-RNTI, SFI-RNTI, TPC-PUSCH-RNTI, TPC-PUCCH-RNTI, and/or TPC-SRS-RNTI (e.g., only for the primary cell, C-RNTI, MCS-C-RNTI, and/or CS-RNTI(s)). A USS set may be configured by SearchSpace in PDCCH-Config with searchSpaceType=ue-Specific, for example, for DCI formats with CRC scrambled by C-RNTI, MCS-C-RNTI, SP-CSI-RNTI, or CS-RNTI(s).

A wireless device may determine a PDCCH monitoring occasion. The wireless device may determine a PDCCH monitoring occasion, for example, on an active DL BWP. The wireless device may determine a PDCCH monitoring occasion based on one or more PDCCH configuration parameters comprising: a PDCCH monitoring periodicity, a PDCCH monitoring offset, and/or a PDCCH monitoring pattern within a slot. For a search space set (SS s), the wireless device may determine that a PDCCH monitoring occasion(s) exists in a slot with number $n_{s,f}^{\mu}$ in a frame with number $n_f$, for example, if $(n_f \cdot N_{slot}^{frame,\mu} + n_{s,f}^{\mu} - o_s) \bmod k_s = 0$. $N_{slot}^{frame,\mu}$ may indicate a number/quantity of slots in a frame if numerology $\mu$ is configured. $o_s$ may indicate a slot offset, for example, indicated in the PDCCH configuration parameters. $k_s$ may indicate a PDCCH monitoring periodicity, for example, indicated in the PDCCH configuration parameters. A wireless device may monitor PDCCH candidates for the search space set for $T_s$ consecutive slots, starting from slot $n_{s,f}^{\mu}$, and may not monitor PDCCH candidates for search space set s for the next $k_s - T_s$ consecutive slots. A USS at CCE aggregation level L∈{1, 2, 4, 8, 16} may be defined by a set of PDCCH candidates for CCE aggregation level L.

A wireless device may determine CCE indexes. A wireless device may determine, for a search space set s associated with CORESET p, CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ as:

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i,$$

where, $Y_{p,n_{s,f}^{\mu}} = 0$ for any CSS; $Y_{p,n_{s,f}^{\mu}} = (A_p \cdot Y_{p,n_{s,f}^{\mu}-1}) \bmod D$ for a USS; $Y_{p,-1} = n_{RNTI} \neq 0$, $A_p = 39827$ for p mod 3=0, $A_p = 39829$ for p mod 3=1, $A_p = 39839$ for p mod 3=2, and D=65537; i=0, . . . , L−1; $N_{CCE,p}$ may indicate the number/quantity of CCEs, numbered from 0 to $N_{CCE,p}-1$, in CORESET p; $n_{CI}$ may indicate the carrier indicator field value, for example, if the wireless device is configured with a carrier indicator field by CrossCarrierSchedulingConfig for the serving cell on which PDCCH is monitored. Otherwise, including for any CSS, $n_{CI}=0$; $m_{s,n_{CI}}=0, \ldots, M_{s,n_{CI}}^{(L)}-1$, where $M_{s,n_{CI}}^{(L)}$ is the number/quantity of PDCCH candidates the wireless device may be configured to monitor for aggregation level L of a search space set s for a serving cell corresponding to $n_{CI}$; for any CSS, $M_{s,max}^{(L)} = M_{s,0}^{(L)}$; for a USS, $M_{s,max}^{(L)}$ may indicate the maximum of $M_{s,n_{CI}}^{(L)}$ over all configured $n_{CI}$ values for a CCE aggregation level L of search space set s; and/or the RNTI value used for $n_{RNTI}$ may indicate the C-RNTI.

A wireless device may monitor a set of PDCCH candidates according to one or more configuration parameters. The configuration parameters may be for a search space set comprising a plurality of search spaces (SSs). A wireless device may monitor a set of PDCCH candidates in one or more CORESETs for detecting one of several DCI messages. Monitoring may comprise decoding one or more PDCCH candidates of the set of the PDCCH candidates according to the monitored DCI formats. Monitoring may comprise decoding a DCI content of one or more PDCCH candidates with possible (and/or configured) PDCCH locations, possible (and/or configured) PDCCH formats (e.g., number/quantity of CCEs, number/quantity of PDCCH candidates in common SSs, and/or number/quantity of PDCCH candidates in the UE-specific SSs) and/or possible (and/or configured) DCI formats. The decoding may be referred to as blind decoding.

Figure 24:
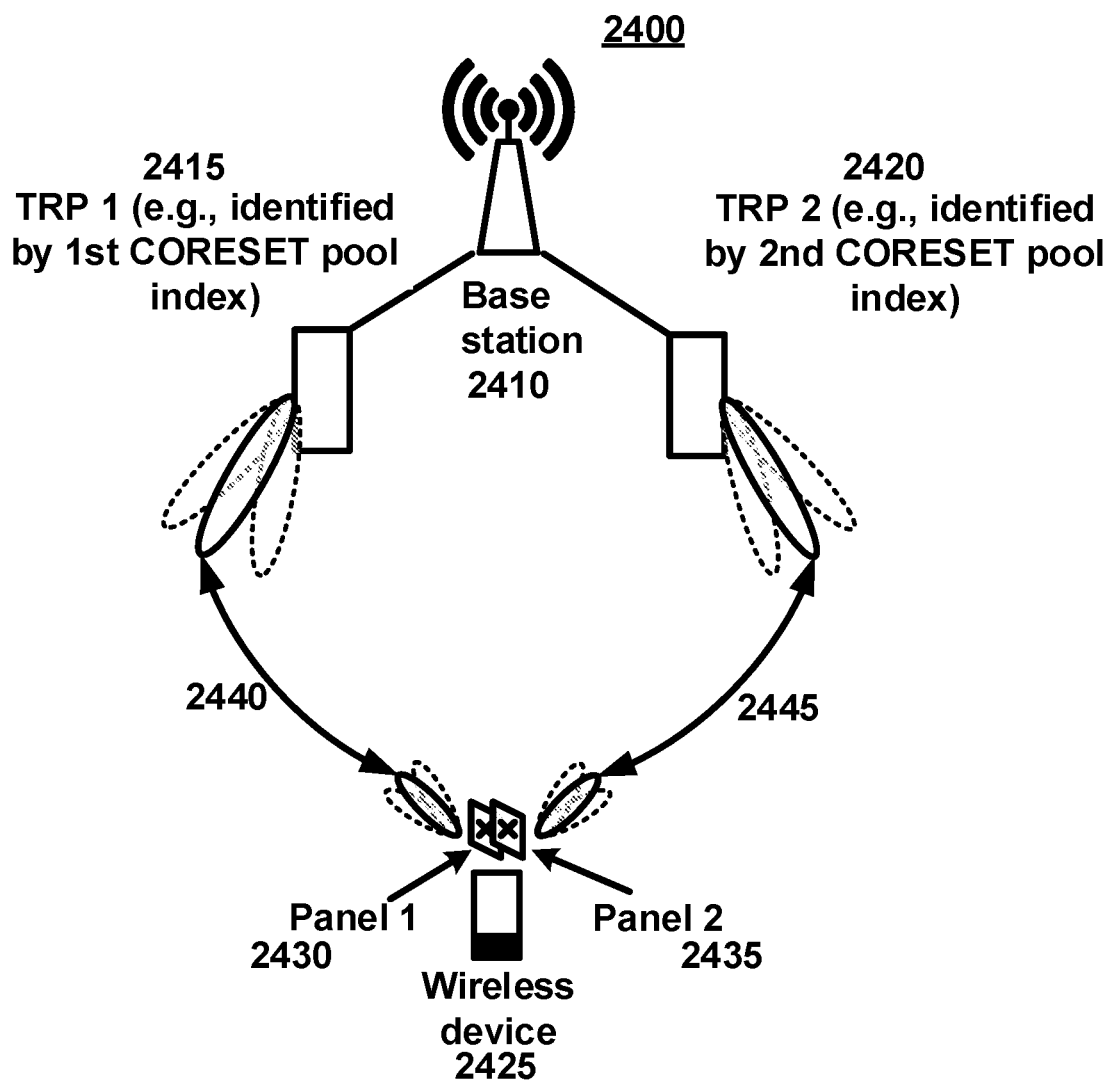
FIG. 24 shows an example of wireless communications using multiple TRPs and/or multiple panels.

FIG. 24 shows an example of wireless communication using multiple transmission reception points (TRPs) and/or multiple panels. As used herein, a TRP may refer to any transmitter/receiver device (e.g., at a base station and/or at any other computing device). As used herein, a panel and/or an antenna panel may refer to any transmitter/receiver device (e.g., at a wireless device and/or at any other computing device). A base station 2410 may be equipped with multiple TRPs (e.g., TRP 1 2415 and TRP 2 2420). The TRP 1 may be identified by a first CORESET pool index; and TRP 2 may be identified by a second CORESET pool index. A wireless device 2425 may be equipped with more than one panel (e.g., Panel 1 2430 and Panel 2 2435). Transmission and reception with multiple TRPs and/or multiple panels may improve system throughput and/or transmission robustness for a wireless communication in a high frequency (e.g., above 6 GHz). Shown in FIG. 24, the base station 2410 may be equipped with multiple TRPs 2415 and 2420. The base station 2410 may send/transmit to the wireless device 2425 via TRP 1 2415 or TRP 2 2420 RRC messages comprising configuration parameters of a plurality of CORESETs on a cell (or a BWP of the cell). The wireless device 2425 with multiple panels (e.g., panel 1 2430 and panel 2 2435) resides within a proximity 2440 to TRP1 and a proximity 2445 to TRP 2. Each of the plurality of CORESETs may be identified with a CORESET index and may be associated with (or configured with) a CORESET pool (or group) index. One or more CORESETs, of the plurality of CORESETs, having a same CORESET pool index may indicate that DCIs received on the CORESETs are sent/transmitted from a same TRP of a plurality of TRPs of the base station 2410. The wireless device 2425 may determine receiving beams (or spatial domain filters) for PDCCHs/PDSCHs based on a TCI indication (e.g., DCI) and a CORESET pool index associated with a CORESET for the DCI.

A TRP of multiple TRPs of the base station may be identified/indicated by at least one of: a TRP identifier (ID), a cell index, and/or a reference signal index. A TRP ID of a TRP may comprise a control resource set group (and/or pool) index (e.g., CORESETPoolIndex) of a control resource set group from which DCI is sent/transmitted from the base station on a control resource set. A TRP ID of a TRP may comprise a TRP index indicated in the DCI. A TRP ID of a TRP may comprise a TCI state group index of a TCI state group. A TCI state group may comprise at least one TCI state with which the wireless device receives the downlink TBs, and/or with which the base station sends/transmits the downlink TBs.

A wireless device may receive one or more PDCCHs scheduling fully/partially/non-overlapped PDSCHs in time and frequency domain. The wireless device may receive one or more RRC messages (e.g., PDCCH-Config IE) comprising a first CORESET pool index (e.g., CORESETPoolIndex) value and/or a second CORESET pool index (e.g., in a ControlResourceSet IE). The wireless device may determine the reception of full/partially overlapped PDSCHs in a time domain, for example, if PDCCHs that schedule two PDSCHs are associated with different control resource sets (e.g., ControlResourceSets) comprising different values of a CORESET pool index (e.g., CORESETPoolIndex).

A wireless device may be configured to determine that a control resource set (e.g., ControlResourceSet) is assigned with a coreset pool index (e.g., CORESETPoolIndex) as 0 (or any other value) for a control resource set (e.g., ControlResourceSet) without/lacing a coreset pool index (e.g., CORESETPoolIndex). Scheduling information for receiving a PDSCH transmission may be indicated and/or carried by the corresponding PDCCH, for example, if the wireless device is scheduled with full/partially/non-overlapped PDSCHs in time and frequency domain. A wireless device may be expected to be scheduled with the same active BWP and the same SCS. A wireless device may be scheduled with multiple codewords (e.g., two or any other quantity, such as a maximum quantity of two) simultaneously, for example, if the wireless device is scheduled with full/partially overlapped PDSCHs in time and frequency domain.

A wireless device may be allowed to perform one or more of the following operations, for example, if PDCCH transmission(s) that schedule two PDSCHs are associated with different control resource sets (e.g., ControlResourceSets) having different values of coreset pool indexes (e.g., CORESETPoolIndex). For example, for any two HARQ process IDs in a given scheduled cell, the wireless device may be scheduled to receive a PDSCH transmission starting earlier than the end of the first PDSCH transmission with a PDCCH transmission associated with a different value of coreset pool index (e.g., CORESETpoolIndex) that ends later than symbol i, for example, if the wireless device is scheduled to start receiving a first PDSCH transmission starting in symbol j by a PDCCH transmission associated with a value of a coreset pool index (e.g., CORESETpoolIndex) ending in symbol i. The wireless device may receive (e.g., in a given scheduled cell) a first PDSCH transmission in slot i, with the corresponding HARQ-ACK assigned to be sent/transmitted in slot j, and a second PDSCH transmission associated with a value of a coreset pool index (e.g., CORESETpoolIndex) different from that of the first PDSCH transmission starting later than the first PDSCH transmission with its corresponding HARQ-ACK assigned to be sent/transmitted in a slot before slot j.

A wireless device configured by higher layer parameter (e.g., PDCCH-Config) may contain two different values of a coreset pool index (e.g., CORESETPoolIndex) in a control resource set (e.g., ControlResourceSet), for example, if a TCI indication (e.g., tci-PresentInDCI) is enabled (e.g., is set to 'enabled') and/or if the TCI indication (e.g., tci-PresentIn-DCI) is not configured in an RRC connected mode. If A wireless device may assume/determine that DM-RS ports of a PDSCH associated with a value of a coreset pool index (e.g., CORESETPoolIndex) of a serving cell are quasi co-located with the RS(s) with respect to the QCL parameter(s), for example, if the offset between the reception of the DL DCI and the corresponding PDSCH transmission is less than a threshold (e.g., timeDurationForQCL). The QCL parameter(s) may be used for a PDCCH quasi co-location indication of the CORESET associated with a monitored search space with the lowest CORESET-ID among CORESETs. The CORESETs are configured with the same value of a coreset pool index (e.g., CORESETPoolIndex) as the PDCCH transmission scheduling that PDSCH transmission. The PDCCH transmission schedules the PDSCH transmission in the latest slot in which one or more CORESETs associated with the same value of coreset pool index (e.g., CORESETPoolIndex) as the PDCCH transmission scheduling that PDSCH transmission within the active BWP of the serving cell are monitored by the wireless device. The offset between the reception of the DL DCI and the corresponding PDSCH transmission may be less than the threshold (e.g., timeDurationForQCL) and at least one configured TCI states for the serving cell of scheduled PDSCH may contain a QCL type (e.g., QCL-TypeD). The wireless device may be configured to determine that the DM-RS ports of PDSCH of a serving cell are quasi co-located with the RS(s) with respect to the QCL parameter(s) associated with the TCI states, for example, if at least one TCI codepoint indicates two TCI states. The TCI states may correspond to the lowest codepoint among the TCI codepoints containing two different TCI states.

A wireless device (e.g., if configured with multiple panels) may determine to activate (or select) at least one of the multiple panels to receive downlink signals/channels sent/transmitted from one of multiple TRPs of a base station. The activation/selection of at least one of the multiple panels may be based on receiving downlink signaling indicating the activation/selection. The activation/selection may be performed (e.g., automatically performed) based on measuring downlink channel qualities of one or more reference signals sent/transmitted from the base station. The wireless device may apply a spatial domain filter to send/transmit from a panel of the multiple panels to one of the multiple TRPs of the base station. The panel and/or the spatial domain filter may be determined based on at least one of: an UL TCI indication of a DCI, a panel ID in the DCI, an SRI indication of a DCI, a CORESET pool index of a CORESET for receiving the DCI, and/or the like.

A wireless device may determine a panel and/or a transmission beam (and/or spatial domain transmission filter) on the panel, for example, if a wireless device receives DCI indicating an uplink grant. The panel may be indicated (e.g., explicitly indicated) by a panel ID comprised in the DCI. The panel may be indicated (e.g., implicitly indicated) by an SRS ID (and/or an SRS group/pool index), a UL TCI pool index of a UL TCI for uplink transmission, and/or a CORESET pool index of a CORESET for receiving the DCI.

A base station may configure, and/or a wireless device may be configured with, one or more aperiodic trigger states. An information element ("IE") (e.g., CSI-AperiodicTriggerStateList) may be used (e.g., sent by a base station) to configure the wireless device with one or more aperiodic trigger states (e.g., 1, 64, 128 or any other quantity of aperiodic trigger states). A codepoint of a channel state information ("CSI") request field in a downlink control information (DCI) may be associated with or indicate an aperiodic trigger state of the one or more aperiodic trigger states. The aperiodic trigger state may comprise one or more report configurations (e.g., 1, 8, 16 or any other quantity of report configurations, provided by a higher layer parameter, such as associatedReportConfigInfoList). The wireless device may perform measurement of CSI-RS and/or aperiodic reporting based on (e.g., according to) the one or more report configurations (e.g., in the associatedReportConfigInfoList) for the aperiodic trigger state, for example, based on receiving the DCI with the CSI request field indicating the aperiodic trigger state.

A report configuration (e.g., provided by a higher layer parameter CSI-AssociatedReportConfigInfo) may be identified/indicated by and/or associated with a report configuration index (e.g., provided by a higher layer parameter CSI-ReportConfigId). The report configuration may comprise one or more CSI resources (e.g., 1, 8, 16 CSI resources). An aperiodic CSI resource may be associated with a TCI state (e.g., provided by a higher layer parameter qcl-info in IE CSI-AperiodicTriggerStateList). The TCI state may provide a quasi co-location ("QCL") assumption (e.g., a reference signal ("RS"), an RS source, SS/PBCH block, CSI-RS) or a QCL type (e.g., QCL-TypeA, QCL-TypeD, etc.).

The wireless device may receive DCI from a base station. The DCI may comprise a CSI request field. The wireless device may receive the DCI via a PDCCH (e.g., in a PDCCH transmission). The wireless device may receive the DCI if/when/during monitoring the PDCCH. The DCI comprising the CSI request field may, for example, initiate, indicate, and/or trigger an aperiodic trigger state of the one or more aperiodic trigger states. A codepoint of the CSI request field in the DCI may indicate the aperiodic trigger state. The aperiodic trigger state may comprise one or more report configurations (e.g., a list of NZP-CSI-RS-ResourceSet). A report configuration (e.g., NZP-CSI-RS-ResourceSet) of the one or more report configurations may comprise one or more CSI resources (e.g., aperiodic CSI-RS resources, NZP-CSI-RS-Resources).

The base station may not configure the report configuration (e.g., with a higher layer parameter trs-Info). A report configuration without a higher layer parameter (e.g., trs-Info) may indicate that a first antenna port for a first aperiodic CSI resource of the one or more CSI resources is different from a second antenna port for a second aperiodic CSI resource of the one or more CSI resources. Configuring the report configuration without the higher layer parameter (e.g., trs-Info) may determine that an antenna port for each aperiodic CSI-RS resource of the one or more CSI resources is different. The base station may not configure the report configuration with a higher layer parameter repetition. A scheduling offset between a last symbol of the PDCCH carrying the DCI and a first symbol of the one or more CSI resources in the report configuration may be smaller than a second threshold (e.g., beamSwitchTiming). The wireless device may report the second threshold and the second threshold may be a first value (e.g., 14, 28, 48, or any other quantity of symbols).

An aperiodic CSI resource of the one or more CSI resources may be associated with a first TCI state of the one or more TCI state configurations. The first TCI state may indicate at least one first RS. The first TCI state may indicate at least one first QCL type. The aperiodic CSI resource being associated with the first TCI state may determine/indicate that the wireless device receives an aperiodic CSI-RS of the aperiodic CSI resource with the at least one first RS indicated, for example, by the first TCI state, with respect to the at least one QCL type indicated by the first TCI state.

The base station may send (e.g., transmit) a downlink signal with/using a second TCI state. The second TCI state may indicate at least one second RS. The second TCI state may indicate at least one second QCL type. The wireless device may receive the downlink signal in one or more first symbols. The wireless device may receive an aperiodic CSI-RS for the aperiodic CSI resource in one or more second symbols. The one or more first symbols and the one or more second symbols may overlap (e.g., fully or partially). The downlink signal and the aperiodic CSI-RS or the aperiodic CSI-RS resource may overlap, for example, based on the one or more first symbols and the one or more second symbols overlapping.

The downlink signal and the aperiodic CSI-RS or the aperiodic CSI-RS resource may overlap in a time duration. The time duration may be, for example, at least one symbol, at least one slot, at least one subframe, at least one mini-slot the one or more second symbols, the one or more first symbols, and/or any other duration/quantity/period.

The downlink signal may be a PDSCH scheduled with/using an offset larger than or equal to a first threshold (e.g., Threshold-Sched-Offset, timeDurationForQCL). The downlink signal may be a second aperiodic CSI-RS scheduled with/using an offset larger than or equal a second threshold (e.g., beamSwitchTiming) if the second threshold is a first value (e.g., 14, 28, 48, or any other quantity of symbols). The downlink signal may be an RS (e.g., periodic CSI-RS, semi-persistent CSI-RS, SS/PBCH block etc.).

A wireless device may apply/use a QCL assumption provided by a second TCI state for receiving the aperiodic CSI-RS. The wireless device may apply/use the QCL assumption provided by the second TCI state for receiving the aperiodic CSI-RS, for example, if the scheduling offset between the last symbol of a PDCCH and the first symbol is less than the second threshold (e.g., based on the downlink signal with/using the second TCI state overlapping with the aperiodic CSI-RS and/or the aperiodic CSI-RS resource), Using the QCL assumption provided or indicated by the second TCI state for receiving the aperiodic CSI may indicate that the wireless device receives the aperiodic CSI-RS with the at least one second RS (e.g., indicated by the second TCI state) with respect to the at least one second QCL type (e.g., as indicated by the second TCI state).

A scheduling offset between a last symbol of the PDCCH carrying the DCI and a first symbol of the one or more CSI resources in the report configuration may be greater than or equal to a second threshold (e.g., beamSwitchTiming). The wireless device may report the second threshold. The second threshold may be a first value (e.g., 14, 28, 48, or any other quantity of symbols). The wireless device may use a QCL assumption (e.g., provided by the first TCI state) for the aperiodic CSI resource of the one or more CSI resources in the report configuration, for example, based on the scheduling offset being equal to or larger than the second threshold. The QCL assumption (e.g., provided by the first TCI state) for the aperiodic CSI resource may indicate that the wireless device receives the aperiodic CSI-RS of the aperiodic CSI resource with the at least one RS, as indicated by the first TCI state, with respect to the QCL type indicated by the first TCI state.

In at least some communications, a base station may indicate, to a wireless device via a message using a dedicated radio resource, a reference TCI state for a target physical downlink channel (e.g., PDCCH or PDSCH) or a target downlink RS (e.g., CSI-RS or DMRS). The wireless device may receive a downlink signal, via the target channel/signal, with an Rx beam or downlink spatial domain filter determined based on the reference TCI state.

Figure 25:
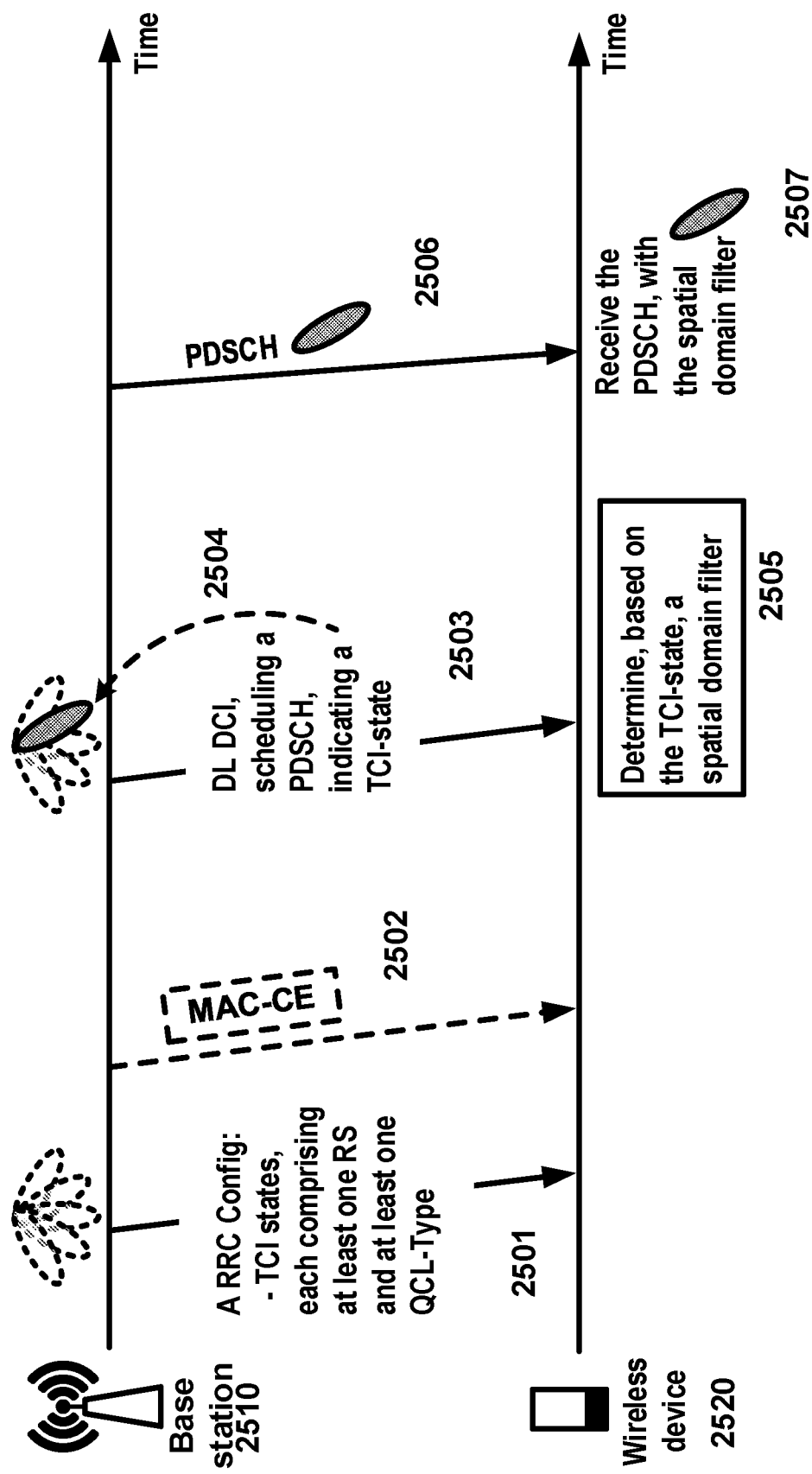
FIG. 25 shows an example of a per-signal/channel beam for downlink and/or uplink transmission.

FIG. 25 shows an example of a per-signal/channel beam for downlink and/or uplink transmission. Downlink transmission/reception may comprise transmission/reception of a PDSCH, a PDCCH, and or any other downlink channel transmission. For a TCI state indication associated with a PDCCH, a message may comprise a CORESET parameter (e.g., an RRC IE of ControlResourceSet containing a parameter controlResourceSetId, which may further specifying a target PDCCH) and/or a TCI state parameter (e.g., tci-StatesPDCCH-ToAddList, which may comprise up to maxNrofTCI-StatesPDCCH entries of TCI-StateId). A base station 2510 may send (e.g., transmit) a message 2501. The message 2501 may comprise an RRC message. The message 2501 may be used for signaling for a target PDSCH (e.g., 2506) or a target PDCCH (e.g., associated with a parameter controlResourceSetId). A subsequent MAC-control element ("MAC CE") command 2502 may, for example, activate, update, and/or down-select a reference TCI state (e.g., from entries of TCI-StateId). A downlink DCI 2503 may, for example, schedule the PDSCH 2506. A wireless device 2520 may (e.g., based on the reference TCI state 2504), determine an Rx beam and/or spatial domain filter 2505 to receive a downlink signal (e.g., 2506) via the target PDSCH or PDCCH (e.g., step 2507). The target PDSCH or PDCCH may be associated with a CORESET (e.g., a ControlResourceSet IE). The MAC-CE command 2502 may be sent (e.g., transmitted), on a separate set of time-frequency resources, for each CORESET. Using a single command (e.g., 2502) for each downlink transmission (e.g., 2506) may result in increased signaling overhead, especially if a large quantity of CORESETS (e.g., ControlResourceSet IEs) are configured.

The message 2501 may comprise one or more configuration parameters. The message 2501 may comprise one or more configuration parameters, for example, for TCI state indication for a PDSCH. The one or more configuration parameters may comprise, for example, an RRC IE of PDSCH-Config containing a parameter tci-StatesToAddModList, which may comprise up to maxNrofTCI-States entries of TCI-State. A base station may send (e.g., transmit) the message via RRC signaling for a target PDSCH. A subsequent MAC CE message may activate/update/down-select up to $N_{PDSCH-TCI}$ (e.g., $N_{PDSCH-TCI}$=8) reference TCI states out of the entries of TCI-State. The base station may send (e.g., transmit) to a wireless device DCI indicating a reference TCI state out of the $N_{PDSCH-TCI}$ values. The wireless device may, based on the reference TCI state, determine an Rx beam to receive a downlink signal via the target PDSCH. Similar to the MAC CE for TCI activation/down-selection of PDCCH, the MAC CE command for TCI activation/down-selection of PDSCH may consume a separate set of time-frequency resources, which may result in increased signaling overhead.

The message 2501 may comprise one or more configuration parameters, for example, for TCI state indication for a downlink RS (e.g., a periodic CSI-RS resource). The one or more configuration parameters may comprise, for example, an RRC IE of NZP-CSI-RS-Resource containing a parameter nzp-CSI-RS-ResourceId and/or a parameter qcl-InfoPeriodicCSI-RS, which may indicate a parameter TCI-StateId. The wireless device may, based on the TCI-StateId, determine an Rx beam to receive the target periodic CSI-RS resource. For TCI state indication of an aperiodic CSI-RS resource, the message 2501 may comprise an RRC IE of CSI-AssociatedReportConfigInfo, (e.g., further specifying a target aperiodic CSI-RS resource set) and/or a parameter qcl-info, which indicates a parameter TCI-StateId. The wireless device may, based on the TCI-StateId, determine an Rx beam to receive the target aperiodic CSI-RS, for example, based on (e.g., after or in response to) receiving DCI (e.g., comprising a CSI request field) triggering an aperiodic CSI-RS reception, which may result in increased signaling overhead, especially if a larger quantity of CSI-RS resources (e.g., up to maxNrofNZP-CSI-RS-Resources=192) are configured.

A base station may indicate, to a wireless device via a message using a dedicated radio resource, a reference spatial relation information ("SPRI"). The SPRI may be for a target physical uplink channel (e.g., PUCCH or PUSCH) or a target uplink RS (e.g., SRS or DMRS). The wireless device may send (e.g., transmit) an uplink signal, via the target channel/signal, with/using a Tx beam (e.g., uplink spatial domain filter) that may be determined based on the reference SPRI. For SPRI indication of PUCCH, a message may comprise an RRC IE of PUCCH-Config containing up to maxNrofSpatialRelationInfos entries of PUCCH-SpatialRelationInfo (i.e., SPRI). A subsequent MAC CE command, for a target PUCCH resource, may, for example, activate, update, or down-select one reference SPRI (e.g., out of the entries of SPRI). A wireless device may, based on the one reference SPRI, determine a Tx beam to send (e.g., transmit) an uplink signal via the target PUCCH resource. The MAC CE command may be sent (e.g., transmitted), on a separate set of time-frequency resources, for each PUCCH resource. Increased signaling overhead may result, especially if a large quantity of PUCCH resources are configured (e.g., up to maxNrofPUCCH-Resources=128, or any other quantity). SPRI indication of a target SRS resource may comprise an RRC IE of SRS-Resource and/or a parameter spatialRelationInfo, which may indicate a reference SPRI. The wireless device may (e.g., based on the spatialRelationInfo) determine a Tx beam to send (e.g., transmit) the target SRS resource, which may result in increased signaling overhead, especially if a large quantity of SRS resources (e.g., up to maxNrofSRS-Resources=64 or any other quantity) are configured.

Figure 26:
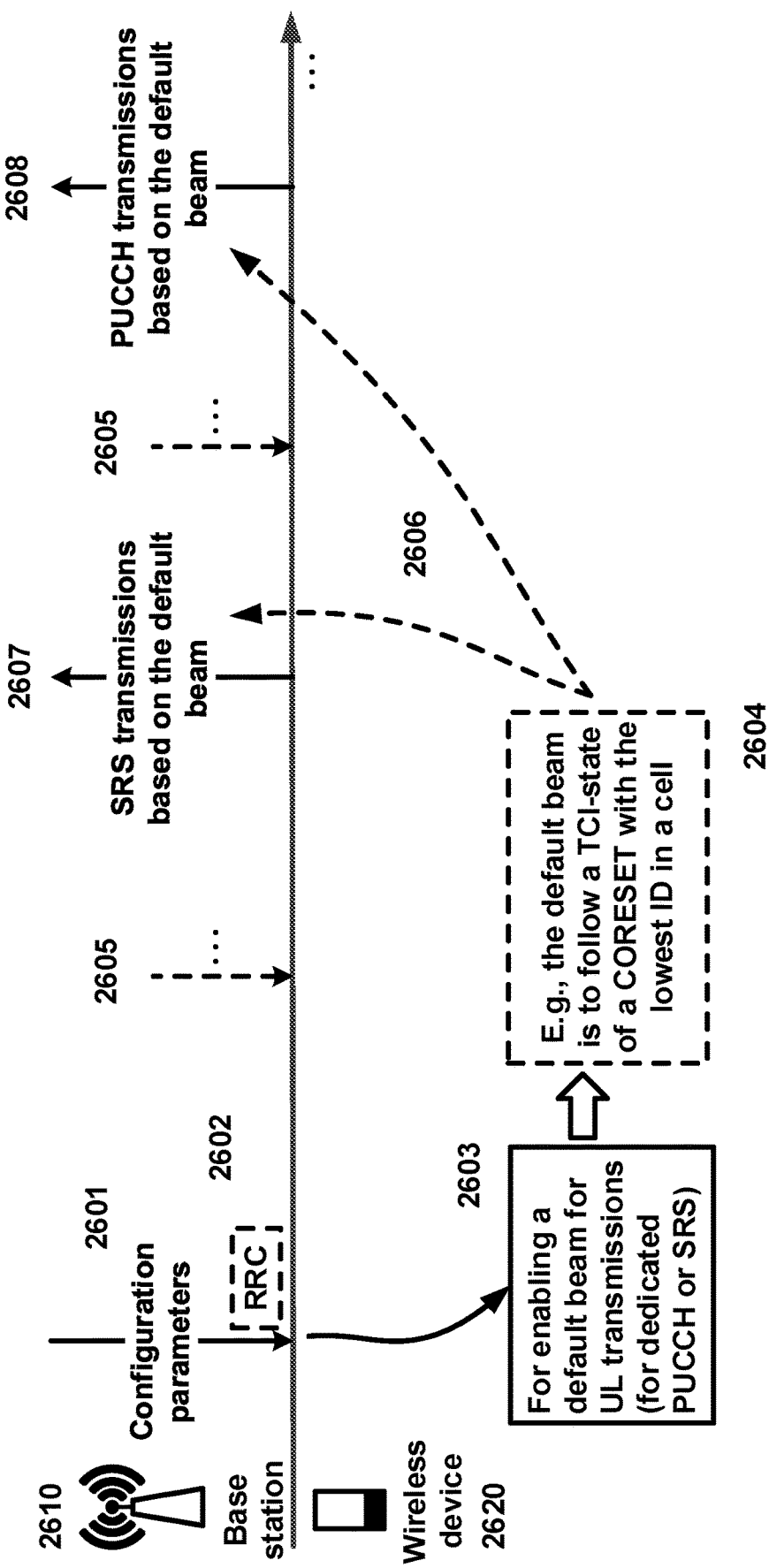
FIG. 26 shows an example using a default beam management for uplink transmission.

FIG. 26 shows an example of using a default beam for uplink transmission. The uplink transmission may comprise one or more of an SRS, PUCCH, and/or PUSCH transmission. At least some wireless devices based on a target channel specific beam indication (e.g., TCI or SPRI) may require large signaling overhead for the multi-beam operation. To reduce signaling overhead, such wireless devices may receive (e.g., a configuration parameter 2601 from a base station 2610 enabled to configure a default beam 2603 for uplink transmissions, for example, for PUCCH, PUSCH, or SRS. The default beam may comprise a spatial setting (e.g., for PDCCH receptions) by a wireless device 2620 in the CORESET with the lowest ID on the active DL BWP of the PCell. The default beam for uplink transmissions may be semi-statically linked to the beam used for the CORESET with the lowest ID (e.g., 2604), and used to send (e.g., transmit) SRS transmission 2607 and PUCCH transmissions 2608 based on the TCI state 2606. By using a default beam in such a manner, a loss of beam selection flexibility for multi-beam operation may result (e.g., such as with a loss of downlink beams 2605) and/or a beam mismatch may occur between a downlink preferred beam (e.g., 2606) and an uplink preferred beam, for example, depending on wireless channel conditions and/or a wireless device's capability with respect to beam correspondence. Improvements may be made in latency, efficiency (e.g., lower latency and overhead) and/or beam selection flexibility based on multi-beam operation (e.g., downlink and/or uplink beam management) such as described herein.

In at least some wireless communications, using a per-channel beam indication and/or a single default beam for transmissions may result in loss of beam selection flexibility for multi-beam operation, increased signaling overhead, and/or increased latency. A TCI state indication per channel/signal (e.g., PDSCH, PDCCH, or CSI-RS) may be received by a wireless device using a different radio resource and/or different signaling (e.g., DCI, MAC CE, RRC, etc.). For example, a dedicated MAC-CE message may be used for each CORESET, for example, for a PDCCH beam indication. A separated MAC-CE message for activating up to 8 TCI states (or another quantity of TCI states) for a PDSCH and DCI may further indicate one of them, for example, for a PDSCH beam indication. A dedicated RRC parameter (e.g., qcl-info) may configure a TCI state per CSI-RS resource, for example, or periodic CSI-RS, which may result in increased signaling overhead, especially if a large quantity of CSI-RS resources (e.g., up to 192 or any other quantity) are configured. Uplink beam indication may be different and separated, for example, by using one or more parameters (e.g., PUCCH-SpatialRelationInfo for PUCCH or spatialRelationInfo for SRS), which increase signaling overhead. A default beam (e.g., as a TCI state of a CORESET with the lowest index, etc.) for uplink transmission may reduce at least some signaling overhead, but may result in loss of beam selection flexibility for multi-beam operation.

As described herein, a base station may send (e.g., transmit) one or more messages (e.g., a control command) to a wireless device comprising a reference TCI (e.g., indication of a TCI state) and/or one or more lists of one or more target signals/channels, which may improve beam selection flexibility and/or reduce overhead relative to a per-signal/channel beam. The wireless device may determine (e.g., based on the reference TCI) a spatial domain filter for the list(s), for example, based on (e.g., after or in response to) receiving the one or more messages. An indication (e.g., a beam indication) may indicate a TCI state for a plurality of signals/channels. The plurality of signals/channels may be for any transmission and/or reception (e.g., for downlink transmission(s), for uplink transmission(s), and/or for uplink transmission(s) and downlink transmission(s)). The TCI state may be associated with (and/or may indicate) a spatial filter (e.g., a spatial domain filter, a spatial transmission filter, a spatial filter for reception, and/or the like). The spatial filter may correspond to a beam for transmission and/or reception. The beam (or spatial filter) may be referred to as a common beam, for example, based on the beam (or spatial filter) being associated with a plurality of signals/channels. Similarly, a beam indication may be referred to as a common beam indication, for example, based on the beam indication indicating a plurality of signals/channels. A spatial filter may be used for transmission and/or reception of the plurality of signals (e.g., via the plurality of channels). The wireless device may use the reference TCI for transmission/reception of multiple signals/channels. The multiple signals/channels may be determined, for example, based on at least one of the lists. The wireless device may receive a downlink signal associated with a first signal/channel on one of the lists with/using the spatial domain filter, and may send (e.g., transmit) an uplink signal associated with a second signal/channel on one of the lists with the same spatial domain filter. The wireless device may receive one or more downlink signals associated with one or more of first signals/channels on one of the lists with/using the spatial domain filter, and/or may send (e.g., transmit) one or more uplink signals associated with one or more second signals/channels on one of the lists with the same spatial domain filter. For example, a spatial domain filter may be applied to a plurality of types of signals/channels. A person of ordinary skill would readily appreciate that any quantity of types of downlink and/or uplink signals/channels may be received/transmitted using the same spatial domain filter indicated by the TCI reference and/or the one or more lists of one or more target signals/channels.

A base station may configure reference TCIs and/or lists of one or more target signals/channels. A wireless device may receive a control command indicating a reference TCI of the reference TCIs and/or a list of the lists of one or more target signals/channels. The wireless device may determine (e.g., based on the reference TCI), a spatial domain filter for the list, for example, based on (e.g., after or in response to) receiving the control command. The wireless device may receive a downlink signal of a first target signal/channel of the list with/using the spatial domain filter, and/or may send (e.g., transmit) an uplink signal of a second target channel of the list with/using the spatial domain filter. The wireless device may send (e.g., transmit) the uplink signal of the second target signal/channel of the list, for example, based on a transmit power control of the uplink signal. The transmit power control may be based on the pathloss estimation with a downlink RS of the reference TCI (or a downlink RS linked or associated to the reference TCI). Improvements may be achieved in downlink and/or uplink (e.g., unified/common) beam selection flexibility (e.g., based on the control command). Lower latency and/or reduced signaling overhead (e.g., based on the determined spatial domain filter to be commonly used for the list comprising one or more target channels) may result for multi-beam operations.

One or messages (e.g., a control command) comprising a reference TCI may not be successfully received/decoded by a wireless device. A significant performance loss may occur, for example, if an indication of TCI state and/or spatial domain filter (e.g., a beam indication) fails to be received by the wireless device successfully (e.g., based on the indication being for multiple channels via a single DCI or MAC CE signaling). Increased reliability for a beam indication may be achieved, for example, by using an acknowledgement. For example, a wireless device may send (e.g., transmit) an acknowledgment indicating a successful reception of a control command for a beam indication. The wireless device may send the acknowledgement, for example, based on (e.g., after or in response to receiving) the control command for a beam indication. A base station may be able to determine that the wireless device did not successfully receive a control command (e.g., for the beam indication), for example, based on receiving the acknowledgement. The base station may re-send the control command, for example, based on receiving the acknowledgement. Using an acknowledgement message as described herein may help to reduce a likelihood of performance loss (e.g., using a control command for transmission and/or reception of a plurality of downlink and/or uplink signals/channels) and/or may improve wireless device and base station communications (e.g., improve synchronization, reduce re-transmissions, decrease latency, reduce an ambiguity period of an uncertainty on successful reception of a control command, and/or improve robustness of communication link quality).

A wireless device may not be able to apply/use a beam indication for a downlink reception and/or for an uplink transmission, for example, for a time duration after receiving a control command indicating a beam (e.g., based on wireless device processing capability and/or delay). The base station may not know if the wireless device uses the beam indication (e.g., for downlink control and/or data channels, and/or for uplink control and/or data channels), for example, after a control command for the beam indication is sent (e.g., transmitted) from a base station to a wireless device. For example, the base station that sent the control command may not be able to determine whether the wireless device will use the beam most recently indicated by a control command or a prior beam used for an earlier reception/transmission. A significant performance loss may occur, for example, if a mismatch in applying/using the beam occurs between the base station and the wireless device. A wireless device and/or a base station may avoid and/or reduce the likelihood of such a mismatch, for example, based on using a time offset. A base station and/or a wireless device may determine a time offset for applying/using a reference TCI state (e.g., for one of the target reference signal lists), based on a control command. The time offset may be determined, for example, based on at least one of: a first timing for transmitting (e.g., by a base station) or receiving (e.g., by a wireless device) the control command, a second timing for a transmission (e.g., by the wireless device) or reception (e.g., by the base station) of an acknowledgment of the control command, and/or any other timing indicated/determined by the wireless device and/or by the base station. Using a timing offset may reduce a likelihood of performance loss (e.g., using a control command for transmission and/or reception of a plurality of downlink and/or uplink signals/channels) and/or may improve wireless device and base station communications (e.g., improve synchronization, reduce re-transmissions, decrease latency, reduce an ambiguity period of the mismatch, improve robustness of communication link quality, etc.).

Figure 27:
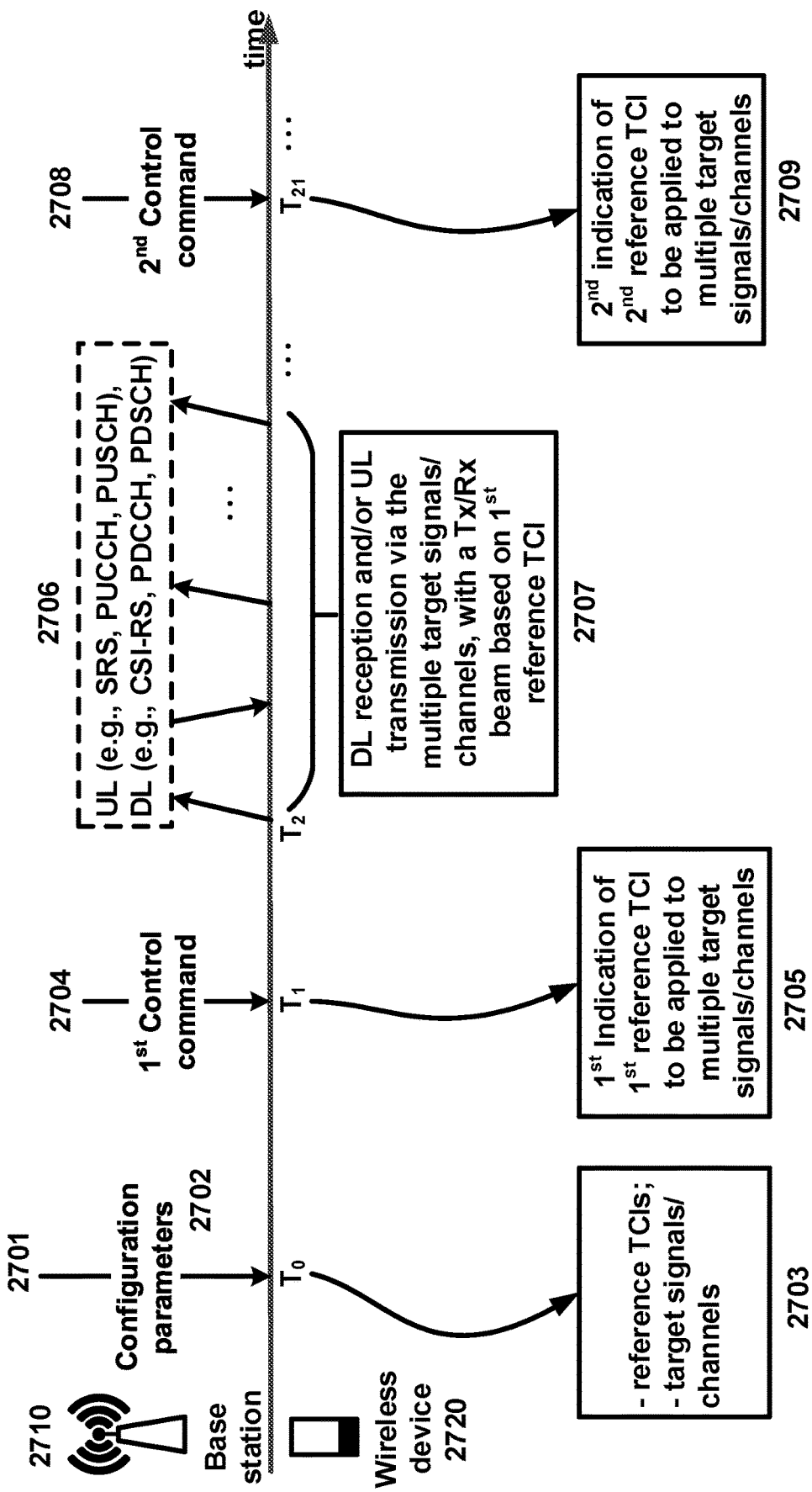
FIG. 27 shows an example of wireless communications for transmissions using a beam indication.

FIG. 27 shows an example of wireless communications for transmissions using a beam indication. A base station 2710 may send (e.g., transmit) to a wireless device 2720 one or more messages 2701. The one or more messages 2701 may comprise one or more RRC messages. The one or more messages may comprise configuration parameters 2702. The configuration parameters 2702 may comprise candidate sets of reference TCIs and/or candidate sets of target signals/channels 2703. The base station 2710 may send (e.g., transmit) a control command 2704 (e.g., $1^{st}$ control command) to the wireless device 2720. The control command 2704 may indicate, activate, and/or update a reference TCI 2705 (e.g., $1^{st}$ reference TCI) to be used (e.g., commonly) by at least one (e.g., multiple) target signals/channels 2706. The at least one target signals/channels 2706 may comprise any quantity of any type(s) of uplink and/or downlink signals/channels. For example, the signals/channels 2706 may comprise any combination of one or more of: a PUCCH, a PUSCH, an SRS, a PDCCH (e.g., associated with a CORESET), a PUSCH, a PRACH, a DMRS, a PTRS, a CSI-RS, and/or any other signal/channel. The wireless device 2720 may communicate, for example, during a subsequent given time period, with the base station 2710 via a downlink signal and/or an uplink signal based on the at least one target signals/channels 2706 and/or the indicated reference TCI 2705 (e.g., as a unified downlink/uplink TCI). The wireless device 2720 may determine a Tx/Rx configuration or filter 2707 (e.g., spatial domain filter, beam, and/or parameters of wireless channels for reception of the downlink signal or transmission of the uplink signal). The Tx/Rx configuration parameters may comprise at least one of: a spatial domain filter, an average delay, a delay spread, a Doppler shift, a Doppler spread, and/or an average power. The given time period may comprise a time duration between a time instance (e.g., with a pre-defined/configured time offset) based on time $T_1$ at receiving the first control command and a time instance, (e.g., with a pre-defined/configured time offset) based on time $T_{21}$ at receiving a second control command 2708 (e.g., of the same type/format or different type/format), which may indicate, activate, and/or update the reference TCI 2705 with a second reference TCI 2709. After receiving the second control command 2708, the wireless device may apply the second reference TCI 2709 to signals/channels indicated by the control command 2708 for downlink reception and/or uplink transmission of the indicated signals/channels at least after time $T_{21}$. The wireless communications for transmission using a beam as described herein may provide advantages such as improved latency, increased efficiency in managing beams (e.g., TCIs, (downlink/uplink) TCI states, SRS resource indicators ("SRIs") or SPRIs, etc.) for multi-beam operation, and/or increased flexibility of beam configuration for variable of downlink or uplink signal/channels.

A candidate set of target signals/channels may comprise one or more types of signals/channels. For example, at least one (e.g., each or any other quantity) of the candidate set may comprise at least one of: an SRS, a PUCCH (e.g., with associated DMRS), a PUSCH (e.g., with associated DMRS), a CSI-RS, a PDCCH (e.g., with associated DMRS), a PDSCH (e.g., with associated DMRS), a pathloss ("PL")-RS (for an uplink channel), a phase-tracking reference signal ("PTRS"), a tracking reference signal ("TRS"), and/or a PRACH. The SRS may comprise a pre-defined or configured set of SRS resources. The PUCCH may comprise a predefined or configured set of PUCCH resources (e.g., in a given/configured BWP/CC). The PUSCH may comprise a PUSCH in a given or configured BWP/CC. The CSI-RS may comprise a pre-defined or configured set of CSI-RS resources (e.g., in a given/configured BWP/CC). The PDCCH may comprise a PDCCH in a given or configured BWP/CC. The PDSCH may comprise a PDSCH in a given or configured BWP/CC. The PL-RS may comprise a periodic and/or semi-persistent downlink RS (e.g., associated/configured with an uplink signal/channel). The PTRS may comprise a PTRS in a given/configured BWP/CC (e.g., in order for the wireless device to track phases over wireless channels in the time domain, such as in high frequency regions). The TRS may comprise a pre-defined or configured set of CSI-RS resources configured with trs-Info (e.g., in a given/configured BWP/CC). The PRACH may comprise a PDCCH-ordered PRACH transmission (e.g., in a given/configured BWP/CC).

A candidate set of target signals/channels may comprise one or more types of signals/channels. For example, at least one (e.g., each or any other quantity) of the candidate set may comprise at least one of: an SRS resources, a PUCCH resources (e.g., with associated DMRS), a PUSCH with associated DMRS, a CSI-RS resources, PDCCH with a CORESET ID (e.g., with associated DMRS), a PDSCH (e.g., with associated DMRS), a PL-RS (e.g., for a uplink signal/channel), PTRS (e.g., with associated DMRS), a TRS as CSI-RS resource set(s), and/or a PRACH. A set of SRS resources may comprise an SRS resource set/group (e.g., configured with an SRS resource set/group ID). A set of PUCCH resources may comprise a PUCCH resource set/group (e.g., configured with a PUCCH resource set/group ID). A set of CSI-RS resources may comprise a CSI-RS resource set/group (e.g., configured with a CSI-RS resource set/group ID).

A base station may send (e.g., transmit) to a wireless device one or more messages comprising configuration parameters of reference TCI states and/or signal identifiers. A signal identifier may indicate one or more target RSs. One or more target RSs may be indicated, for example, by the signal identifier, a channel identifier, and/or by any other identifier. The base station may send (e.g., transmit) a control command comprising a field indicating at least one of: a reference TCI state of the reference TCI states, and/or a signal identifier. The wireless device may determine (e.g., based on the reference TCI state), a spatial domain filter (e.g., a beam) of the one or more target RSs indicated by the signal identifier. The wireless device may use the spatial domain filter of the one or more target RSs at least until a new control command is received and/or processed. The wireless device may receive, via a first one of the one or more target RSs, a downlink signal with/using the spatial domain filter (e.g., beam), and may send (e.g., transmit), via a second one of the one or more target RSs, an uplink signal with/using the spatial domain filter. The wireless device may send (e.g., transmit) the uplink signal based on a transmit power control of the uplink signal. The transmit power control may be based on the pathloss estimation associated with a downlink RS of the reference TCI state and/or a downlink RS linked to the reference TCI state.

Figure 28:
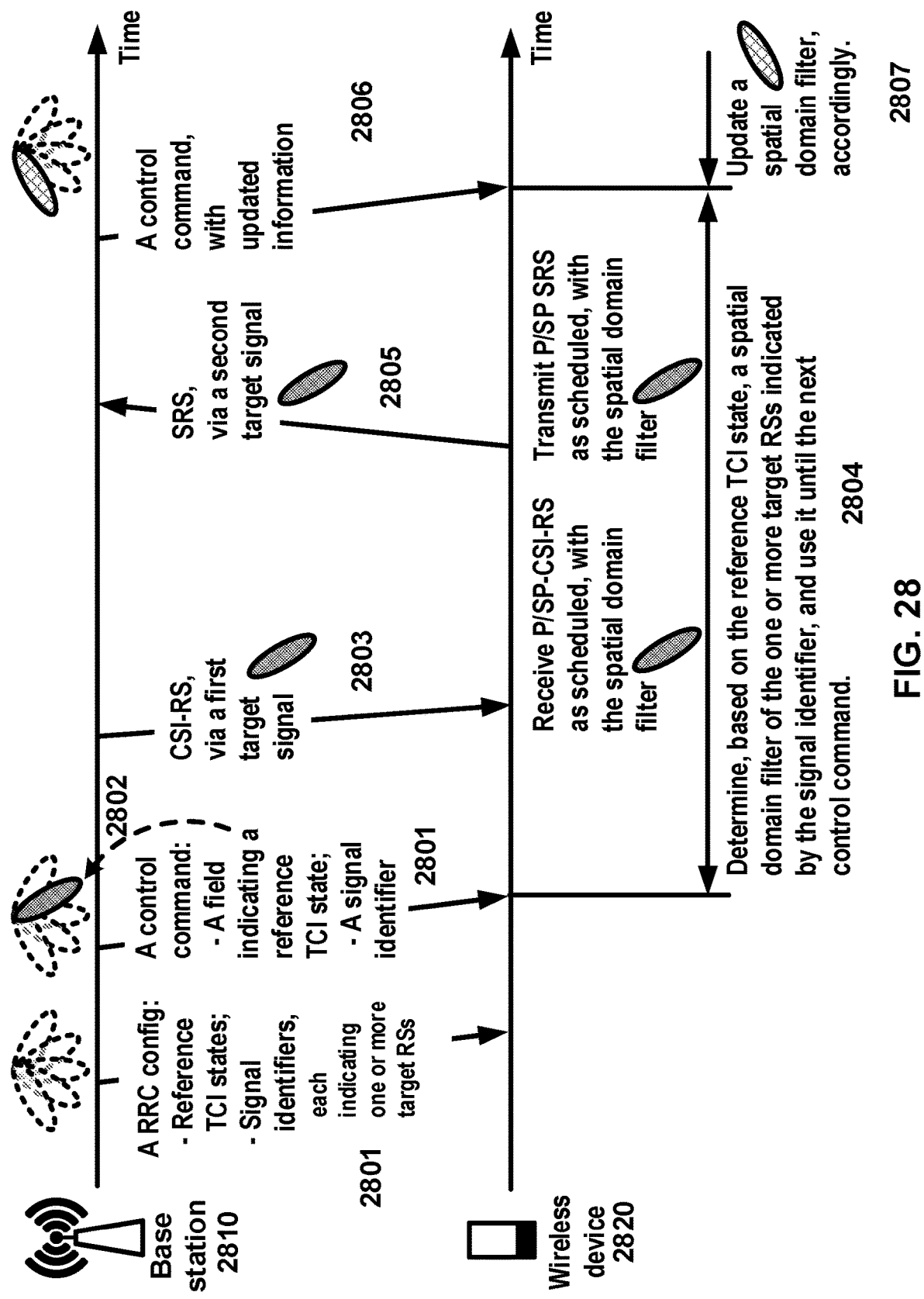
FIG. 28 shows an example of wireless communications using a beam indication for downlink and/or uplink transmission(s).

FIG. 28 shows an example of wireless communications for transmissions using a beam indication for downlink and/or uplink transmission(s). Wireless communications may use a beam, for example, for periodic/semi-persistent channel state information-reference signal (CSI-RS) reception and/or sounding reference signal (SRS) transmission. A base station 2810 may send (e.g., transmit) to a wireless device 2820 one or more messages 2801. The one or more messages 2801 may comprise one or more configuration parameters of reference TCI states and/or identifiers (e.g., signal identifiers). An identifier (e.g., each identifier) may indicate one or more target RSs. A target RS may be indicated, for example, by a signal identifier, a channel identifier, or by any other identifier. The first one of the one or more target RSs may comprise periodic and/or semi-persistent CSI-RS 2803 (e.g., a pre-defined/configured set of CSI-RS resources (e.g., in a given/configured BWP/CC) or CSI-RS resource set/group (e.g., configured with a CSI-RS resource set/group ID). The wireless device 2820 may receive the configured CSI-RS 2803 as periodic/semi-persistent CSI-RS, with/using the spatial domain filter 2804 determined by the reference TCI state 2802. The second one of the one or more target RSs may comprise periodic or semi-persistent SRS 2805 (e.g., a pre-defined/configured set of SRS resources such as in a given/configured BWP/CC, or SRS resource set/group such as configured with a SRS resource set/group ID. The wireless device 2820 may send (e.g., transmit) the (pre-scheduled/configured/activated) SRS 2805 as periodic/semi-persistent SRS, with/using the spatial domain filter 2804 determined by the reference TCI state 2802. The wireless device 2820 may send (e.g., transmit) the SRS 2805 based on a transmit power control of the SRS. The transmit power control may be based on the pathloss estimation with a downlink RS of the reference TCI state 2802 or a downlink RS linked/associated to the reference TCI state (e.g., among downlink RS(s) configured in, for example, a message (e.g., RRC and/or MAC CE message) comprising candidate PL-RS(s) (e.g., for SRS)). A subsequent control command 2806 may be used to update to a different spatial domain filter 2807 for one or more subsequent messages.

Figure 29:
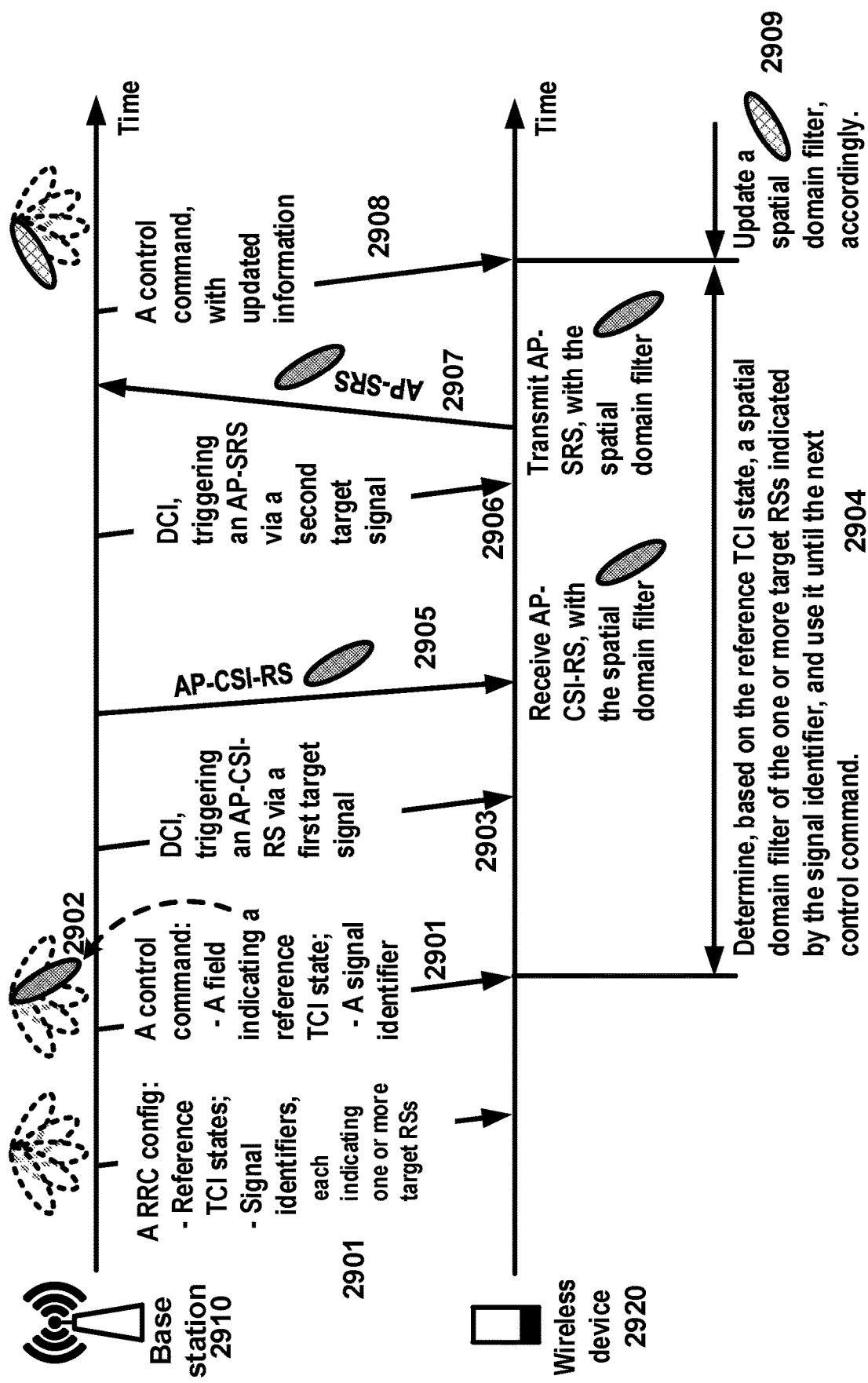
FIG. 29 shows an example of wireless communications using a beam indication for downlink and/or uplink transmission(s).

FIG. 29 shows an example of wireless communications using a beam indication for downlink and/or uplink transmission(s). Wireless communications may use a beam, for example, for aperiodic CSI-RS reception and SRS transmission. A base station 2910 may send (e.g., transmit) to a wireless device 2920 one or more messages 2901. The one or more messages 2901 may comprise configuration parameters of reference TCI states 2902 and/or identifiers (e.g., signal identifiers). An identifier (e.g., each identifier) may indicate one or more target RSs. A target RS may be, indicated, for example, by the signal identifier, a channel identifier, and/or by any other identifier. The first one of the one or more target RSs may comprise aperiodic CSI-RS (e.g., a pre-defined/configured set of aperiodic CSI-RS resources (such as in a given/configured BWP/CC) or aperiodic CSI-RS resource set/group (such as configured with a CSI-RS resource set/group ID)). The wireless device 2920 may determine, based on the reference TCI state 2902, a spatial domain filter 2904 of the one or more target RSs indicated by the signal identifier. The wireless device may use the spatial domain filter 2905 at least until a next control command is received. The wireless device 2920 may receive DCI 2903 triggering the aperiodic CSI-RS reception 2905. The CSI-RS may correspond to the first one of the one or more target RSs. The wireless device 2920 may receive the CSI-RS 2905 with/using the spatial domain filter 2904 determined by the reference TCI state 2902. The second one of the one or more target RSs may comprise aperiodic SRS (e.g., a pre-defined/configured set of aperiodic SRS resources (such as in a given/configured BWP/CC) or aperiodic SRS resource set/group (such as configured with a SRS resource set/group ID)). The wireless device 2920 may receive DCI 2906 triggering the aperiodic SRS transmission. The SRS may correspond to the second one of the one or more target RSs. The wireless device 2920 may send (e.g., transmit) the SRS 2907 with/using the spatial domain filter 2904 determined by the reference TCI state 2902. The wireless device 2920 may send (e.g., transmit) the SRS 2907, for example, based on a transmit power control of the SRS. The transmit power control may be based on the pathloss estimation with a downlink RS of the reference TCI state 2902 or a downlink RS linked to the reference TCI state 2902 (e.g., among downlink RS configured in a message comprising candidate PL-RS (e.g., for SRS)). The first one of the one or more target RSs may comprise downlink DMRS. The wireless device may receive the downlink DMRS with/using the spatial domain filter 2904 determined by the reference TCI state. The second one of the one or more target RSs may comprise uplink DMRS. The wireless device 2920 may send (e.g., transmit) the uplink DMRS with the spatial domain filter 2904 determined by the reference TCI state 2902. A subsequent control command 2908 may be used to update to a different spatial domain filter 2909 for one or more subsequent messages.

Figure 30:
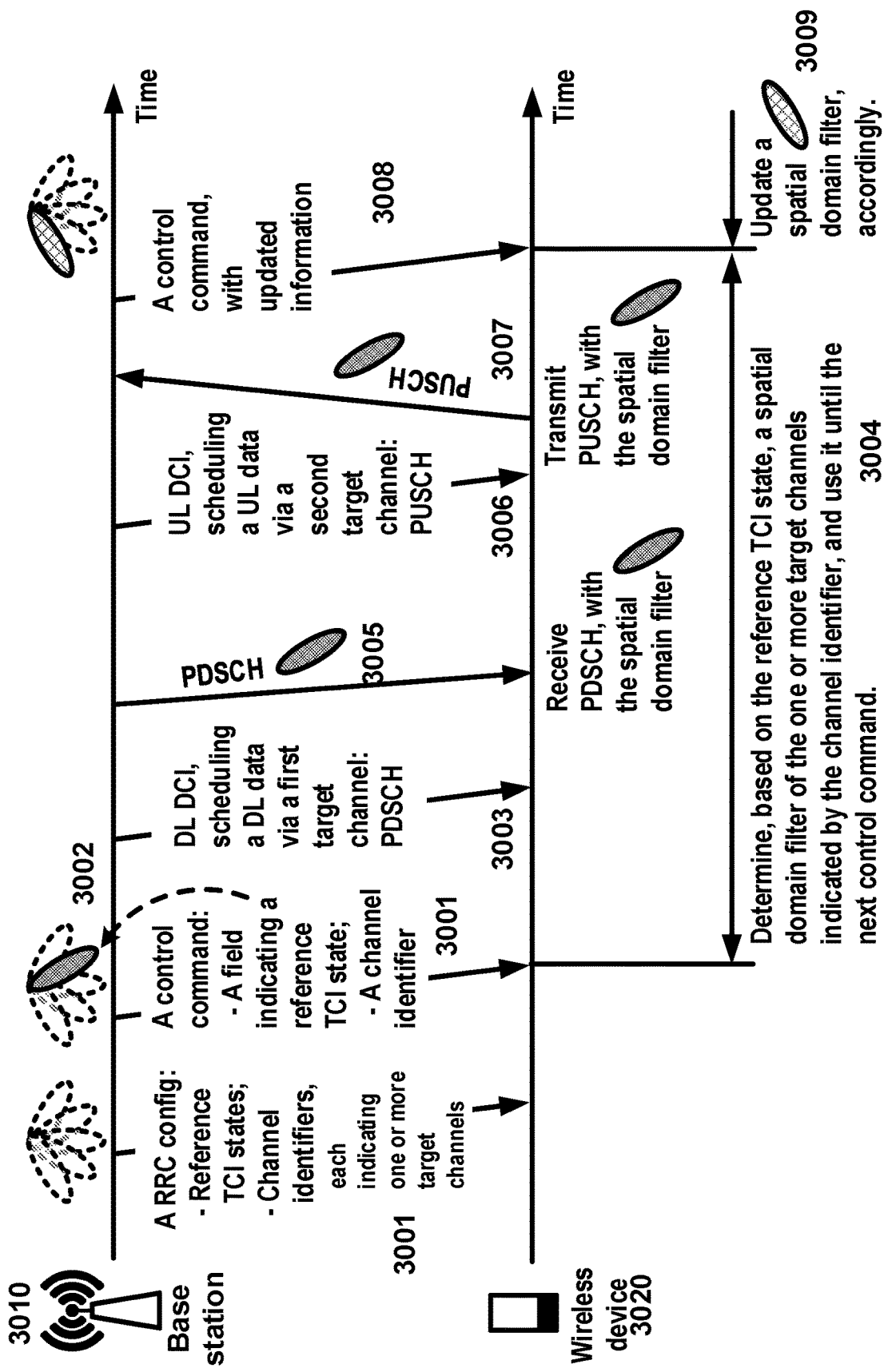
FIG. 30 shows an example of wireless communications using a beam indication for downlink and/or uplink data channel transmission(s).

FIG. 30 shows an example of wireless communications using a beam indication for downlink and/or uplink data channel transmission(s). A base station 3010 may send (e.g., transmit) to a wireless device 3020 one or more messages 3001. The one or more messages 3001 may comprise configuration parameters of reference TCI states 3002 and/or identifiers (e.g., signal identifiers). An identifier (e.g., each identifier) may indicate one or more target RSs. A target RS may be, indicated, for example, by a signal identifier, a channel identifier, and/or an identifier. The first one of the one or more target RSs/channels (indicated, for example, by a signal identifier, or by a channel identifier, or by a signal/channel identifier, or by an identifier, or by an indicator, or by an indication, etc.) may comprise a DMRS associated with a downlink reception (e.g., PDSCH). The wireless device 3020 may receive a downlink scheduling grant 3003 (e.g., DCI) scheduling a transport block via a PDSCH associated with the DMRS. The wireless device may receive the transport block 3005 (e.g., data) via the PDSCH with/using the spatial domain filter 3004 determined by the reference TCI state 3002. The second one of the one or more target RSs/channels may comprise a DMRS associated with an uplink transmission (e.g., PUSCH). The wireless device 3020 may receive an uplink scheduling grant 3006 (e.g., DCI) scheduling a transport block via a PUSCH associated with the DMRS. The wireless device may send (e.g., transmit) the transport block 3007 (e.g., data) via the PUSCH with/using the spatial domain filter 3004 determined by the reference TCI state 3002. The wireless device 3020 may send (e.g., transmit) the transport block 3007 (e.g., data), for example, based on a transmit power control of the transport block (e.g., PUSCH). The transmit power control may be based on the pathloss estimation with a downlink RS of the reference TCI state or a downlink RS linked to the reference TCI state 3002 (e.g., among downlink RS configured in a message comprising candidate PL-RS (e.g., for PUSCH)). A subsequent control command 3008 may be used to update to a different spatial domain filter 3009 for one or more subsequent messages.

The first target RSs/channels may be indicated, for example, by a signal identifier, a channel identifier, or by any other identifier. The first target RSs/channels may comprise a DMRS associated with a semi-persistent downlink reception (e.g., semi-persistent PDSCH). The wireless device may receive a semi-persistent-scheduling ("SPS") activation DCI activating a periodically-sending (e.g., -transmitting) transport block via a semi-persistent PDSCH associated with the DMRS. The wireless device may receive (semi-) periodically the transport block (e.g., data) via the PDSCH with the spatial domain filter determined by the reference TCI state. The second target RSs/channels may be indicated, for example, by a signal identifier, a channel identifier, or by any other identifier. The second target RSs/channels may comprise a DMRS associated with a semi-persistent uplink transmission (e.g., semi-persistent PUSCH). The wireless device may receive an SPS-activation DCI activating a (periodically-scheduled) transport block via a semi-persistent PUSCH associated with the DMRS. The wireless device may send (e.g., transmit) (semi-) periodically the transport block (e.g., data) via the PUSCH with the spatial domain filter determined by the reference TCI state.

Figure 31:
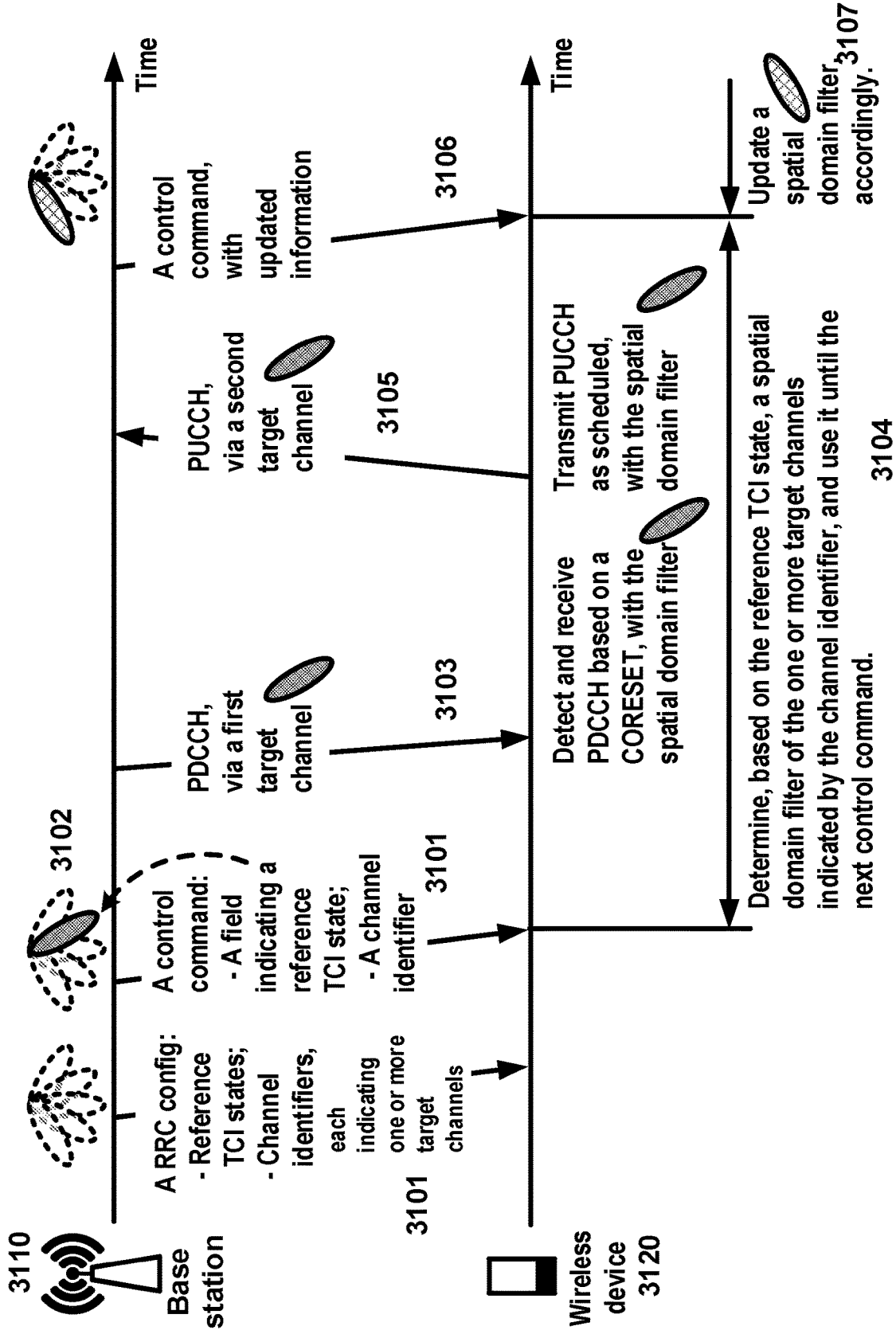
FIG. 31 shows an example of wireless communications using a beam indication for downlink and/or uplink control channel transmission(s).

FIG. 31 shows an example of wireless communications using a beam indication for downlink and/or uplink control channel transmission(s). A base station 3110 may send (e.g., transmit) to a wireless device 3120 one or more messages 3101. The one or more messages 3101 may comprise one or more configuration parameters. The one or more configuration parameters may indicate one or more reference TCI states 3102 and/or identifiers (e.g., signal identifiers). An identifier (e.g., each identifier) may indicate one or more target RSs. The one or more target RSs may be indicated, for example, by a signal identifier, a channel identifier, and/or by any other identifier. The first one of the one or more target RSs/channels may be indicated, for example, by a signal identifier, a channel identifier, or by any other identifier. The first target RSs may comprise a DMRS associated with a downlink reception via a control channel (e.g., PDCCH). The wireless device may receive DCI (e.g., by monitoring a search space, associated with a CORESET), with/using the spatial domain filter 3104 determined by the reference TCI state 3102, via the PDCCH 3103, (e.g., based on the CORESET) associated with the DMRS. The second one of the one or more target RSs/channels may be indicated, for example, by a signal identifier, a channel identifier, and/or by any other identifier. The second one of the one or more target RSs/channels may comprise a DMRS associated with an uplink transmission via a control channel (e.g., PUCCH). The wireless device 3120 may send (e.g. transmit) Uplink Control Information ("UCI") (e.g., an SR, a channel state information ("CSI"), an acknowledgement ("ACK"), or a negative acknowledgement ("NACK")), with/using the spatial domain filter 3104 determined by the reference TCI state 3102, via the PUCCH 3105 (e.g., a PUCCH resource or a PUCCH resource group) associated with the DMRS. The wireless device 3120 may send (e.g., transmit) the UCI, for example, based on a transmit power control of the UCI (e.g., PUCCH). The transmit power control may be based on the pathloss estimation with a downlink RS of the reference TCI state 3102 or a downlink RS linked/associated to the reference TCI state 3102 (e.g., among downlink RS configured in a message (e.g., RRC and/or MAC CE message) comprising candidate PL-RS(s) (e.g., for PUCCH)). A subsequent control command 3106 may be used to update to a different spatial domain filter 3107 for one or more subsequent messages.

The second one of the one or more target RSs may be/channels indicated, for example, by a signal identifier, a channel identifier, or by any other indicator. The second one of the one or more target RSs may comprise a DMRS associated with a semi-persistent uplink transmission via a control channel (e.g., semi-persistent PUCCH). The wireless device may (semi-) periodically send (e.g., transmit) a UCI (e.g., semi-persistent CSI (reporting)), with/using the spatial domain filter determined by the reference TCI state, via the PUCCH (e.g., over a PUCCH resource or a PUCCH resource group) associated with the DMRS.

FIG. 32 shows an example of a signal/channel identifier. The signal/channel identifier may indicate/identify one or more target channels. A codepoint '01010' of the signal/channel identifier may be (pre-)configured by a base station (e.g., by higher-layer signaling, e.g., RRC signaling) as 'PDSCH, PUSCH, and PUCCH', wherein the base station may further indicate the codepoint '01010' with a reference TCI (e.g., by sending a (subsequent) control command) and the wireless device may determine a Tx/Rx configuration filter (e.g., spatial domain filter) based on the indicated reference TCI (e.g., as a unified downlink/uplink TCI) to use/apply for subsequent downlink receptions (e.g., PDSCH) and uplink transmissions (e.g., PUSCH, PUCCH), based on the codepoint '01010' indicating the one or more target signal(s)/channels as 'PDSCH, PUSCH, and PUCCH' to be applicable/usable with the determined Tx/Rx configuration filter (e.g., spatial domain filter).

A codepoint '01100' of the signal/channel identifier may be configured by a base station (e.g., by higher-layer signaling, e.g., RRC signaling) as 'PDSCH, PDCCH with a CORESET #i, CSI-RS, and SRS resource set #l', wherein the base station may further indicate the codepoint '01100' with a reference TCI (e.g., by sending a subsequent control command) and the wireless device may determine a Tx/Rx configuration filter (e.g., spatial domain filter) based on the indicated reference TCI (e.g., as a unified downlink/uplink TCI) to use/apply for subsequent downlink receptions (e.g., PDSCH, PDCCH (e.g., DCI) detected or received based on the CORESET #i, CSI-RS resources received (e.g., in a given/configured BWP/CC)) and uplink transmissions (e.g., SRS resources configured in the SRS resource set #l), based on the codepoint '01100' indicating the one or more target channels as 'PDSCH, PDCCH with a CORESET #i, CSI-RS, and SRS resource set #l' to be applicable/usable with the determined Tx/Rx configuration filter (e.g., spatial domain filter).

A codepoint '01101' of the signal/channel identifier may be configured by a base station (e.g., by higher-layer signaling, e.g., RRC signaling) as 'PDCCH with a CORESET #$i_2$, PUCCH resource group #$j_1$, and PUCCH resource group #$j_2$', wherein the base station may further indicate the codepoint '01101' with a reference TCI (e.g., by sending a (subsequent) control command) and the wireless device may determine a Tx/Rx configuration filter (e.g., spatial domain filter) based on the indicated reference TCI (e.g., as a unified downlink/uplink TCI) to use for subsequent downlink receptions (e.g., PDCCH (e.g., DCI) detected or received based on the CORESET #$i_2$ (e.g., in a given/configured BWP/CC)) and uplink transmissions (e.g., PUCCH (e.g., UCI) over PUCCH resource(s) in (configured) PUCCH resource group #$j_1$, PUCCH (e.g., UCI) over PUCCH resource(s) in (configured) PUCCH resource group #$j_2$ (e.g., in a given/configured BWP/CC)), based on the codepoint '01101' indicating the one or more target channels as 'PDCCH with a CORESET #$i_2$, PUCCH resource group #$j_1$, and PUCCH resource group #$j_2$' to be applicable/usable with the determined Tx/Rx configuration filter (e.g., spatial domain filter).

Figure 33:
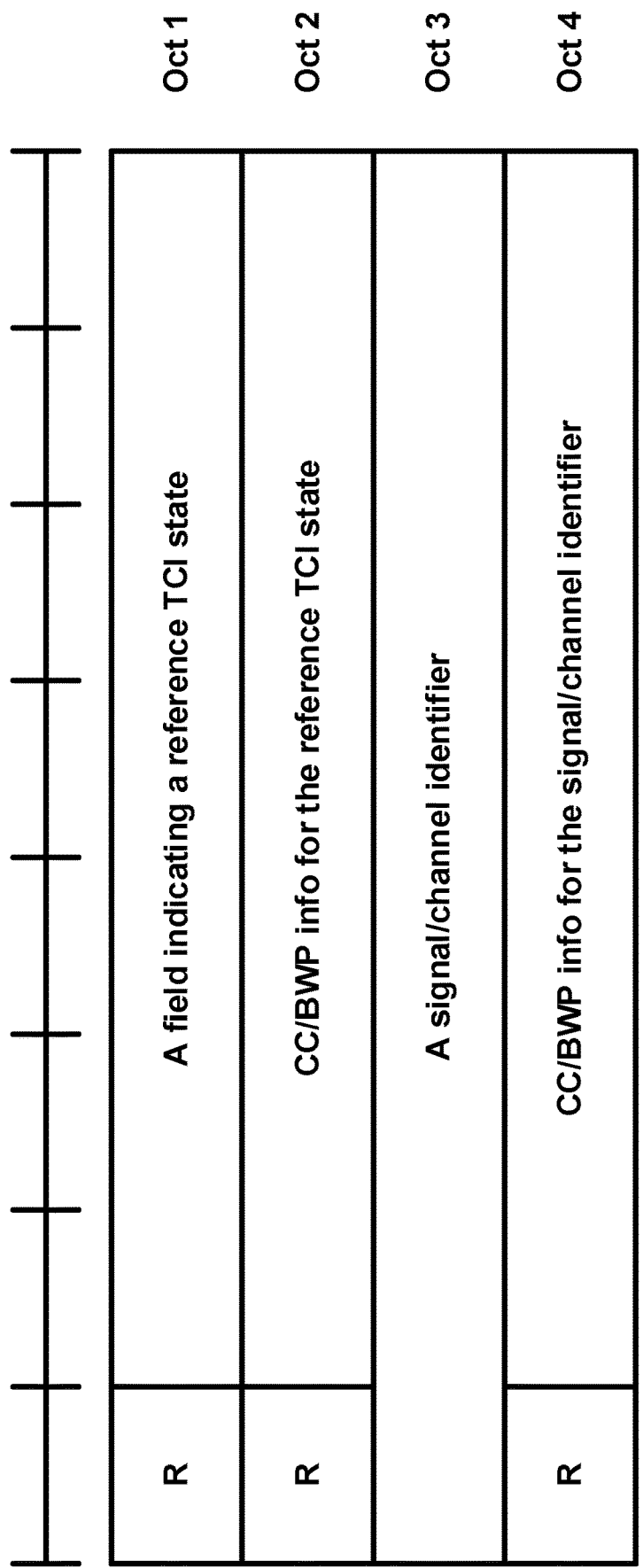
FIG. 33 shows an example of a control command.

FIG. 33 shows an example of a control command. The control command may comprise, for example, a MAC CE message. The control command may indicate a reference TCI state (e.g., as a field inside the message or indicating it implicitly/indirectly (e.g., associated by a message/field/parameter, etc.)) and a signal/channel identifier (e.g., as a field inside the message or indicating it implicitly/indirectly (e.g., associated by a message/field/parameter, etc.)). The reference TCI state may comprise/indicate a CC(s)/BWP(s) associated with the reference TCI state. An RS in the reference TCI state may be sent and/or received via the indicated CC(s)/BWP(s). The information on the CC(s)/BWP(s) may comprise a field inside the message and/or may be indicated indirectly, for example, by a message, field, and/or parameter. The indicated channel identifier may comprise indicating a CC(s)/BWP(s) associated with the indicated channel identifier. The indicated channel(s) may be sent (e.g., transmitted) and/or received via the indicated CC(s)/BWP(s). The information on the CC(s)/BWP(s) may be comprised as a field inside the message or indicated indirectly, for example, by a message, field, or parameter. The control command may comprise a field, content, and/or message, jointly indicating both the reference TCI state of the reference TCI states and the signal/channel identifier. The control command may (or may not) comprise a DL/UL scheduling information with resource allocation.

Figure 34:
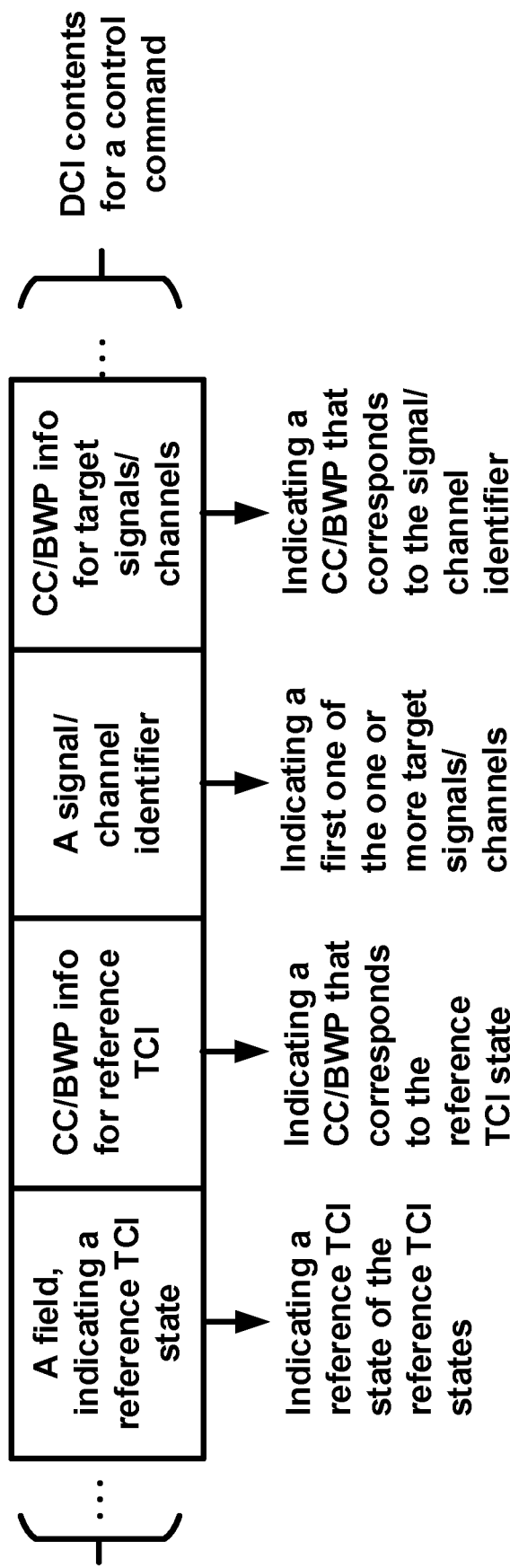
FIG. 34 shows an example of a control command.

FIG. 34 shows an example of a control command. The control command may comprise, for example, DCI. The DCI may indicate a reference TCI state (e.g., as a field inside the DCI). The DCI may indicate a reference TCI state implicitly/indirectly, such as by a message/field/parameter (e.g., "Transmit configuration indication," "SRS resource indicator", etc.) and/or a signal/channel identifier (e.g., as a field inside the DCI). The indicated reference TCI state may comprise indicating a CC(s)/BWP(s) associated with the reference TCI state. A RS in the reference TCI state may be sent (e.g., transmitted) and/or received via the indicated CC(s)/BWP(s). The information on the CC(s)/BWP(s) may be comprised as a field inside the DCI or indicated indirectly (e.g., associated by a message/field/parameter, e.g., "Carrier indicator" and/or "Bandwidth part indicator"). The indicated channel identifier (or the indication implicitly/indirectly) may comprise indicating a CC(s)/BWP(s) associated with the indicated channel identifier (or the indication implicitly/indirectly). The indicated signal(s)/channels may be sent (e.g., transmitted) and/or received via the indicated CC(s)/BWP(s). The information on the CC(s)/BWP(s) may be contained as a field inside the DCI and/or indicated implicitly/indirectly (e.g., associated by a message/field/parameter, e.g., "Carrier indicator" and/or "Bandwidth part indicator"). The control command may comprise a field, jointly indicating both the reference TCI state of the reference TCI states and/or the (explicit/implicit) signal/channel identifier. The control command as a DCI may be cyclic-redundancy-check ("CRC")-scrambled by a radio network temporary identifier ("RNTI"), which may be different from the RNTI for a downlink/uplink scheduling grant. The control command may (or may not) comprise a downlink/uplink scheduling information with resource allocation.

FIG. 35 shows an example for validation of a control command. The control command may comprise DCI. The DCI may indicate a reference TCI state (e.g., as a field inside the DCI, or indicating it indirectly, for example, associated by a message, field, or parameter). The DCI may indicate a channel identifier (e.g., as a field inside the DCI, or indicating it indirectly, for example, associated by a message, field, or parameter). The DCI may comprise a field for validation of identifying the DCI indicating the control command. A field of "HARQ process number" in the DCI may be coded/set to all '0's. A field of "Redundancy version" in the DCI may be coded/set to '00'. A field of "New data indicator" in the DCI may be coded/set to '0'. A field of "Time domain resource assignment" in the DCI may be coded/set to all '0'. A field of "frequency domain resource assignment" in the DCI may be coded/set to all '0'. The wireless device may receive the DCI with the fields with the coded/set values. The wireless device may identify/indicate, with validation, the DCI carrying the control command using the fields (e.g., "Frequency hopping flag", "Modulation and coding scheme", "TPC command for scheduled PUSCH", "padding bits", "Identifier for DCI formats", "DFI flag", "HARQ-ACK bitmap", "Downlink assignment index", "1$^{st}$ downlink assignment index", "2$^{nd}$ downlink assignment index", "SRS resource indicator", "Precoding information and number of layers", "Antenna ports", "SRS request", "CSI request", "CBG transmission information (CBGTI)", "PTRS-DMRS association", "beta_offset indicator", "DMRS sequence initialization", "UL-SCH indicator", "Open-loop power control parameter set indication", "Priority indicator", "Invalid symbol pattern indicator", "Minimum applicable scheduling offset indicator", "SCell dormancy indication", "Random Access Preamble index", "SS/PBCH index", "PRACH Mask index", "VRB-to-PRB mapping", "TPC command for scheduled PUCCH", "PDSCH-to-HARQ_feedback timing indicator", "ChannelAccess-CPext", "Short Messages Indicator", "Short Messages", "TB scaling", "Rate matching indicator", "ZP CSI-RS trigger", "PUCCH resource indicator", "One-shot HARQ-ACK request", "PDSCH group index", "New feedback indicator", "Number of requested PDSCH group(s)", "Transmit configuration indication", "CBG flushing out information (CBGFI)", "Closed loop indicator", and "TPC command") with a pre-configured bitwidth in the DCI. The control command may comprise a field, jointly indicating both the reference TCI state of the reference TCI states and the channel identifier. The control command (e.g., as DCI) may be CRC-scrambled by a RNTI, which may be different from the RNTI for a downlink/uplink scheduling grant.

A base station may configure parameters indicating candidate sets of reference TCIs and candidate sets of target channels, and may send (e.g., transmit) a control command to a wireless device, indicating a reference TCI to be used by one or more target channels. The wireless device may communicate, for example, during a (subsequent) given time period, with the base station via a downlink signal and an uplink signal based on the target channels, with a determined Tx/Rx configuration filter (e.g., spatial domain filter) based on the indicated reference TCI (e.g., as a unified downlink/uplink TCI). A candidate set of reference TCIs may comprise at least one of: a downlink RS (e.g., CSI-RS resource, an SSB index, etc.), and/or an uplink RS (e.g., SRS resource, etc.). A candidate set of reference TCIs may comprise a downlink RS which the wireless device may determine based on the most recent contention-based random access ("CBRA") result. A candidate set of reference TCIs may comprise an indication for the wireless device to follow the current active reference TCI state for the lowest PUCCH resource (e.g., in a given/configured BWP/CC). A candidate set of reference TCIs may comprise an (explicit/implicit) indication for the wireless device to follow the TCI state with the lowest ID among the activated TCI states for PDSCH (e.g., in a given/configured BWP/CC). A candidate set of reference TCIs may comprise an (explicit/implicit) indication for the wireless device to determine the lowest PUCCH resource among the PUCCH resources in a UL BWP. A candidate set of reference TCIs may comprise an (explicit/implicit) indication for the wireless device to follow the TCI state for the lowest CORESET ID of a BWP.

A candidate set of reference TCIs may comprise an indication/identification of a TRP (e.g., as a transmission point of a downlink signal or as a reception point of an uplink signal). The candidate set of reference TCIs may comprise an indication/identification of a TRP, for example, with/using an identifier for a TRP (e.g., a CORESET pool index). A candidate set of reference TCIs may comprise an indication/identification of a panel (e.g., as a transmission panel of an uplink signal or as a reception panel of a downlink signal), for example, with an identifier for a panel (e.g., a panel index). This may provide benefits for the wireless device to identify a reference TCI with the corresponding transmission source/point with the indication/identification of a TRP, to determine a spatial domain filter based on the reference TCI from the TRP. This may provide benefits for the base station to indicate from which panel the wireless device sends (e.g., transmits) an uplink signal with a determined spatial domain filter based on the reference TCI with an indication/identification of a TRP and/or an indication/identification of a panel. The wireless device may determine its uplink transmission panel and/or the spatial domain filter corresponding to its reception panel of the indicated reference TCI from the indicated TRP. The wireless device may determine its uplink transmission panel and/or the spatial domain filter corresponding to the indicated reference TCI with the panel ID. The base station may indicate the wireless device's uplink transmission panel and/or the spatial domain filter with the reference TCI with a TRP ID. The base station may indicate the wireless device's uplink transmission panel and/or the spatial domain filter with the reference TCI with a panel ID.

Figure 36:
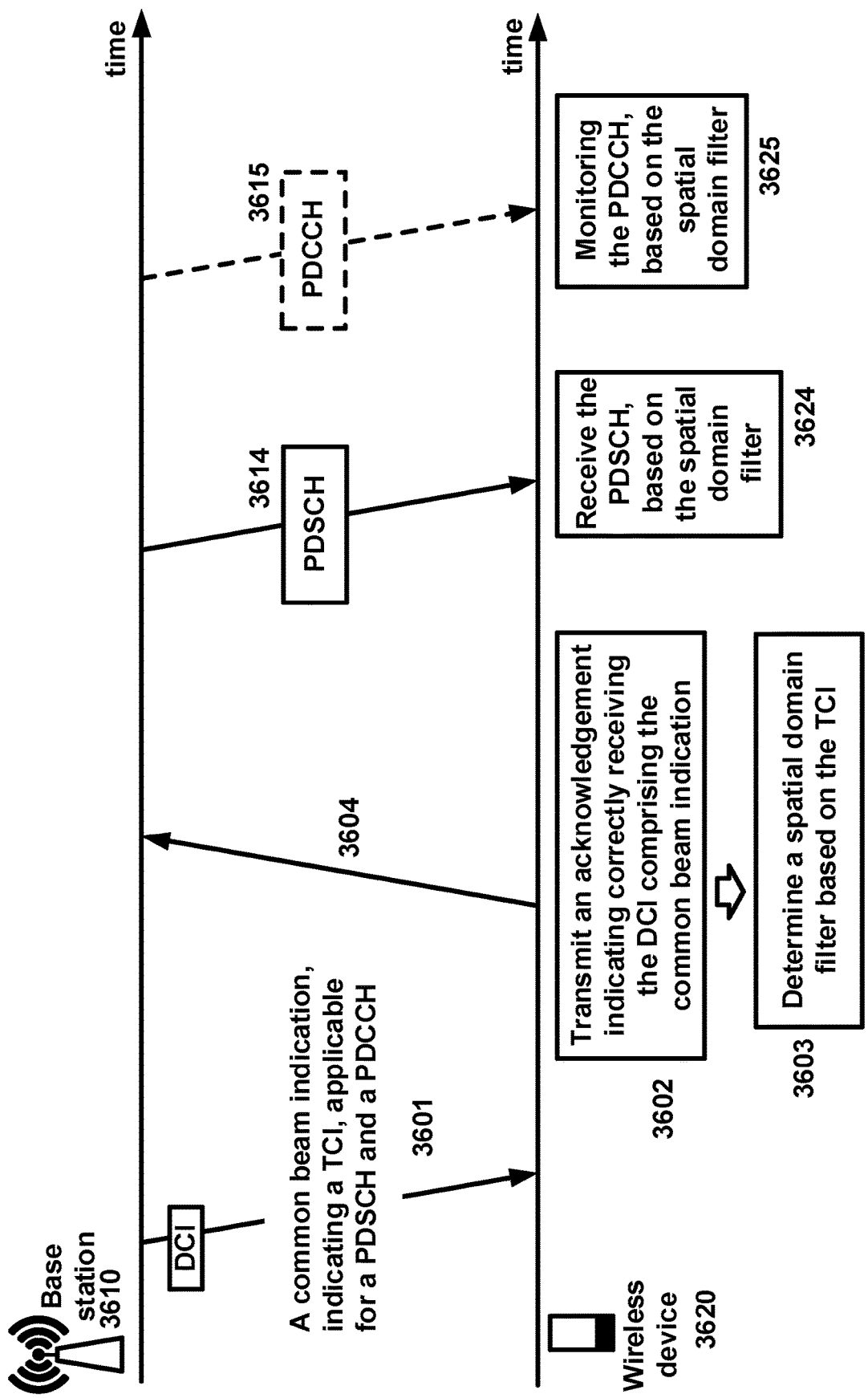
FIG. 36 shows an example of wireless communications comprising acknowledgement of a beam indication.

FIG. 36 shows an example of wireless communications comprising acknowledgement of a beam indication. The acknowledgement may indicate a spatial domain filter determination. A wireless device 3620 may send (e.g., transmit) an ACK/NACK message 3604 based on (e.g., after or in response) to receiving the control command 3601. A base station 3610 may configure/indicate for the wireless device 3620 to send (e.g., transmit) the ACK/NACK message 3604 in response to receiving the control command 3601. The ACK/NACK message may be different from (e.g., or the same as, or reused by the same feedback message of, or shared with the same message of) a hybrid automatic repeat request (HARQ) ACK feedback in response to a downlink scheduling grant from the base station. The wireless device 3620 may encode the ACK/NACK message 3604 in concatenation with (e.g., or as a part of, as being reused by the same message of, or as being shared with the same message of) the HARQ ACK feedback message and send (e.g., transmit) them together to the base station. The base station 3610 may configure/indicate for the wireless device 3620 to encode the ACK/NACK message 3604 in concatenation with (e.g., or as a part of, as being reused by the same message of, or as being shared with the same message of) the HARQ ACK feedback message and send (e.g., transmit) them together to the base station 3610. The wireless device 3620 may encode the ACK/NACK message 3604 independently and send (e.g., transmit) the message to the base station 3610. The base station 3610 may configure/indicate for the wireless device 3620 to encode the ACK/NACK message 3604 independently and send (e.g., transmit) the message to the base station 3610. The wireless device 3620 may determine a spatial domain filter 3603 based on the TCI 3601. The wireless device 3620 may receive (e.g., at 3624) a PDSCH 3614 based on the spatial domain filter 3603. The wireless device 3620 may then monitor (e.g., at 3625) for an incoming PDCCH 3615 (e.g., DCI via a PDCCH) based on the spatial domain filter. By using an acknowledgement, reliability may be improved in delivering the control command and/or helping to ensure that the wireless device correctly receives the control command and follows the control message.

Figure 37:
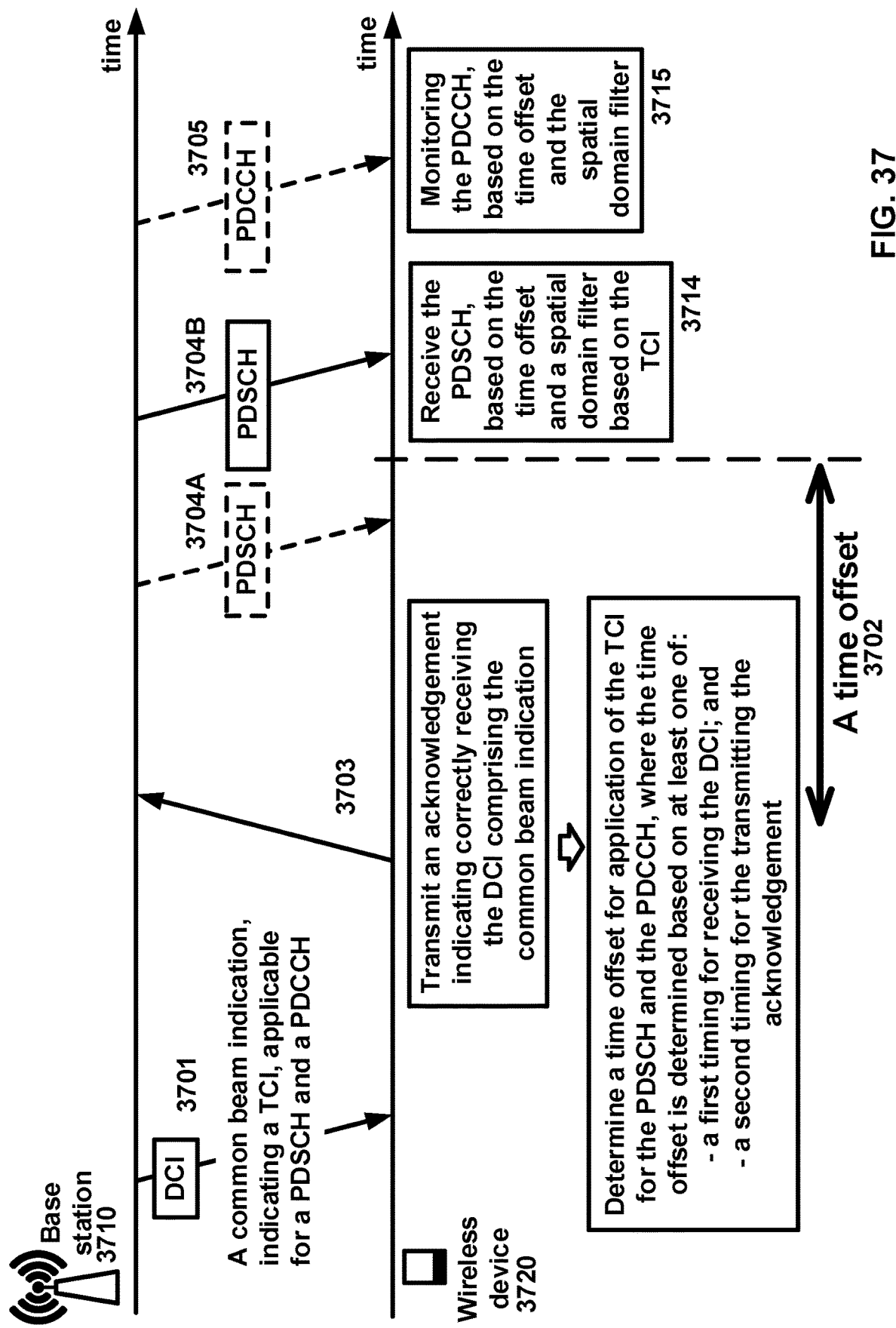
FIG. 37 shows an example of wireless communications comprising application of a time offset for using a beam indication.

FIG. 37 shows an example of wireless communications comprising application of a time offset for using a beam indication (e.g., applying a spatial domain filter based on a beam indication). The time offset may be used for determining an application of a TCI state (e.g., spatial domain filter, beam, etc.). A base station 3710 may send one or more messages to configure/indicate 3701 (e.g., by RRC and/or by MAC CE) a time offset (e.g., a time offset parameter) 3702 for a wireless device 3720 to apply/use a spatial domain filter (e.g., after receiving the control command). The time offset 3702 may be determined in relation to a transmission instance of the ACK message 3703 from the wireless device informing the base station 3710 of the successful reception of the control command 3701. The wireless device 3720 may send (e.g., transmit), to the base station 3710, one or more capability messages (e.g., UECapabilityInformation IE) comprising the wireless device's capability information associated with the time offset parameter. The wireless device may send (e.g., transmit) the capability messages based on (e.g., after or in response to) receiving, from the base station, one or more messages (e.g., RRC message(s)) for capability enquiry (e.g., UECapabilityEnquiry IE). The wireless device 3720 may receive (e.g., at 3714) a PDSCH 3704B based on (e.g., after) the time offset 3702. The wireless device 3720 may not receive a PDSCH 3704A before the time offset 3702. The wireless device 3720 may not receive the PDSCH 3704A before the time offset using the spatial domain filter determined at step 3702, for example, if the PDSCH 3704A is scheduled for reception prior to the time offset. Additionally or alternatively, the wireless device 3720 may receive the PDSCH 3704A before the time offset using a spatial domain filter (e.g., a different/ default/previous spatial domain filter) used/determined prior to receiving the control command 3701. The wireless device 3720 may receive an indication of a spatial domain filter that may be determined, for example, based on the TCI. The wireless device 3720 may monitor (e.g., at 3715) for an incoming PDCCH 3705 based on the time offset 3702 and/or the spatial domain filter.

A base station may configure/indicate (e.g., by RRC and/ or by MAC CE) a time window, for example, during which a wireless device may apply/use a spatial domain filter. The wireless device may determine the starting position of the time window, for example, based on the time offset parameter. The wireless device may send (e.g., transmit), to the base station, one or more capability messages (e.g., RRC messages, UECapabilityInformation IE, etc.) comprising the wireless device's capability information associated with the time window. The wireless device may send (e.g., transmit) the capability message(s) based on (e.g., after or in response to) receiving one or more messages for capability enquiry from the base station (e.g., RRC message(s), UECapabilityEnquiry IE, etc.).

A wireless device may receive, from a base station, one or more messages (e.g., RRC messages or MAC CE messages). The one or more messages may comprise configuration parameters. The configuration parameters may indicate reference TCI states and/or identifiers (e.g., signal identifiers). An identifier (e.g., each identifier) may indicate one or more target RSs. The wireless device may receive a control command comprising a field indicating a reference TCI state of the reference TCI states and/or an identifier (e.g., a signal identifier). The wireless device may determine (e.g., based on the reference TCI state) a spatial domain filter of the one or more target RSs indicated by the signal identifier. The wireless device may determine the spatial domain filter based on (e.g., after or in response to) receiving the control command. The wireless device may receive, via a first one of the one or more target RSs, one or more downlink signals with/using the spatial domain filter. The wireless device may send (e.g., transmit), via a second one of the one or more target RSs, one or more uplink signals with/using the spatial domain filter. The first one of the one or more target RSs may comprise at least one CSI-RS resource.

The wireless device may receive a DCI triggering an aperiodic CSI-RS reception of the first one of the one or more target RSs. The wireless device may receive, via the first one of the one or more target RSs, a downlink signal, wherein the wireless device may receive the triggered aperiodic CSI-RS with the spatial domain filter. The second one of the one or more target RSs may comprise SRS. The second one of the one or more target RSs may comprise at least one SRS resource. The second one of the one or more target RSs may comprise at least one SRS resource set. The wireless device may receive a DCI triggering an aperiodic SRS transmission of the second one of the one or more target RSs. The wireless device may send (e.g., transmit), via the second one of the one or more target RSs, an uplink signal, wherein the wireless device may send (e.g., transmit) the triggered aperiodic SRS with the spatial domain filter.

The first one of the one or more target RSs may comprise a DMRS. The wireless device may receive, via the first one of the one or more target RSs, a downlink signal, wherein the wireless device may receive the DMRS with the spatial domain filter. The wireless device may receive a DCI scheduling a transport block via PDSCH associated with the DMRS, wherein the wireless device may receive, via the PDSCH, the transport block with the spatial domain filter. The second one of the one or more target RSs may comprise a DMRS. The wireless device may send (e.g., transmit), via the second one of the one or more target RSs, an uplink signal, wherein the wireless device may send (e.g., transmit) the DMRS with the spatial domain filter. The wireless device may receive a DCI scheduling a transport block via PUSCH associated with the DMRS, wherein the wireless device may send (e.g., transmit), via the PUSCH, the transport block with the spatial domain filter. The first target RSs may comprise a DMRS, wherein the wireless device may receive a DCI with the spatial domain filter, via PDCCH associated with the DMRS. The first target RSs may comprise a DMRS, wherein the wireless device may receive a DCI with the spatial domain filter, via PDCCH based on a control resource set (e.g., CORESET) associated with the DMRS. The second target RSs may comprise a DMRS. The wireless device may send (e.g., transmit) an UCI, with/using the spatial domain filter, via PUCCH associated with the DMRS. The UCI may comprise one of an SR, a CSI, an ACK, or a NACK. The reference TCI state may comprise a downlink RS (e.g., one or multiple downlink RSs). Each downlink RS may correspond to being sent (e.g., transmitted) from a TRP (e.g., based on an indicated TRP ID) and/or may correspond to being configured for receiving at a wireless device's panel (e.g., based on an indicated panel ID that may be associated with the wireless device and/or uplink). The downlink RS may comprise a CSI-RS. The downlink RS may comprise an SSB.

The reference TCI state may comprise an uplink RS (e.g., one or multiple uplink RS(s). Each uplink RS sent (e.g., transmitted) by the wireless device may correspond to being received at or sent (e.g., transmitted) from a TRP (e.g., based on an indicated TRP ID) or may correspond to being configured for sending (e.g., transmitting) from a panel based on an indicated panel ID. The uplink RS may comprise an SRS. The reference TCI state comprises a RS (e.g., at least one among downlink RSs or uplink RSs, based on the beam correspondence at the wireless device). This may increase flexibility in managing downlink/uplink (e.g., unified) TCI (e.g., beam) for multi-beam operations based on multiple TRPs at a base station or based on multiple panels at a wireless device, where the control signaling overhead for TCI management may be largely reduced, based on the TCI control to be used commonly by the one or more target channels indicated by the control command. The reference TCI state may comprise a downlink RS which the wireless device determines based on the most recent CBRA result.

The reference TCI state may indicate for the wireless device to follow the current active reference TCI state for the lowest PUCCH resource (e.g., among the PUCCH resources in a UL BWP). The uplink BWP may be the current active uplink BWP corresponding to the downlink BWP on which the control command is delivered. The reference TCI state may indicate for the wireless device to follow the TCI state with the lowest ID among the activated TCI states for PDSCH. The reference TCI state may indicate for the wireless device to follow the TCI state for the lowest CORESET ID of a BWP (e.g., on which the control command may be delivered).

The control command may indicate a control channel/bandwidth part (CC/BWP) on which a signal of the reference TCI state is sent (e.g., transmitted). The control command may indicate a CC/BWP on which the wireless device receives, via the first one of the one or more target RS, a downlink signal with the spatial domain filter, wherein the indicated CC/BWP may further indicate one or more CCs/BWPs based on the one or more messages configured by the base station. The one or more messages may comprise an identification of the one or more CCs/BWPs which the indicated CC/BWP belongs to. The control command may indicate a CC/BWP on which the wireless device sends (e.g., transmits), via the second one of the one or more target RSs, an uplink signal with the spatial domain filter, wherein the indicated CC/BWP may further indicate one or more CCs/BWPs based on the one or more messages configured by the base station. The one or more messages may comprise an identification of the one or more CCs/BWPs which the indicated CC/BWP belongs to.

The reference TCI state may indicate a TRP. The reference TCI state may indicate/identify a TRP (e.g., by a TRP ID or a CORESET pool index). The reference TCI state may indicate a panel. The reference TCI state may indicate a panel of a wireless device (e.g., by a panel ID).

The one or more target RSs associated with the signal/channel identifier may indicate a TRP. The one or more target RSs associated with the channel identifier may indicate/identify a TRP (e.g., by a TRP ID or a CORESET pool index). The one or more target RSs associated with the signal/channel identifier may indicate a panel. The one or more target RSs associated with the signal/channel identifier may indicate/identify a panel of a wireless device (e.g., by a panel ID).

The wireless device may send (e.g., transmit) an ACK/NACK message. The wireless device may send the ACK/NACK message, for example, based on (e.g., after or in response to) the control command. The ACK/NACK message may be different from a HARQ ACK feedback based on (e.g., after or in response to) a downlink scheduling grant from a base station. The wireless device may encode the ACK/NACK message in concatenation with the HARQ ACK feedback message and send (e.g., transmit) them together to the base station. The wireless device may encode the ACK/NACK message independently and send (e.g., transmit) the message to the base station.

The one or more messages may comprise a time offset parameter for the wireless device to apply/use the spatial domain filter after receiving the control command. The wireless device may report its capability information on the time offset parameter. The time offset parameter may be determined based on a transmission instance of the ACK/NACK message.

The one or more messages may comprise a time window, for example, during which the spatial domain filter may be applied/used. The wireless device may report its capability information associated with the time window. The wireless device may determine the starting position of the time window, for example, based on the time offset parameter.

The control command may contain, for example a field, content, and/or message jointly indicating both the reference TCI state and the channel identifier. The one or more messages may comprise, for example, one or more RRC messages and/or MAC CE messages. The control command may comprise, for example, a MAC CE command and/or a DCI command. The DCI may be CRC-scrambled by an RNTI. The RNTI may be different from that for a downlink/uplink scheduling grant. The control command may (or may not) comprise a DL/UL scheduling information with resource allocation.

A wireless device may receive, from a base station, one or more messages (e.g., RRC messages and/or MAC CE messages). The one or more messages may comprise one or more configuration parameters. The one or more configuration parameters may indicate reference TCI states and/or identifiers (e.g., channel identifiers). An identifier (e.g., each identifier) may indicate one or more target channels. The wireless device may receive a control command comprising a field indicating a reference TCI state (e.g., of the reference TCI states) and/or an identifier (e.g., channel identifier). The wireless device may determine (e.g., based on the reference TCI state) a spatial domain filter of the one or more target channels indicated by the channel identifier. The wireless device may determine the spatial domain filter, for example, based on (e.g., after or in response to) receiving the control command. The wireless device may receive, via a first one of the one or more target channels, one or more downlink signals with/using the spatial domain filter. The wireless device may send (e.g., transmit), via a second one of the one or more target channels, one or more uplink signals with/using the spatial domain filter.

The wireless device may receive a DCI scheduling a transport block via the first one of the one or more target channels. The first target channels may comprise a PDSCH. The wireless device may receive, via the first one of the one or more target channels, a downlink signal. The wireless device may receive, via the PDSCH, the transport block with/using the spatial domain filter.

The wireless device may receive DCI scheduling a transport block via the second one of the one or more target channels. The second target channels may comprise a PUSCH. The wireless device may send (e.g., transmit), via the second one of the one or more target channels, an uplink signal. The wireless device may send (e.g., transmit), via the PUSCH, the transport block with/using the spatial domain filter.

The first one of the one or more target channels may comprise a PDCCH (e.g., based on a CORESET). The downlink signal may comprise DCI. The wireless device may receive, via the first one of the one or more target channels, the downlink signal. The wireless device may receive, via the PDCCH, the DCI with/using the spatial domain filter. The second one of the one or more target channels may comprise a PUCCH (e.g., a set of PUCCH resources or a PUCCH resource group). The uplink signal may comprise UCI (e.g., SR, CSI, or ACK/NACK). The wireless device may send (e.g. transmit), via the second one of the one or more target channels, the uplink signal. The wireless device may send (e.g., transmit), via the PUCCH, the UCI with/using the spatial domain filter.

The reference TCI state may comprise a downlink RS. The downlink RS may be, for example, a CSI-RS or an SSB. The reference TCI state may comprise, for example, an uplink RS-SRS and/or a downlink RS (e.g., determined based on the most recent CBRA result). The DL RS may be a synchronization signal block (SSB). The reference TCI state may comprise a UL RS—sounding reference signal (SRS). The reference TCI state may comprise a DL RS which the wireless device may determine, for example, based on the most recent contention-based random access (CBRA) result. The reference TCI state may indicate for the wireless device to follow the current active reference TCI state for the lowest PUCCH resource. The wireless device may determine the lowest PUCCH resource among the PUCCH resources in an uplink BWP. The uplink BWP may be the current active uplink BWP corresponding to the downlink BWP on which the control command is delivered. The reference TCI state may indicate for the wireless device to follow the TCI state with the lowest ID among the activated TCI states for PDSCH. The reference TCI state may indicate for the wireless device to follow the TCI state for the lowest CORESET ID of a BWP. The BWP may be the downlink BWP on which the control command is delivered. The control command may indicate the BWP as a downlink BWP.

The control command may indicate a CC/BWP on which a signal of the reference TCI state may be sent (e.g., transmitted). The control command may indicate a CC/BWP on which the wireless device receives, via the first target channels, a downlink signal with/using the spatial domain filter. The indicated CC/BWP may indicate one or more CCs/BWPs. The one or more messages may comprise an identification/indication of the one or more CCs/BWPs to which the indicated CC/BWP may belong. The control command may indicate a CC/BWP on which the wireless device may send (e.g., transmit), via the second target channels, an uplink signal with/using the spatial domain filter. The indicated CC/BWP may indicate one or more CCs/BWPs. The one or more messages may comprise an identification/indication of the one or more CCs/BWPs to which the indicated CC/BWP may belong.

The reference TCI state may comprise a CORESET pool index. The reference TCI state may comprise a panel ID. The one or more target channels associated with the channel identifier may comprise a CORESET pool index. The one or more target channels associated with the channel identifier may comprise a panel ID.

Figure 38:
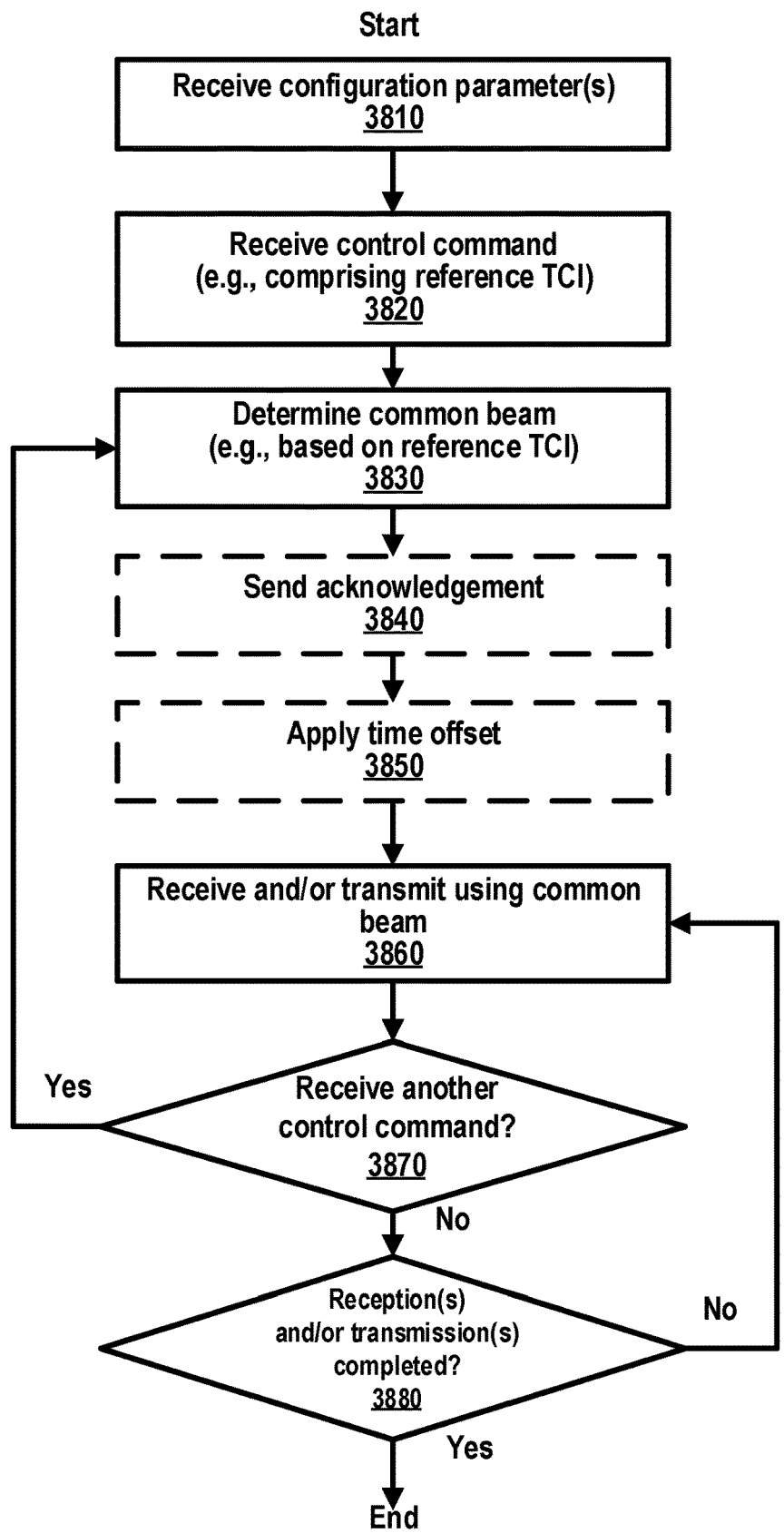
FIG. 38 shows an example method for wireless communications using a beam indication.

FIG. 38 shows an example method for wireless communications using a beam indication. The method may be performed by a wireless device and/or any other computing device. At step 3810, a wireless device may receive, from a base station, one or more messages (e.g., RRC messages and/or MAC CE messages). The one or more messages may comprise one or more configuration parameters. The one or more configuration parameters may indicate one or more reference TCI states and/or one or more identifiers/lists. An identifier (e.g., each identifier) of the one or more identifiers may indicate a list of one or more target signals/channels and/or one or more target RSs. Step 3810 may correspond to step 2701 time $T_0$ described with respect to FIG. 27 (e.g., 2701, 2703). At step 3820, the wireless device may receive a control command. The control command may comprise an indication (e.g., a first field) indicating a reference TCI state (e.g., of the reference TCI states indicated at step 3810) and/or an identifier (e.g., a second field) indicating (e.g., of the one or more identifiers at step 3810 and/or indicating a list of the lists). At step 3820, the wireless device may determine (e.g., based on the reference TCI/reference TCI state), a spatial domain filter for the list indicated by the identifier (e.g., based on, after, and/or in response to receiving the control command). At step 3840, the wireless device may send, to the base station, an acknowledgement, such as described with respect to step 3602 and acknowledgement regarding FIG. 36. At step 3850, the wireless device may apply a time offset, such as described with respect to step 3702 regarding FIG. 37. Step 3840 and/or step 3850 may be optional, and/or may be performed in any order (e.g., simultaneously, overlapping, before, or after the other). At step 3860, the wireless device may receive and/or transmit using the beam. For example, the wireless device may receive one or more downlink signals, of a first one of the list, with/using the spatial domain filter. The wireless device may send (e.g., transmit) one or more uplink signals, of a second one of the list, with/using the same spatial domain filter. The wireless device may receive and/or transmit any quantity of downlink and/or uplink signals corresponding to signal type(s) of the list of signals indicated by an identifier at step 3820. At step 3820, the wireless device may receive another control command, such as described with respect to step 2708 regarding FIG. 27. The wireless device may return to step 3830, for example, based on receiving another control command. At step 3860, the wireless device may determine whether all reception(s) and/or transmission(s) indicated/configured/scheduled (e.g., by the control command(s) and/or by other form(s) of indication(s)) have been successfully received/transmitted. The wireless device may return to step 3860, for example, based on a determination that all reception(s) and/or transmission(s) indicated/configured/scheduled (e.g., by the control command(s) and/or by other form(s) of indication(s)) have not been successfully received/transmitted.

Figure 39:
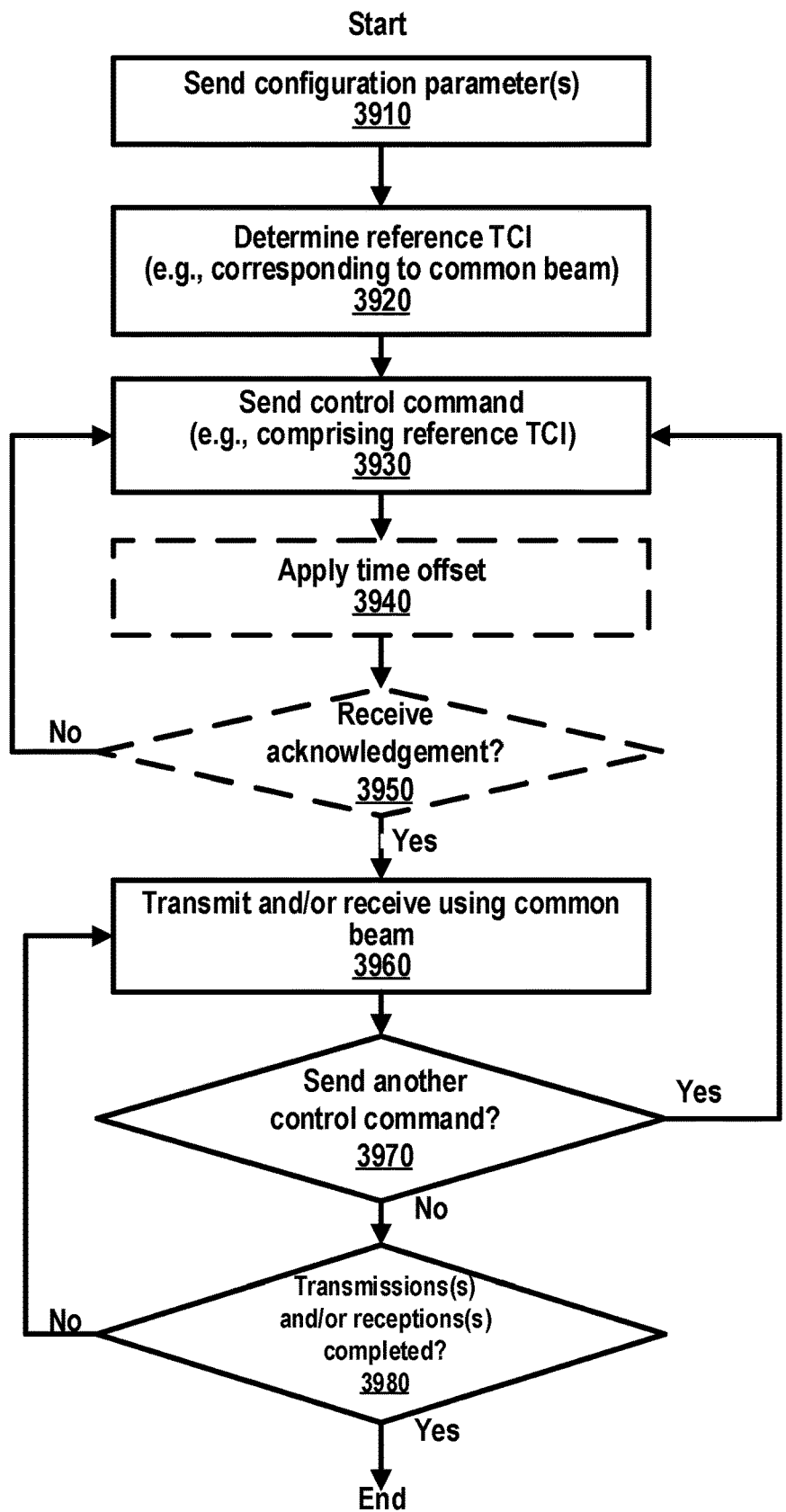
FIG. 39 shows an example method for wireless communications using a beam indication.

FIG. 39 shows an example method for wireless communications using a beam. The method may be performed by a base station and/or any other computing device. At step 3910, a bae station may send, to a wireless device, one or more messages (e.g., RRC messages and/or MAC CE messages). The one or more messages may comprise one or more configuration parameters. The one or more configuration parameters may indicate one or more reference TCI states and/or one or more identifiers/lists of one or more target signals/channels and/or one or more target RSs. Step. 3910 may correspond to step 2701 time $T_0$ described with respect to FIG. 27 (e.g., 2701, 2703). At step 3920, the base station may determine a reference TCI to use for indication a beam. At step 3930, the base station may send, to the wireless device, a control command. The control command may comprise an indication (e.g., a first field) indicating a reference TCI state (e.g., of the reference TCI states indicated at step 3910) and/or an identifier (e.g., a second field) (e.g., of the one or more identifiers at step 3910 and/or indicating a list of the lists). At step 3940, the base station may apply a time offset, such as described with respect to step 3702 regarding FIG. 37. At step 3950, the base station may receive, from the wireless device, an acknowledgement, such as described with respect to step 3602 and acknowledgement regarding FIG. 36. Step 3940 and/or step 3950 may be optional, and/or may be performed in any order (e.g., simultaneously, overlapping, before, or after the other). The base station may return to step 3930 to re-send a control command, for example, if an acknowledgement is not received at step 3950. At step 3960, the base station may send (e.g., transmit) and/or receive using the beam. For example, the base station may send (e.g., transmit) one or more downlink signals, of a first one of the lists, with/using the spatial domain filter. The base station may receive one or more uplink signals, of a second one of the lists, with/using the same spatial domain filter. The base station may transmit and/or receive any quantity of downlink and/or uplink signals corresponding to signal type(s) of the list of signals indicated by an identifier at step 3930. At step 3970, the base station may send another control command, such as described with respect to step 2708 regarding FIG. 27. The base station may return to step 3930, for example, based on sending another control command. At step 3980, the base station may determine whether all transmission(s) and/or reception(s) indicated/configured/scheduled (e.g., by the control command(s) and/or by other form(s) of indication(s)) have been successfully transmitted/received. The base station may return to step 3960, for example, based on a determination that all transmission(s) and/or receptions(s) indicated/configured/scheduled (e.g., by the control command(s) and/or by other form(s) of indication(s)) have not been successfully transmitted/received.

A wireless device may perform a method comprising multiple operations. The wireless device may receive downlink control information (DCI) comprising a beam indication. The beam indication may indicate a transmission configuration indicator (TCI) state for a plurality of channels. The wireless device may determine a time, after receiving the DCI, for applying the TCI state to the plurality of channels. The wireless device may determine, based on the TCI state, a spatial domain filter. The wireless device may receive, using the spatial domain filter and based on the time for applying the TCI state, a plurality of transmissions via the plurality of channels (e.g., a first transmission via a first downlink channel and a second transmission via a second downlink channel). The wireless device may transmit an acknowledgement indicating reception of the DCI comprising the beam indication. The time for applying the TCI state may be from at least one of: a time at which the DCI is received; and/or a time at which an acknowledgement of the DCI is sent. The wireless device may send, using the spatial domain filter, a third transmission via an uplink channel. The plurality of channels may comprise a plurality of different types of channels. The wireless device may receive at least one configuration parameter indicating a list of types of channels. The at least one configuration parameter may indicate groups of channels of the plurality of channels. The DCI may comprise an indication of a first group of a plurality of different types of channels. The types of channels may correspond to the plurality of channels. The DCI may comprise an indication of a first type of channel corresponding to the plurality of channels. The plurality of channels may comprise a physical downlink shared channel (PDSCH) and a physical downlink control channel (PDCCH). The first downlink channel may be a different type of channel relative to the second downlink channel. The first downlink channel may comprise a physical downlink shared channel (PDSCH) and the second downlink channel may comprise a physical downlink control channel (PDCCH). After receiving the DCI and prior to an expiration of the time for applying the TCI state, the wireless device may receive a transmission using a second spatial domain filter. The second spatial domain filter may be associated with at least one of: a default TCI state; and/or a TCI state associated with a transmission received prior to the receiving the DCI. The wireless device may receive second DCI comprising a second beam indication. The second beam indication may indicate a TCI state for a plurality of uplink channels. The wireless device may receive third DCI comprising a third beam indication. The third beam indication may indicate a TCI state for at least a first downlink channel and at least a first uplink channel. The wireless device may receive, via the at least a first downlink channel and using a spatial domain filter associated with the third beam, a downlink transmission. The wireless device may transmit, via the at least a first uplink channel and using the spatial domain filter associated with the third beam, an uplink transmission. The DCI may indicate at least one of: a control resource set (CORESET) pool index; and/or an antenna panel identifier. The wireless device may transmit an indication of a wireless device capability associated with a beam. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive downlink control information (DCI) comprising a beam indication. The beam indication may indicate that a transmission configuration indicator (TCI) state for a plurality of channels. The wireless device may transmit an acknowledgement indicating reception of the DCI comprising the beam indication. The wireless device may determine, based on the TCI state, a spatial domain filter. The wireless device may receive, using the spatial domain filter, a plurality of transmissions via the plurality of channels (e.g., a first transmission via a first downlink channel and a second transmission via a second downlink channel). The wireless device may determine a time, after receiving the DCI, for applying the TCI state to the plurality of channels. The receiving the first transmission and the second transmission may occur after the time. The time for applying the TCI state may be from at least one of: a time at which the DCI is received; and/or a time at which an acknowledgement of the DCI is sent. The wireless device may send, using the spatial domain filter, a third transmission via an uplink channel. The plurality of channels may comprise a plurality of different types of channels. The wireless device may receive at least one configuration parameter indicating a list of types of channels. The types of channels may correspond to the plurality of channels. The at least one configuration parameter may indicate groups of channels of the plurality of channels. The DCI may comprise an indication of a first group of a plurality of different types of channels. The DCI may comprise an indication of a first type of channel corresponding to the plurality of channels. The first downlink channel may be a different type of channel relative to the second downlink channel. The plurality of channels may comprise a physical downlink shared channel (PDSCH) and a physical downlink control channel (PDCCH). The first downlink channel may comprise a physical downlink shared channel (PDSCH) and the second downlink channel may comprise a physical downlink control channel (PDCCH). After receiving the DCI and prior to an expiration of a time for applying the TCI state to the plurality of channels, the wireless device may receive a third transmission using a second spatial domain filter. The second spatial domain filter may be associated with at least one of: a default TCI state; and/or a TCI state associated with a transmission received prior to the receiving the DCI. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive downlink control information (DCI) comprising a beam indication. The beam indication may indicate that a transmission configuration indicator (TCI) state for a plurality of channels. The wireless device may transmit an acknowledgement indicating reception of the DCI comprising the beam indication. The wireless device may determine a time, after receiving the DCI, for applying the TCI state to the plurality of channels. The wireless device may determine, based on the TCI state, a spatial domain filter. After the time for applying the TCI state and using the spatial domain filter, the wireless device may perform at least one of: receiving a first message via a first channel and receiving a second message via a second channel; receiving the first message via the first channel and transmitting a third message via a third channel; and/or transmitting the third message via the third channel and transmitting a fourth message via a fourth channel. The first channel may be a different type of channel relative to the second channel and the third channel. The third channel may be a different type of channel relative to the fourth channel. The plurality of channels may comprise a physical downlink shared channel (PDSCH) and a physical downlink control channel (PDCCH). The first channel may comprise a downlink channel for a channel state information-reference signal (CSI-RS), a physical downlink shared channel (PDSCH), or a physical downlink control channel (PDCCH). The second channel may be different from the first channel and may comprise a downlink channel for a CSI-RS, a PDSCH, or a PDCCH. The third channel may comprise an uplink channel for a sounding reference signal (SRS), a physical uplink shared channel (PUSCH), or a physical uplink control channel (PUCCH). The fourth channel may be different from the third channel and may comprise an uplink channel for an SRS, a PUSCH, or a PUCCH. The time for applying the TCI state may be from at least one of: a time at which the DCI is received; and/or a time at which an acknowledgement of the DCI is sent. The wireless device may transmit the third message via a physical uplink shared channel (PUSCH). The wireless device may transmit the fourth message via a physical uplink control channel (PUCCH). The wireless device may receive at least one configuration parameter indicating a list of types of channels. The types of channels correspond to the plurality of channels. The at least one configuration parameter may indicate groups of channels of the plurality of channels. The DCI may comprise an indication of a first group of a plurality of different types of channels. The DCI may comprise an indication of a first type of channel corresponding to the plurality of channels. After receiving the DCI and prior to an expiration of the time for applying the TCI state, the wireless device may receive a transmission using a second spatial domain filter. The second spatial domain filter may be associated with at least one of: a default TCI state; and/or a TCI state associated with a transmission received prior to the receiving the DCI. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive one or more messages comprising: configuration parameters of transmission configuration indicator (TCI) states; and/or reference signal lists. One of the reference signal lists may indicate the reference signals. The wireless device may receive a control command comprising: a first field indicating a TCI state of the TCI states; and/or a second field indicating the one of the reference signal lists. The wireless device may determine, based on the TCI state, a spatial domain filter for the one of the reference signal lists. The wireless device may receive, using the spatial domain filter, a first reference signal of the one of the reference signal lists. The wireless device may transmit, using the spatial domain filter, a second reference signal of the one of the reference signal lists. The first reference signal may comprise channel state information-reference signal (CSI-RS). The first reference signal may comprise at least one CSI-RS resource. The first reference signal may comprise at least one CSI-RS resource set. The wireless device may receive downlink control information (DCI) triggering a reception of an aperiodic CSI-RS of the first reference signal. Receiving, using the spatial domain filter, the first reference signal may comprise receiving the aperiodic CSI-RS based on the DCI and the spatial domain filter. The second reference signal may comprise at least one sounding reference signal (SRS). The second reference signal may comprise at least one SRS resource. The second reference signal may comprise at least one SRS resource set. The wireless device may receive DCI triggering a transmission of an aperiodic SRS of the second reference signal. The transmitting, using the spatial domain filter, the second reference signal may comprise transmitting the aperiodic SRS based on the DCI and the spatial domain filter. The first reference signal may comprise a demodulation RS (DMRS). Receiving, using the spatial domain filter, the first reference signal may comprise receiving the DMRS based on the spatial domain filter. The wireless device may receive DCI scheduling a transport block via a physical downlink shared channel (PDSCH) associated with the DMRS. The wireless device may receive, via the PDSCH, the transport block using the spatial domain filter. The second reference signal may comprise a DMRS. Transmitting, using the spatial domain filter, the second reference signal may comprise transmitting a DMRS based on the spatial domain filter. The wireless device may receive DCI scheduling a transport block via a physical uplink shared channel (PUSCH) associated with a DMRS. The wireless device may transmit, via the PUSCH, the transport block using the spatial domain filter. The wireless device may receive DCI, with the spatial domain filter, via a physical downlink control channel (PDCCH) associated with a DMRS. The wireless device may receive DCI, with the spatial domain filter, via a PDCCH based on a control resource set (CORESET) associated with a DMRS. The wireless device may transmit an uplink control information (UCI), using the spatial domain filter, via a physical uplink control channel (PUCCH) associated with a DMRS. The UCI may comprise at least one of: a scheduling request (SR), channel state information (CSI), an acknowledgement (ACK), and/or a negative acknowledgement (NACK). The reference TCI state may comprise a downlink (DL) RS. The DL RS may be a CSI-RS. The DL RS may be a synchronization signal block (SSB). The reference TCI state may comprise a UL RS. The UL RS may comprise an SRS. The control command may be a MAC CE command. The control command may be a DCI command. The control command may not comprise a DL/UL scheduling information with resource allocation. The DCI may be cyclic-redundancy-check (CRC)-scrambled by a radio network temporary identifier (RNTI). The RNTI may be different from that for a DL/UL scheduling grant. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive downlink control information (DCI) comprising a beam indication. The beam indication may indicate that a transmission configuration indicator (TCI) state is applicable for a downlink shared channel and a downlink control channel. The wireless device may transmit an acknowledgement indicating correctly receiving the DCI comprising the beam indication. The wireless device may determine a spatial domain filter based on the TCI state. Based on the spatial domain filter, the wireless device may receive the downlink shared channel and/or monitor the downlink control channel. The acknowledgement may comprise a positive acknowledgement indicating a successful reception of the DCI indicating the beam indication. Monitoring the downlink control channel may be based on the spatial domain filter. The wireless device may receive second DCI via the downlink control channel based on the spatial domain filter. The beam indication may indicate that a TCI state, of a plurality of TCI states, is applicable for the downlink shared channel and the downlink control channel. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive downlink control information (DCI) comprising a beam indication. The beam indication may indicate that a transmission configuration indicator (TCI) state is applicable for a downlink shared channel and a downlink control channel. The wireless device may transmit an acknowledgement indicating correctly receiving the DCI comprising the beam indication. The wireless device may determine a time offset for application of the TCI state for the downlink shared channel and the downlink control channel. The time offset may be determined based on at least one of: a first timing for receiving the DCI; and/or a second timing for the transmitting the acknowledgement. The wireless device may determine a spatial domain filter based on the TCI state. Based on the spatial domain filter and the time offset, the wireless device may receive the downlink shared channel and/or monitor the downlink control channel. (e.g., receive DCI via a PDCCH). The acknowledgement may comprise a positive acknowledgement indicating a successful reception of the DCI indicating the beam indication. Monitoring the downlink control channel may be based on the spatial domain filter and the time offset. The wireless device may receive second DCI via the downlink control channel based on the spatial domain filter and the time offset. The beam indication may indicate that a TCI state, of a plurality of TCI states, is applicable for the downlink shared channel and the downlink control channel. The wireless device may receive an indication of a value of the time offset for application of the TCI state. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive downlink control information (DCI) comprising a beam indication. The beam indication may indicate that a transmission configuration indicator (TCI) state is applicable for a downlink shared channel and a downlink control channel. The wireless device may determine a time offset for application of the TCI state for the downlink shared channel and the downlink control channel. The wireless device may determine a spatial domain filter based on the TCI state. Based on the spatial domain filter and the time offset, the wireless device may receive the downlink shared channel and/or monitor the downlink control channel. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive downlink control information (DCI) comprising a beam indication. The beam indication may indicate that a transmission configuration indicator (TCI) state is applicable for a downlink shared channel and a downlink control channel. The wireless device may receive an indication of a time window during which a spatial domain filter, determined based on the TCI-state, may be applied for the beam indication. Based on the spatial domain filter and the time window, the wireless device may receive the downlink shared channel and/or monitor the downlink control channel. Monitoring the downlink control channel may be based on the spatial domain filter and the time window. The wireless device may receive second DCI via the downlink control channel based on the spatial domain filter and the time window. The beam indication may indicate that a TCI state, of a plurality of TCI states, is applicable for the downlink shared channel and the downlink control channel. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive one or more messages comprising configuration parameters, wherein the configuration parameters indicate at least one of: reference transmission configuration indicator (TCI) states and/or channel identifiers. Each channel identifier may indicate one or more target channels. The wireless device may receive a control command comprising at least one of: a field indicating a reference TCI state of the reference TCI states; and/or a channel identifier. The wireless device may determine, based on the reference TCI state, a spatial domain filter of the one or more target channels indicated by the channel identifier. The wireless device may receive, via a first one of the one or more target channels, a downlink signal with the spatial domain filter. The wireless device may transmit, via a second one of the one or more target channels, an uplink signal with the spatial domain filter. The wireless device may receive downlink control information (DCI) scheduling a transport block via the first one of the one or more target channels. The first one of the one or more target channels may be a physical downlink shared channel (PDSCH). Receiving, via the first one of the one or more target channels, a downlink (DL) signal may comprise receiving, via the PDSCH, the transport block with the spatial domain filter. The wireless device may receive downlink control information (DCI) scheduling a transport block via the second one of the one or more target channels. The second one of the one or more target channels may be a physical uplink shared channel (PUSCH). Transmitting, via the second one of the one or more target channels, an uplink (UL) signal may comprise transmitting, via the PUSCH, the transport block with the spatial domain filter. The first one of the one or more target channels may comprise a physical downlink control channel (PDCCH). The DL signal may comprise DCI. Receiving, via the first one of the one or more target channels, the DL signal may comprise receiving, via the PDCCH, the DCI with the spatial domain filter. The first one of the one or more target channels comprises PDCCH may be based on a control resource set (CORESET). The second one of the one or more target channels may comprise a physical uplink control channel (PUCCH). The uplink signal may comprise uplink control information (UCI). The UCI may comprise at least one of: a scheduling request (SR), channel state information (CSI), an acknowledgement (ACK), and/or a negative acknowledgement (NACK). Transmitting, via the second one of the one or more target channels, the uplink signal may comprise transmitting, via the PUCCH, the UCI with the spatial domain filter. The second one of the one or more target channels may comprise at least one of: a set of PUCCH resources and/or a PUCCH resource group. The reference TCI state may comprise a DL reference signal (RS). The DL RS may comprise a channel state information-reference signal (CSI-RS). The DL RS may comprise a synchronization signal block (SSB). The reference TCI state may comprise a UL RS sounding reference signal (SRS). The reference TCI state may comprise a DL RS which the wireless device determines based on the most recent contention-based random access (CBRA) result. The reference TCI state may indicate for the wireless device to follow the current active reference TCI state for the lowest PUCCH resource. The wireless device may determine the lowest PUCCH resource among the PUCCH resources in a UL bandwidth part (BWP). The UL BWP may be the current active UL BWP corresponding to the DL BWP on which the control command is delivered. The reference TCI state may indicate for the wireless device to follow the TCI state with the lowest ID among the activated TCI states for PDSCH.

The reference TCI state may indicate for the wireless device to follow the TCI state for the lowest CORESET ID of a BWP. The BWP may comprise the DL BWP on which the control command is delivered. The control command may indicate the BWP as a DL BWP. The control command may indicate a CC/BWP on which a signal of the reference TCI state is transmitted. The control command may indicate a control channel or bandwidth part (CC/BWP) on which the wireless device receives, via the first one of the one or more target channels, a DL signal with the spatial domain filter. The indicated CC/BWP may indicate one or more CCs/BWPs. The one or more messages may comprise an identification of the one or more CCs/BWPs which the indicated CC/BWP belongs to. The control command may indicate a CC/BWP on which the wireless device transmits, via the second one of the one or more target channels, a UL signal with the spatial domain filter. The indicated CC/BWP may indicate one or more CCs/BWPs. The one or more messages may comprise an identification of the one or more CCs/BWPs which the indicated CC/BWP belongs to. The reference TCI state may comprise a CORESET pool index. The reference TCI state may comprise a UL panel ID. The one or more target channels associated with the channel identifier may comprise a CORESET pool index. The one or more target channels associated with the channel identifier may comprise a UL panel ID. The one or more messages may comprise a time window during which the spatial domain filter is applied. The wireless device may report its capability information on the time window. The wireless device may determine the starting position of the time window based on the time offset parameter. The control command may comprise a field jointly indicating both the reference TCI state of the reference TCI states and the channel identifier. The one or more messages may comprise radio resource control (RRC) messages. The one or more messages may comprise medium access control control element (MAC CE) messages. The control command may comprise a MAC CE command. The control command may comprise a DCI command. The control command may not comprise a DL/UL scheduling information with resource allocation. The DCI may be cyclic-redundancy-check (CRC)-scrambled by a radio network temporary identifier (RNTI). The RNTI may be different from that for a DL/UL scheduling grant. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive one or more messages comprising configuration parameters. The configuration parameters may indicate: reference transmission configuration indicator (TCI) states; and/or identifiers. Each identifier may indicate a list of at least one of: one or more target channels; and/or one or more target reference signals. The wireless device may receive a control command comprising: a field indicating a reference TCI state of the reference TCI states; and/or an identifier. The wireless device may determine, based on the reference TCI state, a spatial domain filter for the list indicated by the identifier. The wireless device may receive a downlink signal, of a first one of the lists, with the spatial domain filter. The wireless device may transmit an uplink signal, of a second one of the lists, with the spatial domain filter. The wireless device may transmit an ACK/NACK message in response to the control command. The ACK/NACK message may be different from a hybrid automatic repeat request (HARQ) ACK feedback in response to a DL scheduling grant from a base station. The wireless device may encode the ACK/NACK message in concatenation with the HARQ ACK feedback message. The wireless device may transmit, to a base station, the ACK/NACK message and the HARQ ACK feedback message together. The wireless device may encode the ACK/NACK message independently and transmit the ACK/NACK message to the base station. The one or more messages may comprise a time offset parameter to apply the spatial domain filter after receiving the control command. The wireless device may report wireless device capability information on the time offset parameter. The time offset parameter may be determined based on a transmission instance of the ACK/NACK message. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive, from a base station or other device, a control command comprising: a first field indicating a transmission configuration indicator (TCI) state; and/or a second field indicating that the TCI state is applied to a reference signal list comprising a first reference signal and a second reference signal. The wireless device may receive the first reference signal using a spatial domain filter determined based on the TCI state. The wireless device may transmit the second reference signal using the spatial domain filter. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

A wireless device may perform a method comprising multiple operations. The wireless device may receive a control command comprising: a first field indicating a transmission configuration indicator (TCI) state; and/or a second field indicating a reference signal list comprising a first reference signal and a second reference signal. The wireless device may receive the first reference signal using a spatial domain filter determined based on the TCI state. The wireless device may transmit the second reference signal using the spatial domain filter. The wireless device may comprise one or more processors; and memory storing instructions that, when executed by the one or more processors, cause the wireless device to perform the described method, additional operations and/or include the additional elements. A base station may perform operations complementary to those described with respect to the wireless device. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
    receiving, by a wireless device, downlink control information (DCI) indicating a transmission configuration indicator (TCI) state for a plurality of channels;
    transmitting an uplink transmission comprising an acknowledgement corresponding to the DCI;
    determining a time, from a time of the uplink transmission, for applying the TCI state to the plurality of channels; and
    communicating, using the TCI state and based on the time for applying the TCI state, a plurality of transmissions via the plurality of channels.

2. The method of claim 1, wherein the plurality of channels comprises a plurality of different types of channels.

3. The method of claim 1, wherein the plurality of channels comprises a physical downlink shared channel (PDSCH) and a physical downlink control channel (PDCCH), and wherein the communicating comprises receiving, using the TCI state, the plurality of transmissions via at least the PDSCH and the PDCCH.

4. The method of claim 1, further comprising:
    after receiving the DCI and prior to an expiration of the time for applying the TCI state, communicating using a second TCI state, wherein the second TCI state is at least one of:
    a default TCI state; or
    a TCI state associated with a transmission received prior to the receiving the DCI.

5. The method of claim 1, wherein the acknowledgement comprises a hybrid automatic repeat request (HARQ) acknowledgement (ACK) message or a HARQ negative acknowledgement (NACK) message.

6. The method of claim 1, wherein the DCI comprises a beam indication, and wherein the beam indication indicates the TCI state.

7. The method of claim 1, wherein the communicating comprises receiving, using a quasi co-location (QCL) associated with the TCI state, the plurality of transmissions via the plurality of channels.

8. The method of claim 1, wherein the communicating comprises transmitting, using a spatial filter associated with the TCI state, and starting at the time for applying the TCI state, the plurality of transmissions via the plurality of channels.

9. The method of claim 1, wherein the uplink transmission comprises an uplink transmission via a physical uplink control channel (PUCCH) or via a physical uplink shared channel (PUSCH).

10. The method of claim 1, wherein the acknowledgement comprises a positive acknowledgement or a negative acknowledgment.

11. The method of claim 1, wherein the plurality of channels comprises a physical uplink shared channel (PUSCH) and a physical uplink control channel (PUCCH), and wherein the communicating comprises transmitting, using the TCI state, the plurality of transmissions via at least the PUSCH and the PUCCH.

12. The method of claim 1, wherein the plurality of channels comprises at least one of a sounding reference signal (SRS) or channel state information (CSI).

13. The method of claim 1, further comprising receiving, by the wireless device, a control message indicating a time offset, wherein the determining the time, from the time of the uplink transmission, is based on the time offset.

14. A wireless device comprising:
    one or more processors; and
    memory storing instructions that, when executed by the one or more processors, cause the wireless device to:
        receive downlink control information (DCI) indicating a transmission configuration indicator (TCI) state for a plurality of channels;
        transmit an uplink transmission comprising an acknowledgement corresponding to the DCI;
        determine a time, from a time of the uplink transmission, for applying the TCI state to the plurality of channels; and
        communicate, using the TCI state and based on the time for applying the TCI state, a plurality of transmissions via the plurality of channels.

15. The wireless device of claim 14, wherein the plurality of channels comprises a plurality of different types of channels.

16. The wireless device of claim 14, wherein the plurality of channels comprises a physical downlink shared channel (PDSCH) and a physical downlink control channel (PDCCH), and wherein the instructions, when executed by the one or more processors, cause the wireless device to communicate the plurality of transmissions by at least:
    receiving, using the TCI state, the plurality of transmissions via at least the PDSCH and the PDCCH.

17. The wireless device of claim 14, wherein the instructions, when executed by the one or more processors, further cause the wireless device to:
    after receiving the DCI and prior to an expiration of the time for applying the TCI state, communicate using a second TCI state, wherein the second TCI state is at least one of:
    a default TCI state; or
    a TCI state associated with a transmission received prior to the receiving the DCI.

18. The wireless device of claim 14, wherein the acknowledgement comprises a hybrid automatic repeat request (HARQ) acknowledgement (ACK) message or a HARQ negative acknowledgement (NACK) message.

19. The wireless device of claim 14, wherein the DCI comprises a beam indication, and wherein the beam indication indicates the TCI state.

20. The wireless device of claim 14, wherein the instructions, when executed by the one or more processors, cause the wireless device to communicate the plurality of transmissions by receiving, using a quasi co-location (QCL) associated with the TCI state, the plurality of transmissions via the plurality of channels.

21. The wireless device of claim 14, wherein the instructions, when executed by the one or more processors, cause the wireless device to communicate the plurality of transmissions by transmitting, using a spatial filter associated with the TCI state, and starting at the time for applying the TCI state, the plurality of transmissions via the plurality of channels.

22. The wireless device of claim 14, wherein the uplink transmission comprises an uplink transmission via a physical uplink control channel (PUCCH) or via a physical uplink shared channel (PUSCH).

23. The wireless device of claim 14, wherein the acknowledgement comprises a positive acknowledgement or a negative acknowledgment.

24. The wireless device of claim 14, wherein the plurality of channels comprises a physical uplink shared channel (PUSCH) and a physical uplink control channel (PUCCH), and wherein the instructions, when executed by the one or more processors, cause the wireless device to communicate the plurality of transmissions by at least:
 transmitting, using the TCI state, the plurality of transmissions via at least the PUSCH and the PUCCH.

25. The wireless device of claim 14, wherein the plurality of channels comprises at least one of a sounding reference signal (SRS) or channel state information (CSI).

26. The wireless device of claim 14, wherein the instructions, when executed by the one or more processors, cause the wireless device to:
 receive a control message indicating a time offset, and
 determine the time, from the time of the uplink transmission, based on the time offset.

27. A non-transitory computer-readable medium storing instructions that, when executed, configure a wireless device to:
 receive downlink control information (DCI) indicating a transmission configuration indicator (TCI) state for a plurality of channels;
 transmit an uplink transmission comprising an acknowledgement corresponding to the DCI;
 determine a time, from a time of the uplink transmission, for applying the TCI state to the plurality of channels; and
 communicate, using the TCI state and based on the time for applying the TCI state, a plurality of transmissions via the plurality of channels.

28. The non-transitory computer-readable medium of claim 27, wherein the plurality of channels comprises a plurality of different types of channels.

29. The non-transitory computer-readable medium of claim 27, wherein the plurality of channels comprises a physical downlink shared channel (PDSCH) and a physical downlink control channel (PDCCH), and wherein the instructions, when executed, configure the wireless device to communicate the plurality of transmissions by at least:
 receiving, using the TCI state, the plurality of transmissions via at least the PDSCH and the PDCCH.

30. The non-transitory computer-readable medium of claim 27, wherein the instructions, when executed, further configure the wireless device to:
 after receiving the DCI and prior to an expiration of the time for applying the TCI state, communicate using a second TCI state, wherein the second TCI state is at least one of:
  a default TCI state; or
  a TCI state associated with a transmission received prior to the receiving the DCI.

31. The non-transitory computer-readable medium of claim 27, wherein the acknowledgement comprises a hybrid automatic repeat request (HARQ) acknowledgement (ACK) message or a HARQ negative acknowledgement (NACK) message.

32. The non-transitory computer-readable medium of claim 27, wherein the DCI comprises a beam indication, and wherein the beam indication indicates the TCI state.

33. The non-transitory computer-readable medium of claim 27, wherein the instructions, when executed, configure the wireless device to communicate the plurality of transmissions by receiving, using a quasi co-location (QCL) associated with the TCI state, the plurality of transmissions via the plurality of channels.

34. The non-transitory computer-readable medium of claim 27, wherein the instructions, when executed, configure the wireless device to communicate the plurality of transmissions by transmitting, using a spatial filter associated with the TCI state, and starting at the time for applying the TCI state, the plurality of transmissions via the plurality of channels.

35. The non-transitory computer-readable medium of claim 27, wherein the uplink transmission comprises an uplink transmission via a physical uplink control channel (PUCCH) or via a physical uplink shared channel (PUSCH).

36. The non-transitory computer-readable medium of claim 27, wherein the acknowledgement comprises a positive acknowledgement or a negative acknowledgment.

37. The non-transitory computer-readable medium of claim 27, wherein the plurality of channels comprises a physical uplink shared channel (PUSCH) and a physical uplink control channel (PUCCH), and wherein the instructions, when executed, configure the wireless device to communicate the plurality of transmissions by at least:
 transmitting, using the TCI state, the plurality of transmissions via at least the PUSCH and the PUCCH.

38. The non-transitory computer-readable medium of claim 27, wherein the plurality of channels comprises at least one of a sounding reference signal (SRS) or channel state information (CSI).

39. The non-transitory computer-readable medium of claim 27, wherein the instructions, when executed, configure the wireless device to:
 receive a control message indicating a time offset, and
 determine the time, from the time of the uplink transmission, based on the time offset.

40. A system comprising:
 a base station configured to transmit downlink control information (DCI) indicating a transmission configuration indicator (TCI) state for a plurality of channels; and
 a wireless device configured to:
  transmit an uplink transmission comprising an acknowledgement corresponding to the DCI;
  determine a time, from a time of the uplink transmission, for applying the TCI state to the plurality of channels; and
  communicate with the base station, using the TCI state and based on the time for applying the TCI state, a plurality of transmissions via the plurality of channels.

41. The system of claim 40, wherein the wireless device is configured to communicate the plurality of transmissions by receiving, using a quasi co-location (QCL) associated with the TCI state, the plurality of transmissions via the plurality of channels.

42. The system of claim 40, wherein the wireless device is configured to communicate the plurality of transmissions by transmitting, using a spatial filter associated with the TCI state, and starting at the time for applying the TCI state, the plurality of transmissions via the plurality of channels.

43. The system of claim 40, wherein the acknowledgement comprises a positive acknowledgement or a negative acknowledgment.

44. The system of claim 40, wherein the plurality of channels comprises a physical uplink shared channel (PUSCH) and a physical uplink control channel (PUCCH), and wherein the wireless device is configured to communicate the plurality of transmissions by at least:
   transmitting, using the TCI state, the plurality of transmissions via at least the PUSCH and the PUCCH.

45. The system of claim 40, wherein the plurality of channels comprises at least one of a sounding reference signal (SRS) or channel state information (CSI).

46. The system of claim 40, wherein the wireless device is configured to:
   receive a control message indicating a time offset, and
   determine the time, from the time of the uplink transmission, based on the time offset.

* * * * *